(12) United States Patent
Kwon et al.

(10) Patent No.: US 9,826,143 B2
(45) Date of Patent: Nov. 21, 2017

(54) MOBILE TERMINAL AND CONTROL METHOD THEREOF

(71) Applicant: LG ELECTRONICS INC., Seoul (KR)

(72) Inventors: Yunmi Kwon, Seoul (KR); Kiseon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 89 days.

(21) Appl. No.: 14/956,750

(22) Filed: Dec. 2, 2015

(65) Prior Publication Data
US 2016/0337580 A1   Nov. 17, 2016

(30) Foreign Application Priority Data

May 13, 2015 (KR) .................. 10-2015-0066750

(51) Int. Cl.
| | |
|---|---|
| H04N 5/232 | (2006.01) |
| G06F 3/14 | (2006.01) |
| G06F 3/0481 | (2013.01) |
| H04N 5/225 | (2006.01) |
| H04M 1/725 | (2006.01) |
| G06F 3/0484 | (2013.01) |

(52) U.S. Cl.
CPC ..... *H04N 5/23216* (2013.01); *G06F 3/04817* (2013.01); *G06F 3/04842* (2013.01); *G06F 3/14* (2013.01); *H04M 1/72522* (2013.01); *H04N 5/2257* (2013.01); *H04N 5/23293* (2013.01); *H04M 1/72555* (2013.01); *H04M 2250/22* (2013.01); *H04M 2250/52* (2013.01)

(58) Field of Classification Search
CPC .......... H04N 5/23293; H04N 5/23216; H04N 5/23245; H04N 1/00411; H04N 1/00413; H04N 1/00424; G06F 3/04817; G06F 3/04886; G06F 3/0482; G06F 3/04812; G06F 3/0484
See application file for complete search history.

(56) References Cited

U.S. PATENT DOCUMENTS

| | | | |
|---|---|---|---|
| 7,034,881 B1 * | 4/2006 | Hyodo ................. | H04N 5/2351 348/231.6 |
| 7,685,530 B2 * | 3/2010 | Sherrard ............. | G06F 3/04817 379/142.01 |
| 2005/0136953 A1 * | 6/2005 | Jo .......................... | G06F 17/24 455/466 |

(Continued)

FOREIGN PATENT DOCUMENTS

| | | |
|---|---|---|
| EP | 2704417 A1 | 3/2014 |
| EP | 2830297 A1 | 1/2015 |
| KR | 10-2008-0045446 A | 5/2008 |

*Primary Examiner* — Michael Osinski
(74) *Attorney, Agent, or Firm* — Birch, Stewart, Kolasch & Birch, LLP

(57) ABSTRACT

A mobile terminal including a touchscreen; a camera; and a controller configured to display a first graphic object on the touchscreen that is linked with an image capture function for capturing an image through the camera, execute the image capture function in response to a first touch input applied to the graphic object, and execute both the image capture function and a linked function corresponding to the image capture function in response to a second touch input applied to the graphic object.

19 Claims, 55 Drawing Sheets

(56) References Cited

U.S. PATENT DOCUMENTS

| | | | |
|---|---|---|---|
| 2007/0028186 A1* | 2/2007 | Park | G06F 3/0489 715/810 |
| 2007/0097245 A1* | 5/2007 | Battles | G06F 3/03547 348/333.01 |
| 2008/0079834 A1* | 4/2008 | Chung | H04N 1/00411 348/333.12 |
| 2008/0158385 A1* | 7/2008 | Lee | G06F 3/04845 348/231.3 |
| 2008/0316332 A1* | 12/2008 | Knutson-Ek | H04N 5/23293 348/224.1 |
| 2009/0015703 A1* | 1/2009 | Kim | G03B 29/00 348/333.12 |
| 2010/0026873 A1* | 2/2010 | Lee | H04N 5/272 348/333.05 |
| 2010/0317410 A1* | 12/2010 | Song | G06F 3/04886 455/566 |
| 2011/0019058 A1* | 1/2011 | Sakai | G06F 3/04847 348/333.01 |
| 2011/0076003 A1* | 3/2011 | Cho | G03B 17/20 396/297 |
| 2011/0111806 A1* | 5/2011 | Kim | H04M 1/2755 455/564 |
| 2012/0162242 A1* | 6/2012 | Amano | G06F 3/04886 345/592 |
| 2013/0010170 A1* | 1/2013 | Matsuzawa | G06F 3/041 348/333.01 |
| 2013/0208143 A1* | 8/2013 | Chou | H04N 1/212 348/231.99 |
| 2013/0332168 A1* | 12/2013 | Kim | G10L 15/22 704/251 |
| 2014/0028885 A1 | 1/2014 | Ma et al. | |
| 2014/0063313 A1* | 3/2014 | Choi | H04N 5/23216 348/333.02 |
| 2014/0071323 A1 | 3/2014 | Yi et al. | |
| 2014/0118598 A1* | 5/2014 | Kim | H04N 5/23245 348/333.02 |
| 2014/0213318 A1* | 7/2014 | Leem | G06F 3/0486 455/556.1 |
| 2014/0240579 A1* | 8/2014 | Park | G06F 3/0484 348/333.11 |
| 2015/0271389 A1* | 9/2015 | Huang | H04N 5/23216 348/333.02 |
| 2016/0044234 A1* | 2/2016 | Huang | H04N 5/23216 348/231.6 |
| 2016/0054895 A1* | 2/2016 | Lee | G06F 3/04842 715/716 |
| 2016/0080639 A1* | 3/2016 | Choi | H04N 5/23232 348/222.1 |
| 2016/0119464 A1* | 4/2016 | Kim | G06F 3/0482 455/566 |

* cited by examiner

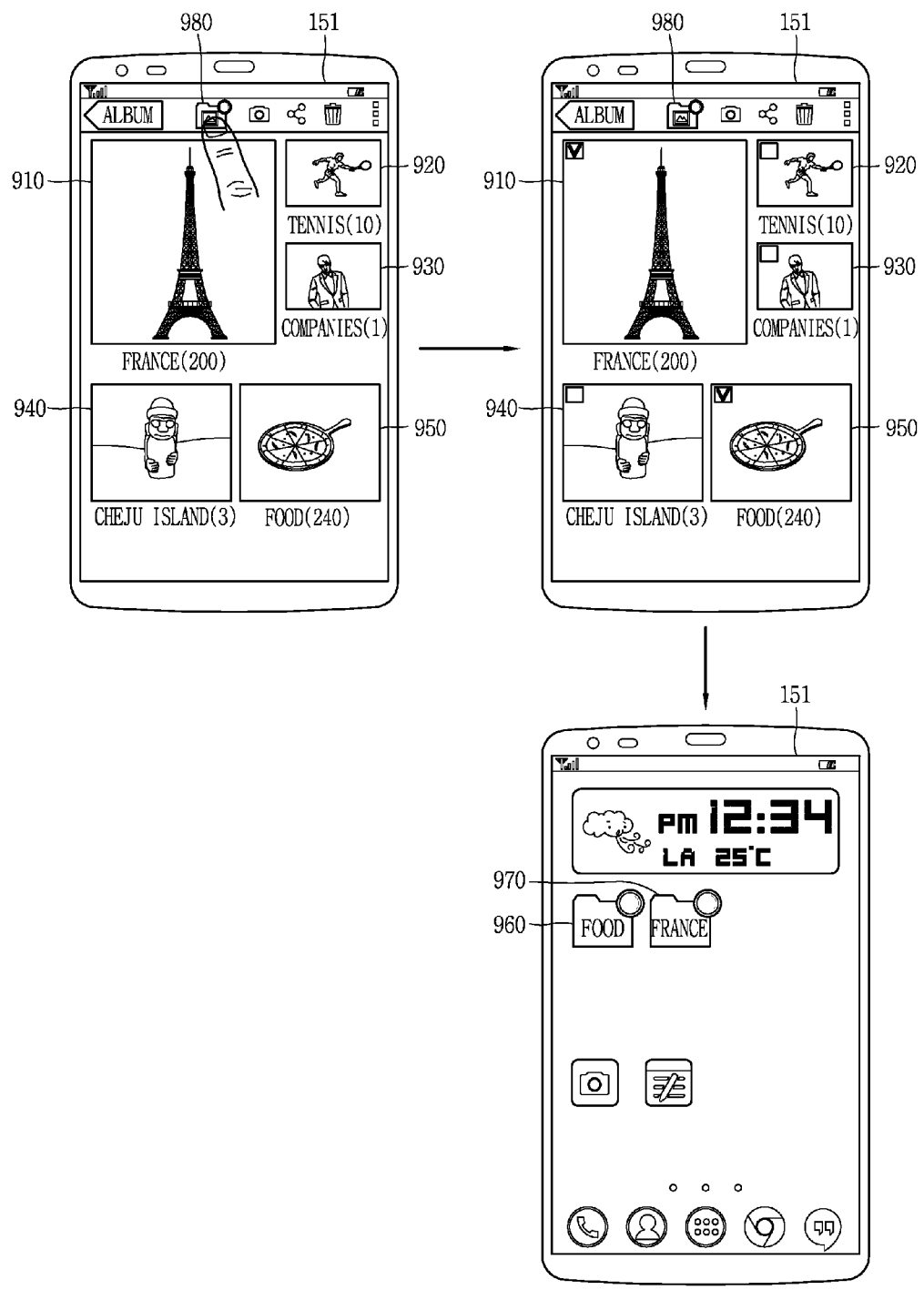

MOBILE TERMINAL AND CONTROL METHOD THEREOF

CROSS-REFERENCE TO RELATED APPLICATION

Pursuant to 35 U.S.C. §119(a), this application claims the benefit of earlier filing date and right of priority to Korean Application No. 10-2015-0066750, filed on May 13, 2015, the contents of which is incorporated by reference herein in its entirety.

BACKGROUND OF THE INVENTION

1. Field of the Invention

The present disclosure relates to a mobile terminal for providing a camera function and a control method thereof.

2. Description of the Related Art

Terminals can be classified into two types, such as a mobile or portable terminal and a stationary terminal. Furthermore, the mobile terminal can be further classified into two types, such as a handheld terminal and a vehicle mounted terminal. The functionality of the mobile terminal has been diversified. For example, there are functions of data and voice communication, photo capture and video capture through a camera, voice recording, music file reproduction through a speaker system, and displaying an image or video on the display unit. Some terminals may additionally perform an electronic game play function or perform a multimedia play function. In particular, recent terminals may receive multicast signals for providing video contents such as broadcasts, videos, television programs, or the like.

As it becomes multifunctional, for example, such a terminal can capture still images or moving images, play music or video files, play games, receive broadcast and the like, so as to be implemented as an integrated multimedia player. In recent years, the use of a camera for capturing images in a mobile terminal has increased.

However, a related art mobile terminal causes an inconvenience in which an additional application has to be performed to allow a user to use the captured images or the user has to directly link the captured images to an additional application.

SUMMARY OF THE INVENTION

An aspect of the present disclosure is to provide a method of conveniently linking a camera function of a mobile terminal to a specific function provided in the mobile terminal.

Furthermore, another aspect of the present disclosure is to provide a method of controlling a camera function and a specific function when the camera function is performed in connection with the specific function provided in the mobile terminal.

In addition, still another aspect of the present disclosure is to provide a method of linking a camera function to a contact function to easily insert an image captured through the camera into the contact list.

To achieve these and other advantages and in accordance with the purpose of the present invention, as embodied and broadly described herein, the present invention provides in one aspect a mobile terminal including a display; a camera; and a controller configured to display a graphic object on the display that is linked with an image capture function for capturing an image through the camera, execute the image capture function in response to a first touch input applied to the graphic object, and execute both the image capture function and a function linked to the captured image in response to a second touch input applied to the graphic object. The present invention also provides a corresponding method of controlling a mobile terminal.

Further scope of applicability of the present invention will become apparent from the detailed description given hereinafter. However, it should be understood that the detailed description and specific examples such as preferred embodiments of the invention are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 11A and 11B are conceptual views illustrating a method of linking an image captured through the image capture function between the image capture function and a preset folder;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
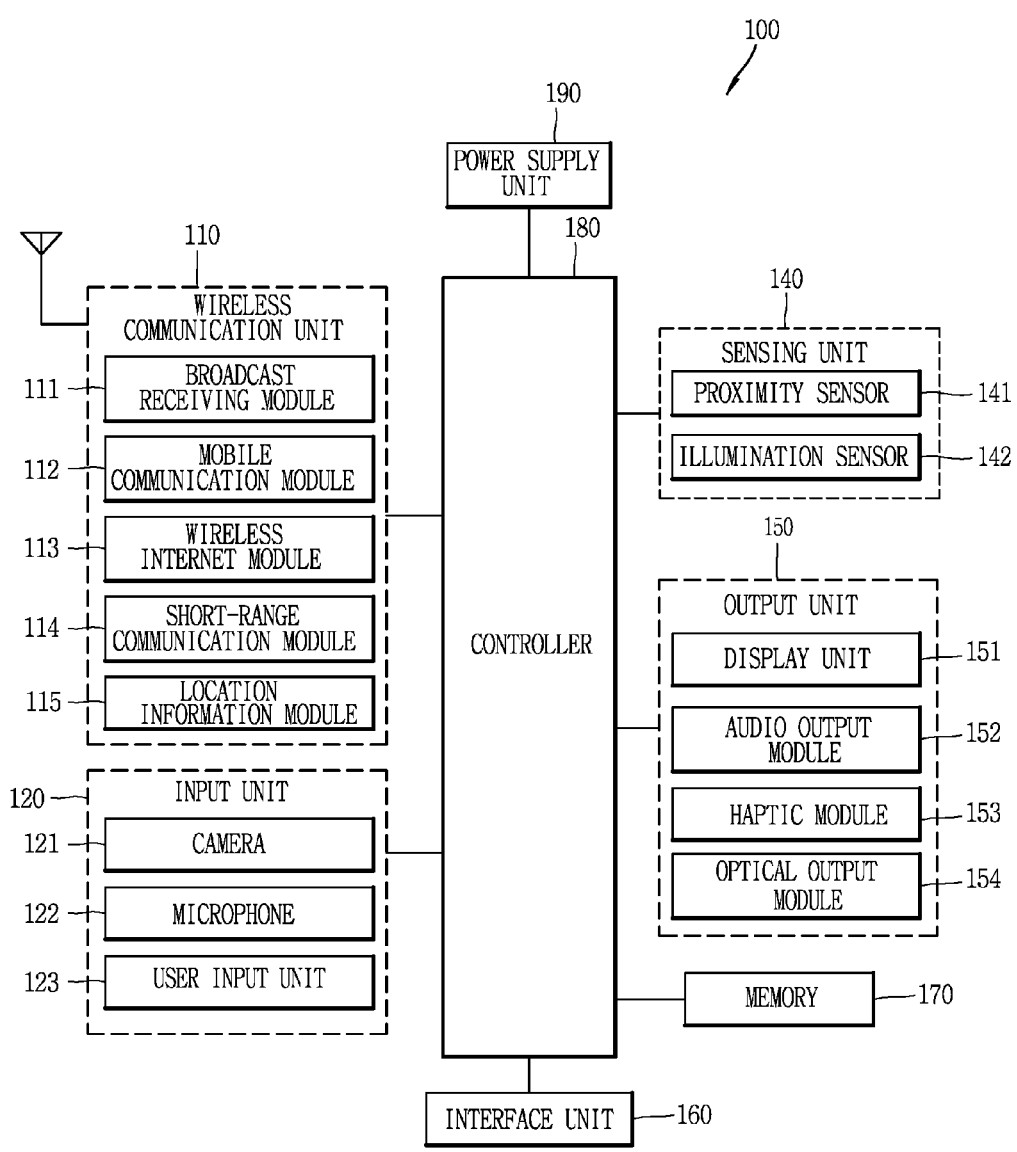
FIG. 1A is a block diagram illustrating a mobile terminal associated with the present disclosure.
Figure 1B:
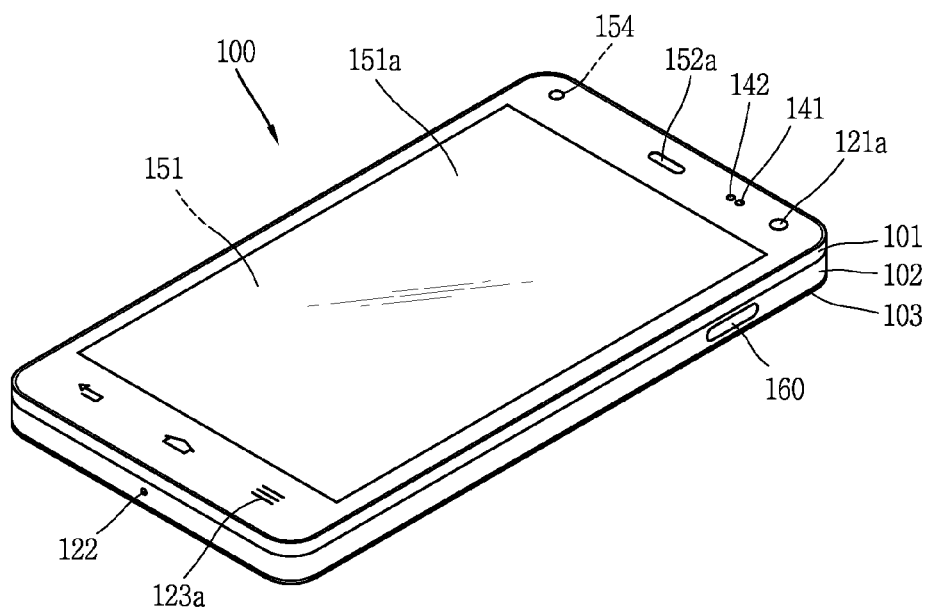
FIGS. 1B and 1C conceptual views in which an example of a mobile terminal associated with the present disclosure is seen from different directions.
Figure 1C:
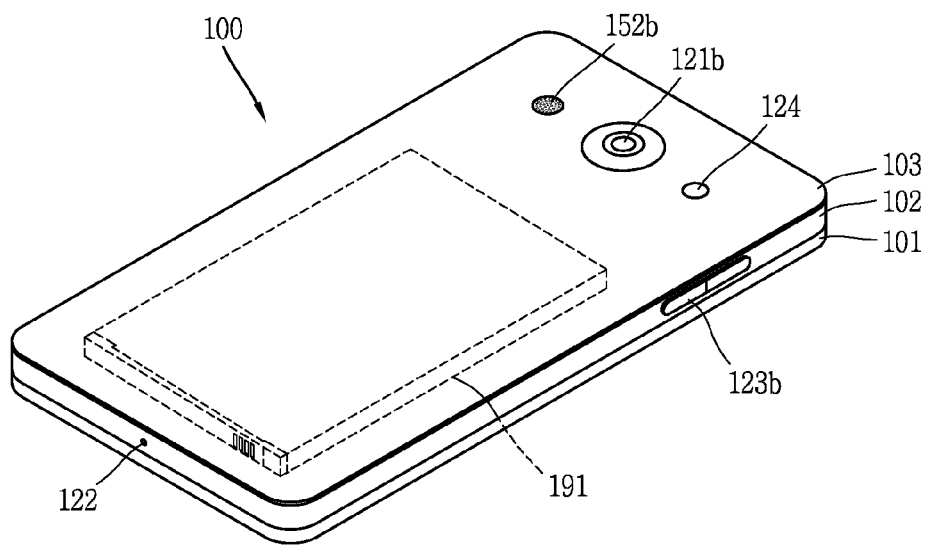

Reference is now made to FIGS. 1A-1C, where FIG. 1A is a block diagram of a mobile terminal in accordance with an embodiment of the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages. The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen. The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof. In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like. If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information. In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like. The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen. The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 typically controls the general operations of the mobile terminal 100. For example, the controller 180 can set or release a lock state for restricting a user from inputting a control command with respect to applications when a status of the mobile terminal meets a preset condition. The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display. The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, embodiments associated with a control method that can be implemented in a mobile terminal having the foregoing configuration will be described with reference to the accompanying drawings. It is obvious to those skilled in the art that the present features can be embodied in several forms without departing from the characteristics thereof.

Figure 2:
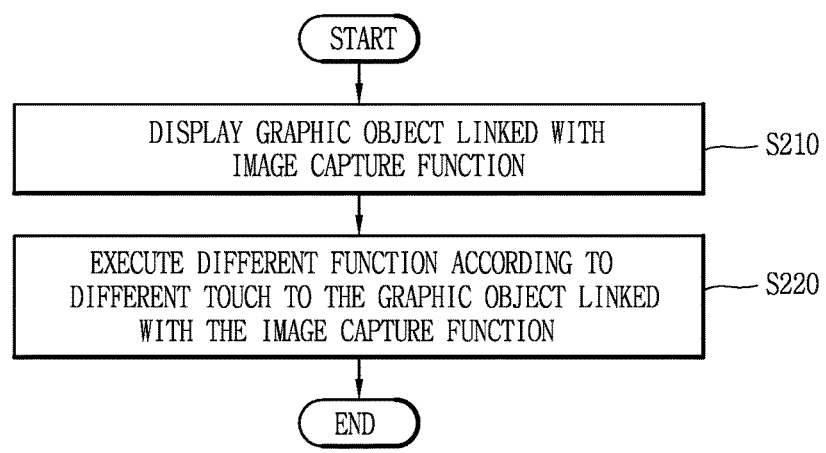
FIG. 2 is a flow chart illustrating a control method of providing an image capture function in linkage with a different function in a mobile terminal according to the present disclosure.
Figure 3A:
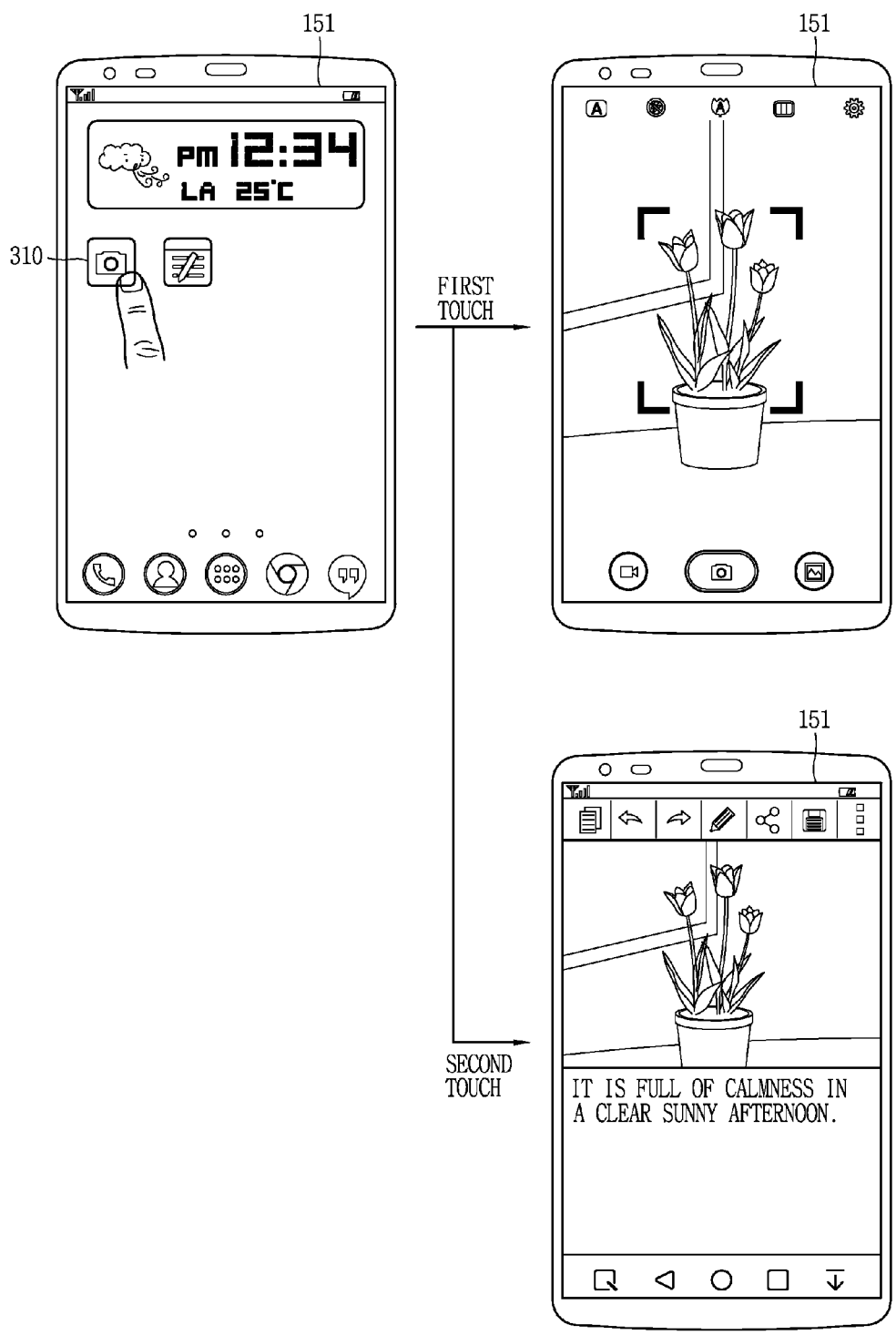
FIGS. 3A, 3B, 3C, 3D, 3E, 3F, 4A and 4B are conceptual views illustrating a method of providing an image capture function in linkage with a different function in a mobile terminal according to the present disclosure.

Hereinafter, a method of linking an image capture function with various functions using the captured image will be described. In particular, FIG. 2 is a flow chart illustrating a control method of providing an image capture function in linkage with a different function in a mobile terminal according to the present disclosure, and FIGS. 3A, to 4C are conceptual views illustrating a method of providing an image capture function in linkage with a different function in a mobile terminal according to the present disclosure.

Hereinafter, a method of linking an image capture function with various functions using the captured image in the capturing of an image through a camera provided in a mobile terminal will be described with reference to FIG. 2. First, a mobile terminal according to an embodiment of the present disclosure displays a graphic object linked with an image capture function on the display unit of the mobile terminal (S210).

A graphic object linked with an image capture function and a graphic object linked with a function associated with the captured image may be displayed on the display unit 151. The graphic object linked with the image capture function may be an icon or widget of an application having an image capture function. Furthermore, the graphic object linked with the function associated with the captured image may be an icon or widget of an application having a function associated with the captured image.

The icon may be a graphic object linked with a specific application. Here, the controller 180 can execute an application linked with the icon based on a touch applied to the icon. For example, the icon may be linked with an image capture function. Here, when the icon is selected, the controller 180 can execute the image capture function.

The widget corresponds to an application program for providing at least part of the function of an application linked with a widget on a home screen page or providing simple information associated with an application linked with the widget. Furthermore, the widget may be formed to execute a specific application linked with the widget. For example, the widget may be formed to execute an application having the image capture function.

Furthermore, the widget may immediately provide a function of the application linked with the widget on a home screen page without executing the application linked with the widget. For example, when the widget is linked with an image capture function, the widget may include a preview image received from the camera unit 121. In another example, when the widget is linked with a folder including at least one image, the widget may include at least part of a folder name, a representative image, and at least one image contained in a folder.

The image capture function may be a function of activating the camera unit 121, and receiving an image from the outside through the camera unit 121. The activation of the camera unit 121 may be an operation of supplying a current to the camera unit 121 to receive an image through the camera unit 121. On the contrary, the deactivation of the camera unit 121 may be an operation of blocking the supply of a current to the camera unit 121 not to receive an image through the camera unit 121.

Here, when the camera unit 121 is activated, the controller 180 can display an image received from the camera unit 121 on the display unit 151. Furthermore, when the camera unit 121 is deactivated, the controller 180 can not display an image received from the camera unit 121 on the display unit 151. The function associated with the captured image may be a function capable of using an image captured through the camera unit 121. More specifically, the function associated with the captured image may be a function of using an image captured through the camera unit 121 as input information, a function containing an image capture function on its own, and the like.

For example, the function associated with the captured image may be a function capable of using an image captured through the camera unit 121 such as a function of linking text or voice information with the captured image, a function of generating, editing and storing memo information along with the captured image, a function of transmitting the captured image to an external device, a function of uploading the captured image to an SNS server, a function of storing the captured image in linkage with the identification information of an external terminal, a function of storing the captured image in a preset folder, a function of searching a webpage using the analysis information of the captured image, and the like. In addition to the above examples, the present disclosure may be also applicable to various functions capable of using an image captured through the camera unit 121.

Further, a graphic object linked with the image capture function and a graphic object linked with the function associated with the captured image may be included in any one of a home screen page, an icon list page and a widget list page, and displayed on the display unit 151. As an idle screen of the mobile terminal, the home screen page may include an icon of an application installed in the mobile terminal, a folder containing at least one icon, a widget, and the like. The idle screen of the mobile terminal may be a screen provided to a user to execute at least one function installed in the mobile terminal.

The icon list page may be screen information for displaying an icon list containing at least one application icon installed in the mobile terminal. Furthermore, the widget list page may be screen information for displaying a widget list containing at least application widget installed in the mobile terminal. A graphic object linked with the image capture function may have either one of a first state in which only the image capture function is executed and a second state in which the image capture function and the function associated with the captured image are executed together. Here, the first state may be a state in which the image capture function is executable, and the second state may be a state in which the image capture function is executable in linkage with a function associated with the captured image.

Furthermore, a graphic object linked with the function associated with the captured image may have a first state in which only the function associated with the captured image is executed and a second state in which the function associated with the captured image and the image capture function are executed together. Here, the first state is a state in which the execution of a function associated with the captured image is allowed, and the second state is a state in which a function associated with the captured image is executable in linkage with an image capture function.

Here, the controller 180 can determine the display format of a graphic object linked with the image capture function and a graphic object linked with a function associated with the captured image based on the status information of the graphic object linked with the image capture function and the graphic object linked with a function associated with the captured image. The display format may be a visual appearance of the graphic object. Here, the controller 180 can change at least one of the size, color, shape and transparency of the graphic object to determine the display format.

Figure 3B:
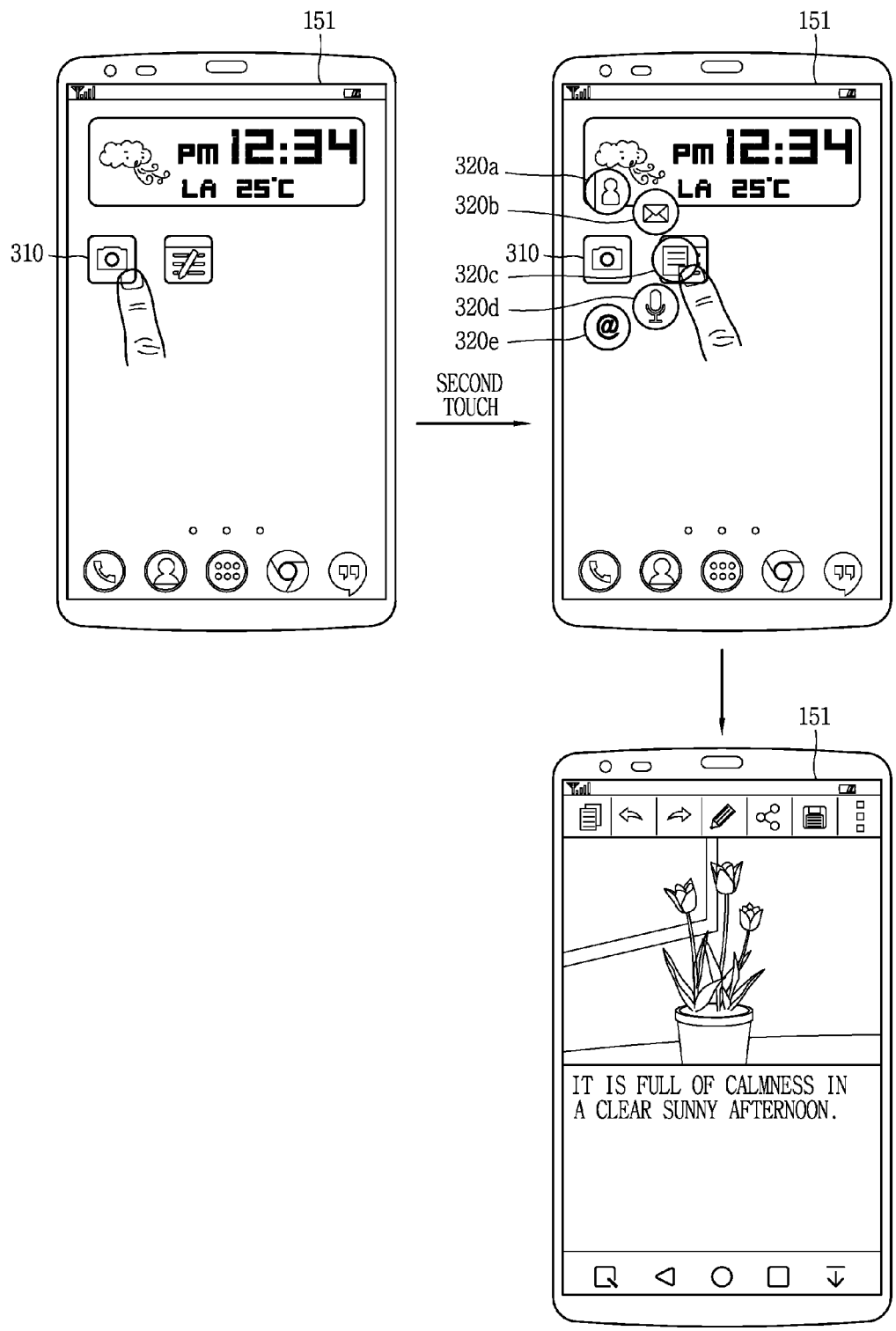
Figure 3C:
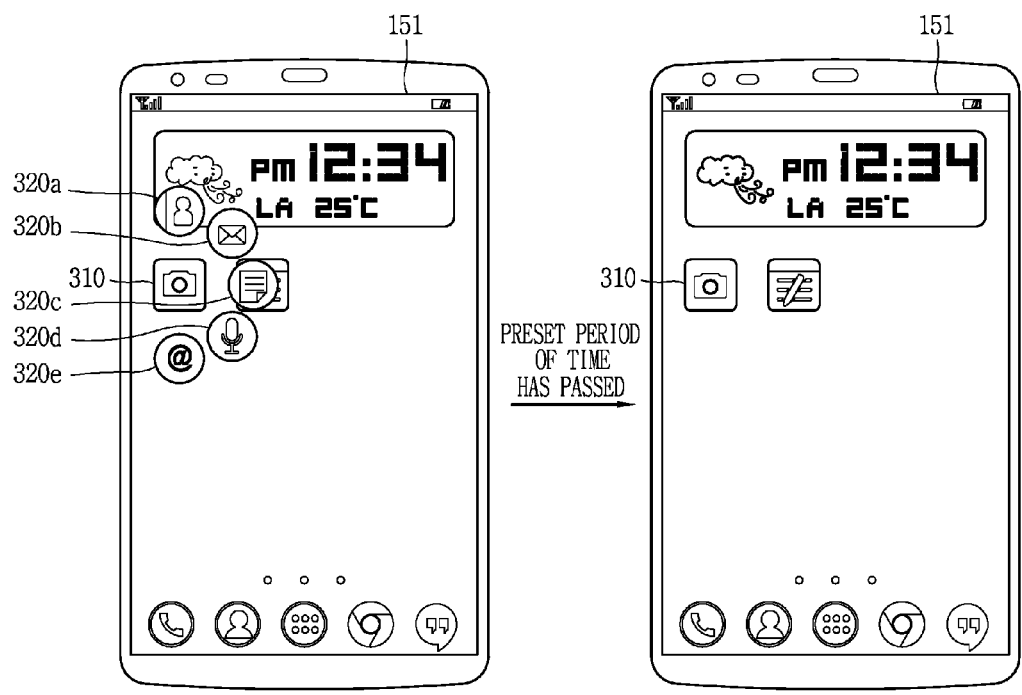
Figure 3D:
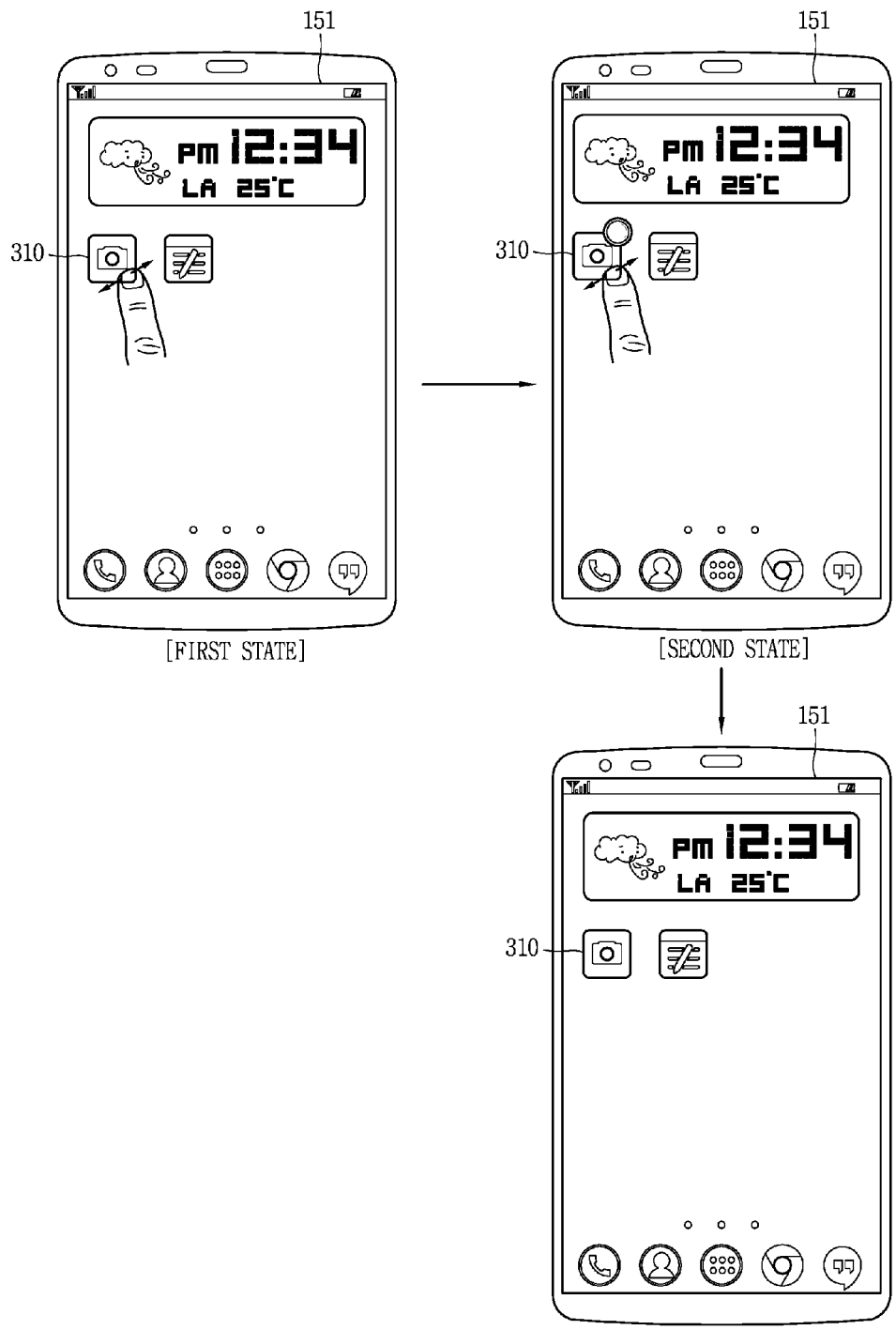

For example, as illustrated in the upper left drawing of FIG. 3D, when the graphic object 310 indicating the image capture function is in a first state, the controller 180 can display the graphic object 310 indicating the image capture function in a first display format. In another example, as illustrated in the upper right drawing of FIG. 3D, when the graphic object 310 indicating the image capture function is in a second state, the controller 180 can display the graphic object 310 indicating the image capture function in a second display format. Through this, the user can intuitively recognize the status of the graphic object 310 indicating the image capture function.

Moreover, when at least one of a graphic object linked with the image capture function and a graphic object linked with a function associated with the captured image does not sense a touch to the at least one of the graphic object linked with the image capture function and the graphic object linked with a function associated with the captured image for a preset period of time in a second state or senses a preset type of touch applied thereto, the controller 180 can restore the graphic object indicating the image capture function to a first state. For example, as illustrated in the lower right drawing of FIG. 3D, when a graphic object 310 linked with the image capture function does not sense a touch to the graphic object 310 linked with the image capture function for a preset period of time in a second state, the controller 180 can switch the graphic object 310 linked with the image capture function again to the first state, and display the graphic object 310 again in a first display format.

The mobile terminal according to an embodiment of the present disclosure executes a different function in response to a different touch applied to a graphic object linked with the image capture function when the graphic object linked with the image capture function is displayed on the display unit (S220). Further, the controller 180 can execute a different function in response to a different touch applied to a graphic object linked with the image capture function. The controller 180 can sense a different touch applied to a graphic object linked with the image capture function.

The type of touch applicable to a graphic object linked with the image capture function may include a short touch, a long touch, a drag touch, a pinch-in touch, a pinch-out touch, a multi-touch, a holding and drag touch mode, and the like. The holding and drag touch mode may denote applying a touch to a graphic object linked with the image capture function for more than a preset period of time and then applying a drag touch consecutive to the touch. For example, the holding and drag touch mode may be applying a touch to a graphic object linked with the image capture function for more than a preset period of time and then applying a plurality of drag touches having at least one of the left and right directions consecutive to the touch.

Furthermore, the controller 180 can determine the same touch mode as a different type of touch based on at least one of a direction in which the touch is applied, a time for which the touch has been sensed, a number of touches applied within a preset period of time, etc. For example, the controller 180 can determine a plurality of short touches being sensed within a preset period of time and one-time short touch being sensed as different touches. In another example, the controller 180 can determine a drag input in a first direction and a drag input in a second direction as different touches.

When a touch is applied to a graphic object linked with the image capture function, the controller 180 can determine a function corresponding to the touch. Here, a function corresponding to the determined touch may be configured by a user or previously programmed by a manufacturer of the mobile terminal. For example, when a function corresponding to the determined touch is configured by a user, the controller 180 can provide a user interface to configure a function that is executable by a touch. The user interface may be a software or physical device provided by the mobile terminal for the user to transmit or receive a control command between the mobile terminal and the user or provide a function of the mobile terminal to the user. According to an embodiment of the present disclosure, it may denote software or algorithm executed by the controller 180 and provided by the mobile terminal for the user.

In another example, when a function corresponding to the touch is configured by the manufacturer of the mobile terminal, the manufacturer of the mobile terminal may pre-program functions corresponding to the type of touch to provide the mobile terminal to a consumer. In this instance, the consumer is unable to configure functions corresponding to a type of touch unless an additional user interface is provided.

The controller 180 can execute a different function in response to a different touch applied to a graphic object indicating the image capture function. The different function may be an image capture function or a function of executing the image capture function and a function associated with the captured image in a linked manner. For example, as illustrated in the upper left drawing of FIG. 3A, when a first touch is applied to a graphic object linked with the image capture function, the controller 180 can execute only an image capture function through the camera unit 121. In this instance, even when an image is captured through the camera unit 121, the controller 180 can not link it with a different function associated with the captured image. In other words, the user may use only an image capture function of the mobile terminal.

When only the image capture function is executed, as illustrated in the upper right drawing of FIG. 3A, an execution screen of the image capture function is displayed on the display unit 151. The execution screen of the image capture function may include a preview image corresponding to an image received from the camera unit 121, and graphic objects indicating a function associated with the capture. The preview image may denote an image prior to capturing an image received from the camera unit 121. A graphic object indicating a function associated with the capture may be a graphic object indicating a captured brightness control function, a front or rear camera switch function, an exposure control function or the like.

Furthermore, the controller 180 can execute any one of executing the image capture function and the function associated with the captured image in a linked manner, providing an icon indicating a function associated with the captured image, and changing the status of the graphic object to a state in which the image capture function and a function associated with the captured image can be executed together in response to a second touch to the graphic object linked with the image capture function. Which function is to be executed by the controller 180 can be pre-configured by the manufacturer of the mobile terminal when shipped out of the factory or configured by the user.

First, the controller 180 can execute the image capture function and a function associated with the captured image in a linked manner in response to a second touch applied to a graphic object linked with the image capture function. The second touch corresponds to various type of touches. For example, the controller 180 can execute the image capture function and a function associated with the captured image in a linked manner in response to a holding and drag input applied to a graphic object linked with the image capture function. Here, a drag input of the holding and drag input may be a drag input moving in a vertical direction with respect to a graphic object linked with the image capture function. In another example, the controller 180 can execute the image capture function and a function associated with the captured image in a linked manner in response to a drag input moving in a vertical direction with no holding input to a graphic object linked with the image capture function.

The execution of the image capture function and a function associated with the captured image in a linked manner may denote the execution of the image capture function and the function associated with the captured image together. Furthermore, the execution of the image capture function and a function associated with the captured image in a linked manner may denote controlling an image captured through the image capture function to be processed using a function associated with the captured image. In other words, when the image capture function and a function associated with the captured image are executed in a linked manner, the controller 180 can process an image captured through the image capture function and information received through the function associated with the captured image in a linked manner.

For example, when the function associated with the captured image is a memo function for generating and storing memo function as shown in lower right drawing in FIG. 3A, the controller 180 can use an image captured through the image capture function as the input information of the memo function. In this instance, the controller 180 can generate memo information containing the captured image. In another example, the function associated with the captured image is a message transmission function, the controller 180 can use an image captured through the image capture function as the input information of the message transmission function. In this instance, the controller 180 can transmit the captured image to an external terminal as a message.

Furthermore, when the image capture function and a function associated with the captured image are executed in a linked manner, the controller 180 can control the function associated with the captured image based on a control command to the image capture function. For example, when the function associated with the captured image is a voice recognition function, the controller 180 can activate the voice recognition function based on a preset type of touch applied to a preview image of the image capture function.

In addition, the controller 180 can activate the voice recognition function and then link the received voice with the captured image. At the same time, the controller 180 can generate link information indicating that the received voice and the captured image are linked with each other and store it in the memory unit 170.

Furthermore, when the image capture function and a function associated with the captured image are executed in a linked manner, the controller 180 can generate and store link information in which an image captured through the image capture function is linked with a function associated with the captured image or generate and store link information in which information generated through the function associated with the captured image is linked with the captured image. Furthermore, when the image capture function and a function associated with the captured image are executed in a linked manner, the controller 180 can generate and store link information in which a plurality of images captured through the image capture function are linked with each other.

The link information may be information indicating that they can be processed between information, between information and a function, and between functions in a linked manner. For example, the link information may indicate that at least two images can be processed in a linked manner with each other. Furthermore, the link information may indicate that an image and a memo function for generating memo information using the image as an input can be processed in a linked manner with each other.

Here, the controller 180 can execute either one of a captured image and a function associated with the captured image using another one thereof based on the link information. For example, when a display request for either one image is applied, the controller 180 can display the either one image and another image linked therewith together on the display unit 151. In another example, when link information is linked with the captured image, the controller 180 can execute a function linked with the captured image based on link information linked with the captured image. Through this, when the user executes a specific function or use specific information, he or she may receive the specific function and a function associated with specific information together.

When a second touch is applied to a graphic object indicating the image capture function, the controller 180 can immediately execute the image capture function and a function associated with the captured image in a linked manner, display a graphic object linked with at least one function associated with the captured image, or switch the status of a graphic object indicating the image capture function. It may be pre-configured on the mobile terminal or configured by the user.

First, when a second touch is applied to a graphic object indicating the image capture function, the controller 180 can immediately execute the image capture function and a function associated with the captured image in a linked manner. When the image capture function and a function associated with the captured image are immediately executed, an execution screen of the image capture function and an execution screen of the function associated with the captured image may be displayed together. Here, the controller 180 can control the display unit 151 to include a first region in which the execution screen of the image capture function is displayed and a second region in which the execution screen of the function associated with the captured image is displayed on the display unit 151.

Furthermore, the controller 180 can display a graphic object linked with a function associated with the captured image on the display unit 151 in response to a second touch applied to a graphic object linked with the image capture function. For example, as illustrated in the first and the second drawing of FIG. 3B, the controller 180 can display icons 320a, 320b, 320c, 320d, 320e linked with a function associated with the captured image in a region adjacent to a region displayed with the graphic object 310 linked with the image capture function in response to a second touch applied to the graphic object 310 linked with the image capture function.

Here, the controller 180 can execute a function linked with any one 320c of the icons 320a, 320b, 320c, 320d, 320e linked with the function associated with the captured image and the image capture function in a linked manner in response to the any one icon 320c. For example, as illustrated in the third drawing of FIG. 3B, the controller 180 can execute a memo function and an image capture function together in response to a touch to the icon 320c linked with the memo function among the icons 320a, 320b, 320c, 320d, 320e linked with a function associated with the captured image when the icons 320a, 320b, 320c, 320d, 320e linked with the function associated with the captured image are displayed.

Further, when a control command is not sensed within a preset period of time, the icons 320a, 320b, 320c, 320d, 320e linked with the function associated with the captured image may disappear on the display unit 151. For example, as illustrated in the first and the second drawing of FIG. 3C, when a touch is not sensed for a preset period of time when the icons 320a, 320b, 320c, 320d, 320e linked with a function associated with the captured image are displayed, the controller 180 can allow the icons 320a, 320b, 320c, 320d, 320e linked with the function associated with the captured image to disappear on the display unit 151.

Furthermore, the controller 180 can switch the status of a graphic object linked with the image capture function in response to a second touch applied to the graphic object linked with the image capture function. The status of the graphic object linked with the image capture function may be in either one of a first state and a second state as described above. The second touch may be a holding and drag touch, a drag touch, a multi-drag touch, and a multi-touch. During the holding and drag touch, the drag touch may be a drag touch moving in a vertical direction with respect to a graphic object linked with the image capture function. The multi-drag touch may be a touch in which a drag touch is applied to at least two regions. The multi-touch may be a touch being applied to at least two regions together.

The controller 180 can switch a first state to a second state in response to a second touch applied to a graphic object linked with an image capture function in the first state. Here, the visual appearance of the graphic object may be varied. For example, as illustrated in the first drawing of FIG. 3D, when the graphic object 310 linked with the image capture function is in a first state, the controller 180 can display the graphic object linked with the image capture function in a first display format.

When the graphic object 310 linked with the image capture function is in a first state, the controller 180 can switch the graphic object linked with the image capture function to a second state in response to a second touch applied to the graphic object 310 linked with the image capture function. Here, as illustrated in the second drawing of FIG. 3D, the controller 180 can display a graphic object linked with the image capture function in a second display format to indicate the graphic object linked with the image capture function is in a second state. In this instance, the controller 180 can execute the image capture function and a function associated with the captured image in a linked manner in response to a first touch applied to the graphic object in the second state. Similarly, the controller 180 can execute only the image capture function based on a first touch to the graphic object in the first state.

Further, the controller 180 can select a graphic object linked with the image capture function and a graphic object linked with a function associated with the captured image together, thereby executing the image capture function and the function associated with the captured image in a linked manner.

In order to select a graphic object linked with the image capture function and a graphic object linked with a function associated with the captured image together, the controller 180 can move the graphic object linked with the image capture function to a region displayed with the graphic object linked with the function associated with the captured image or apply a touch the graphic object linked with the image capture function and the graphic object linked with the function associated with the captured image together.

Figure 3E:
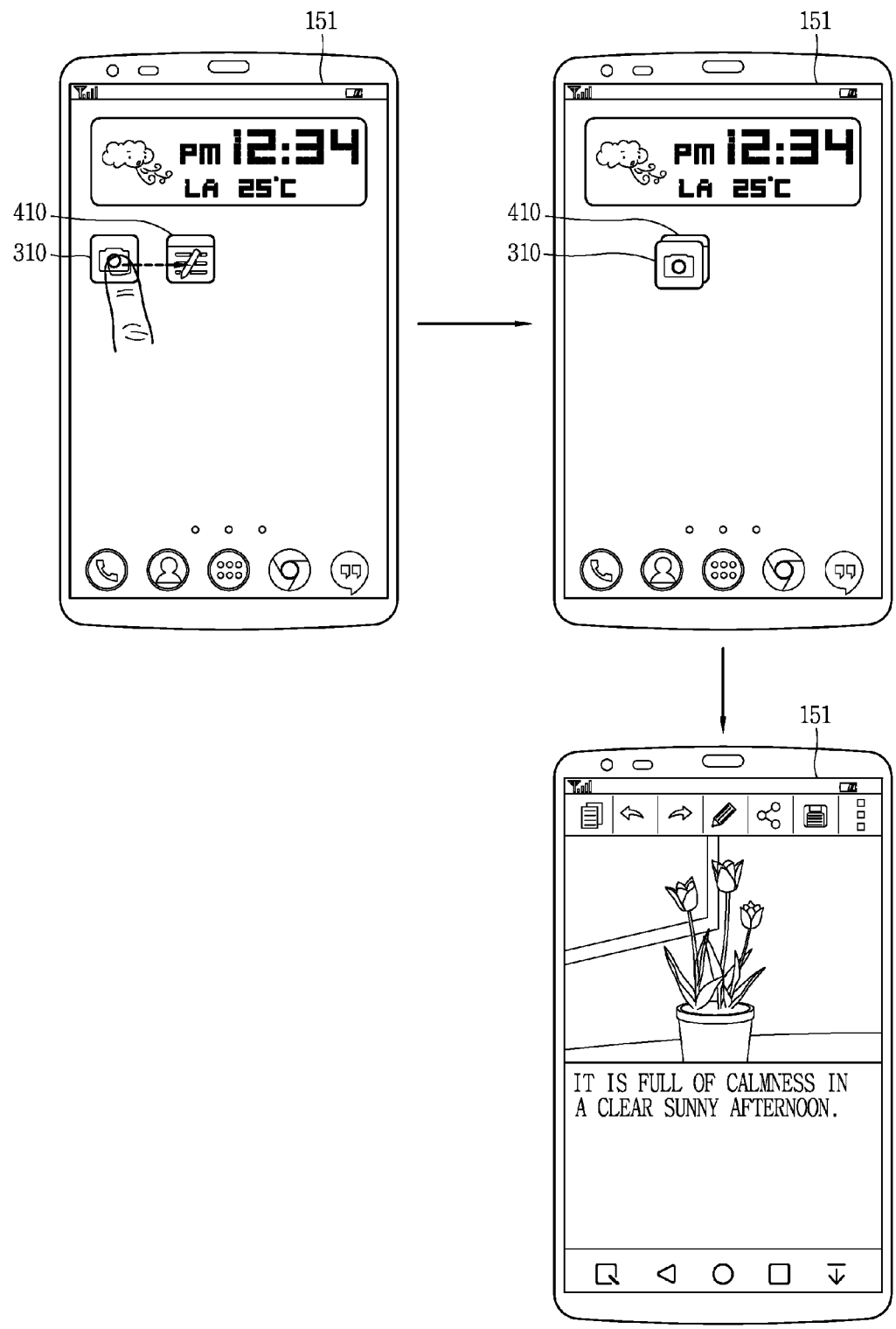

For example, as illustrated in the first drawing of FIG. 3E, a graphic object 310 linked with the image capture function and a graphic object 410 linked with a function associated with the captured image may be displayed on the display unit 151. Here, the controller 180 can move the graphic object 310 linked with the image capture function based on a drag touch.

The controller 180 can stop the movement of the graphic object 310 linked with the image capture function when the drag touch is no longer sensed. Furthermore, the controller 180 can detect the location of the graphic object 310 linked with the image capture function at a time point at which the drag touch is no longer sensed.

Furthermore, when the drag touch is no longer sensed, the controller 180 can execute the image capture function and the function associated with the captured image in a linked manner. Here, the function associated with the captured image may be a function displayed on a location corresponding to a display location of the graphic object 310 linked with the image capture function at a time point at which the drag touch is no longer sensed. For example, as illustrated in the second drawing of FIG. 3E, the controller 180 can display the graphic object 410 linked with a function associated with the captured image on a graphic object displayed on a location corresponding to the graphic object 310 linked with the image capture function. In this instance, as illustrated in the third drawing of FIG. 3E, the controller 180 can executed the image capture function and the memo function in a linked manner.

Furthermore, the controller 180 can apply a touch to a graphic object linked with a function associated with the captured image while at the same time applying a touch to a graphic object linked with the image capture function to execute the image capture function and the function associated with the captured image in a linked manner. For example, when a touch to the graphic object linked with a function associated with the captured image is sensed when a touch is applied to the graphic object linked with the image capture function, the controller 180 can execute the image capture function and the function associated with the captured image in a linked manner.

Furthermore, on an icon list page or widget list page, the controller 180 can link at least one of a plurality of graphic objects included on the icon list page with the image capture function to switch it to an executable state based on a preset type of touch applied to a graphic object linked with the image capture function.

In other words, the controller 180 can switch the at least one graphic object from a first state in which a function linked with the at least one graphic object, respectively, is executed to a second state in which the image capture function is executable to be linked therewith. Here, the first state may denote a state in which only a specific function of the at least one graphic object can be executed in response to an execution command applied to the at least one graphic object. For example, when a graphic object linked with a memo function is in a first state, the controller 180 can execute only the memo function in response to a touch applied to the graphic object linked with the memo function.

On the contrary, the second state may denote a state in which a function linked with the at least one graphic object is executable in linkage with the image capture function in response to an execution command applied to the at least one graphic object. For example, when the graphic object linked with a memo function is in a second state, the controller 180 can execute the memo function in linkage with the image capture function in response to a touch applied to the graphic object linked with the memo function.

The controller 180 can extract at least one of a plurality of graphic objects included on the icon list page in response to a preset type of touch applied to a graphic object linked with the image capture function on the icon list page or widget list page. More specifically, the controller 180 can extract at least one graphic object located in the direction of a flicking touch based on the display location of a graphic object linked with the image capture function among the plurality of graphic objects based on the direction of the flicking touch to a graphic object linked with the image capture function.

Figure 3F:
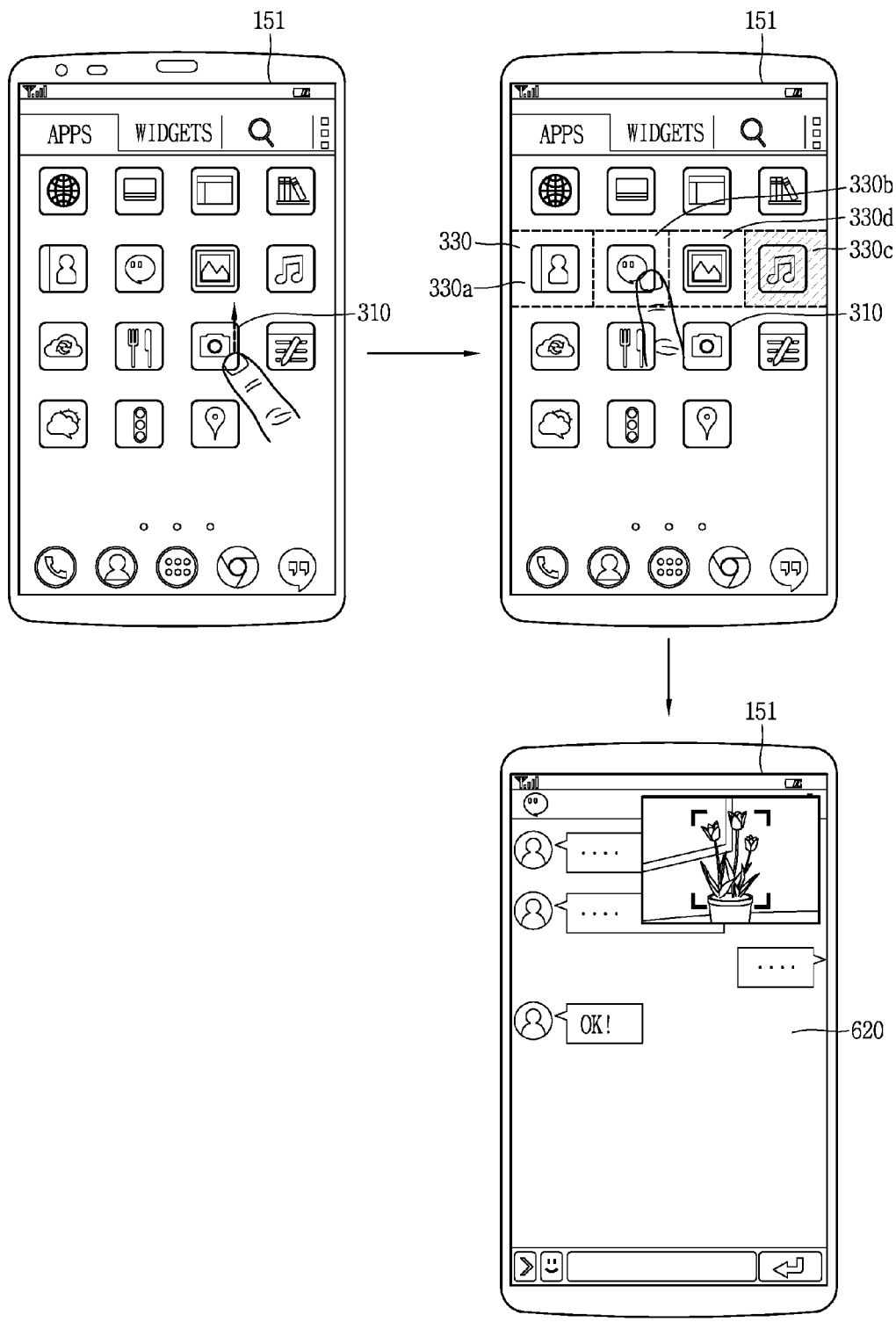

For example, as illustrated in the first and the second drawing of FIG. 3F, when a flicking touch in an upward direction from the bottom is applied based on the location of a graphic object linked with the image capture function, the controller 180 can extract at least one graphic object 330a, 330b, 330c, 330d from the graphic objects located at the upper side based on the display location of the graphic object linked with the image capture function.

Subsequent to extracting the at least one graphic object, the controller 180 can extract one or more graphic objects 330a, 330b, 330c that are executable in linkage with the image capture function from the at least one graphic object 330a, 330b, 330c, 330d. Here, the controller 180 can switch the one or more graphic objects 330a, 330b, 330c from a first to a second state. Furthermore, the controller 180 can not switch the graphic object 330d linked with a function that is non-executable in linkage with the image capture function to a second state.

The function that is non-executable in linkage with the image capture function may be a function in which the image capture function is not provided on its own or a function in which the captured image is not available for input information. For example, as illustrated in the second drawing of FIG. 3F, the controller 180 can switch the graphic object 330a linked with a contact function, the graphic object 330b linked with a message transmission function and the graphic object 330c linked with an image providing function to a second state, but not switch the graphic object 330d linked with a music play function to the second function.

Further, though at least one graphic object is extracted based on the direction of a flicking touch in the foregoing description, the present disclosure may extract at least one graphic object to be linked with the image capture function based on the attribute information of a function linked with a plurality of graphic objects included on the icon list page or widget list page. The attribute information may be information on whether or not each function is executable in linkage with the image capture function. For example, the attribute information may be information indicating a function for receiving an image captured through the camera unit 121 as an input or information indicating a function capable of executing the image capture function on its own.

In this instance, the controller 180 can extract at least one of a plurality of graphic objects included on the icon list page or widget list page based on the attribute information regardless of the direction of the flicking touch. When the extracted at least one graphic object is switched to a second state, the controller 180 can display the extracted at least one graphic object to be visually distinguished from the remaining graphic objects of the plurality of graphic objects. More specifically, the controller 180 can change at least one of the brightness, color, highlight, size and transparency of the extracted at least one graphic object to display it to be visually distinguished from the remaining graphic objects of the plurality of graphic objects.

Furthermore, the controller 180 can display a graphic object switched to a second state and a graphic object that is not switched to the second state among the extracted at least one graphic object to be visually distinguished from each other. For example, as illustrated in the second drawing of FIG. 3F, the controller 180 process the brightness of the extracted at least one graphic object 330*a*, 330*b*, 330*c*, 330*d* to display them to be visually distinguished from the remaining graphic objects of the plurality of graphic objects. Here, the graphic object 330*d* that is not switched to a second state among the at least one graphic object 330*a*, 330*b*, 330*c*, 330*d* may have a different brightness level to be displayed in a visually distinguished manner.

Subsequent to extracting the at least one graphic object, the controller 180 can execute a function linked with any one graphic object in linkage with the image capture function in response to a touch applied to the any one graphic object of the at least one graphic object. For example, when a function associated with the any one graphic object is a message transmission function, as illustrated in the third drawing of FIG. 3F, the controller 180 can execute the message transmission function and the image capture function together to transmit an image captured through the image capture function to an external terminal as a message.

Further, when a touch to the at least one graphic object is not sensed for a preset period of time, the controller 180 can switch the at least one graphic object that has been switched to a second state again to a first state.

In the above, a method of executing an image capture function and a function associated with the captured image in a linked manner through a graphic object linked with the image capture function has been described. Hereinafter, a method of executing an image capture function and a function associated with the captured image in a linked manner through a graphic object linked with the function associated with the captured image will be described.

A mobile terminal according to an embodiment of the present disclosure can execute an image capture function and a function associated with the captured image in a linked manner using a graphic object linked with the function associated with the captured image. Here, the same method as that of using a graphic object linked with the image capture function in the above may be also applicable to a method of executing the image capture function and the function associated with the captured image in a linked manner using a graphic object linked with the function associated with the captured image.

In other words, a method of executing the image capture function and the function associated with the captured image in a linked manner using a graphic object linked with the function associated with the captured image may be applicable to various methods such as a method of applying a preset type of touch to a graphic object linked with the function associated with the captured image, a method of switching the status of a graphic object linked with the function associated with the captured image, and the like.

Hereinafter, when the function associated with the captured image is a memo function will be described. However, the present disclosure is not limited to this, and the present disclosure is also applicable to all the foregoing functions associated with the captured image.

Figure 4A:
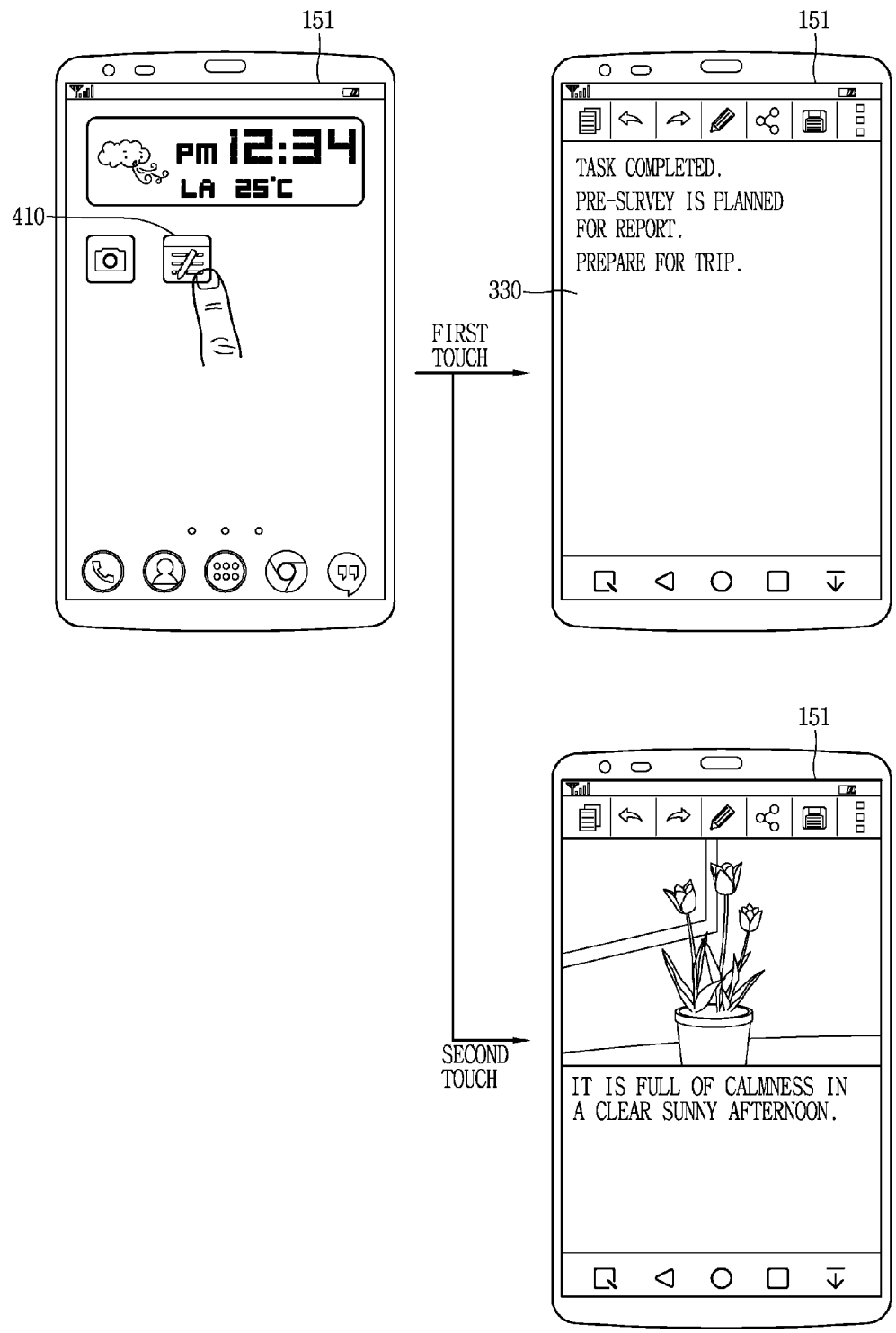

For example, as illustrated in the first drawing of FIG. 4A, the controller 180 can execute a different function in response to a different touch applied to the graphic object 410 linked with the memo function. More specifically, as illustrated in the second drawing of FIG. 4A, the controller 180 can execute only a memo function in response to a first touch applied to the graphic object 410 linked with the memo function. The first touch may be a short touch.

On the contrary, as illustrated in the third drawing of FIG. 4A, the controller 180 can execute the memo function and the image capture function in a linked manner in response to a second touch applied to the graphic object 410 linked with the memo function. The second touch may be a drag input moving in a vertical or horizontal direction based on a region displayed with the graphic object 410 linked with the memo function.

Figure 4B:
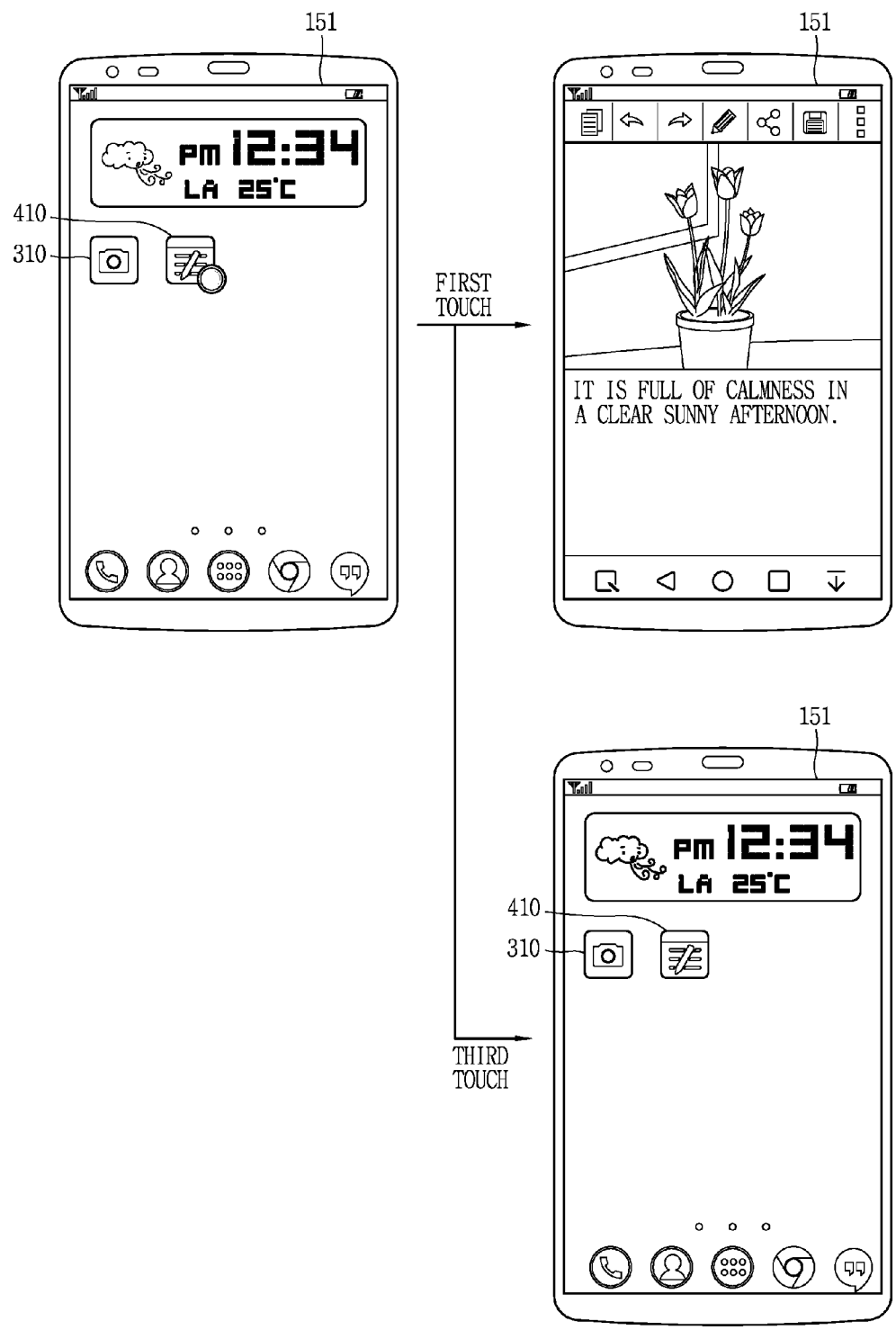

In another example, as illustrated in the first drawing of FIG. 4B, the controller 180 can switch the graphic object 410 linked with the memo function from a first state to a second state in response to a preset type of touch applied to the graphic object 410 linked with the memo function. The preset type of touch may be a holding and drag input or a drag input having a preset movement. The drag input having a preset movement may be a drag input moving in a vertical or horizontal direction based on a region displayed with the graphic object 410 linked with the memo function.

The first state may denote a state in which only a specific function of the graphic object 410 linked with the memo function is executable in response to a touch applied to the graphic object 410 linked with the memo function. The specific function of the graphic object 410 linked with the memo function may be a memo function.

On the contrary, the second state may denote a state in which a function of the graphic object 410 linked with the memo function is executable in linkage with the image capture function in response to an execution command applied to the graphic object 410 linked with the memo function. The specific function of the graphic object 410 linked with the memo function may be a memo function. For example, as illustrated in the second drawing of FIG. 4B, the controller 180 can execute the memo function in linkage with the image capture function in response to a touch applied to the graphic object 410 linked with the memo function.

The status of the graphic object 410 linked with the memo function may be configured by the user. For example, the controller 180 can switch the graphic object 410 linked with the memo function from a first state to a second state or from a second state to a first state based on a preset type of touch applied to the graphic object 410 linked with the memo function. The preset type of touch may be a holding and drag touch or a drag touch moving in a vertical direction on a region displayed with the graphic object 410 linked with the memo function.

Furthermore, when a control command to the graphic object 410 linked with the memo function is not sensed within a preset period of time while the graphic object 410 linked with the memo function is in a second state, the controller 180 can switch the graphic object 410 linked with the memo function to a first state.

The controller 180 can change a visual appearance of the graphic object 410 linked with the memo function based on the status information of the graphic object 410 linked with the memo function. For example, as illustrated in the first drawing of FIG. 4B, when the graphic object 410 linked with the memo function is in a second state, the controller 180 can display the graphic object 410 linked with the memo function in a second display format. Furthermore, as illustrated in the third drawing of FIG. 4B, when the graphic object 410 linked with the memo function is in a first state, the controller 180 can display the graphic object 410 linked with the memo function in a first display format.

In the above, a method of executing an image capture function and a function associated with the captured image in a linked manner has been described. Through this, the present disclosure provides a method of executing the image capture function as well as the function associated with the captured image together through the camera unit 121 to use the captured image while at the same time capturing the image.

Figure 5:
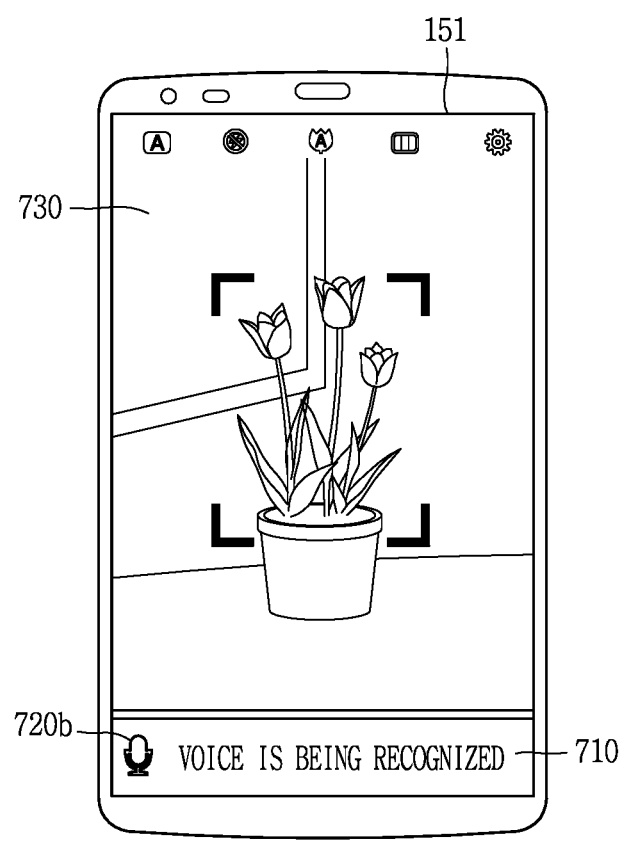
FIGS. 5, 6 and 7 are conceptual views illustrating a method of executing the image capture function and the function associated with the captured image in a linked manner.
Figure 6:
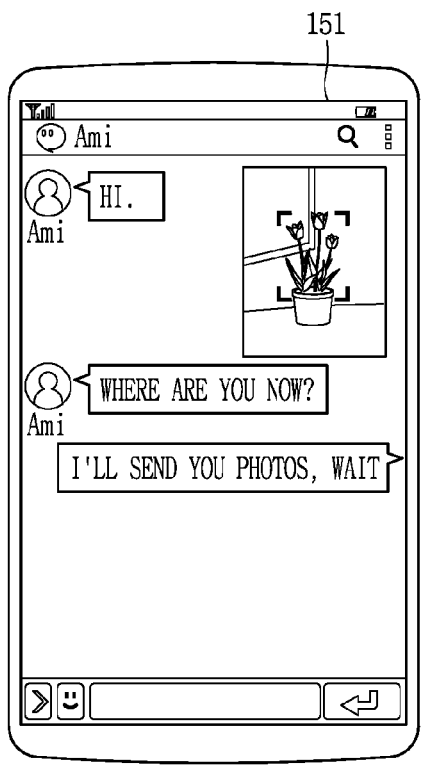
Figure 7:
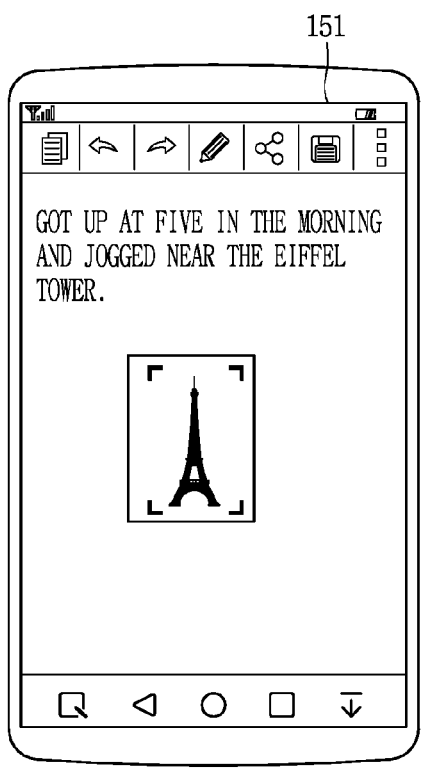

Hereinafter, a method of executing the image capture function and a function associated with the captured image in a linked manner will be described. FIGS. 5-7 are conceptual views illustrating a method of executing the image capture function and the function associated with the captured image in a linked manner. When an image capture function and a function associated with the captured image are executed in a linked manner, the controller 180 can provide an execution screen of the image capture function and an execution screen of the function associated with the captured image together.

Here, the controller 180 can display an execution screen of the image capture function and an execution screen of the function associated with the captured image in different regions or in an overlapping manner. Whether to display an execution screen of the image capture function and an execution screen of the function associated with the captured image in different regions or in an overlapping manner may be configured in advance by the user or when shipped out of the factory.

First, when an execution screen of the image capture function and an execution screen of the function associated with the captured image are displayed in different regions, the controller 180 can control the display unit 151 to include a first region for displaying the execution screen of the image capture function and a second region for displaying the execution screen of the function associated with the captured image.

In addition, the controller 180 can configure the size of the first and the second region based on a user's control command or a preset condition. For example, the controller 180 can change the size of at least one of the first and the second region based on a user's touch to either one boundary region of the first and the second region. In another example, the controller 180 can change the size of at least one of the first and the second region based on a user's touch to either one boundary region of the first and the second region.

The preset condition may be a condition for the function associated with the captured image. The condition for the function associated with the captured image may be a condition for the output mode of information associated with the function associated with the captured image. The output mode may be either one of a visual mode and an auditory mode. For example, a voice recognition function may provide information through voice with no control through the execution screen of the voice recognition function. In other words, the voice recognition function may use a method of outputting information in an auditory manner. In another example, the memo function may display memo information (for example, text information, image information) or the like on the execution screen to provide it to the user. In other words, the memo function may use a method of outputting information in a visual manner.

Here, the controller 180 can control the size of the first region and the size of the second region according to the output mode. More specifically, when the function associated with the captured image uses an auditory output mode, the controller 180 can configure the size of the first region to be less than that of the second region, and display only minimum information indicating the function associated with the captured image on the second region. For example, as illustrated in FIG. 5, a preview image received from the camera unit 121 may be displayed on the first region, and only minimum information indicating that a voice recognition function is being executed on the second region.

On the contrary, when the function associated with the captured image uses a visual output mode, the controller 180 can control the display unit 151 such that the sizes of the first and the second region are the same. For example, as illustrated in the third drawing of FIG. 3A, when the function associated with the captured image is a memo function, the sizes of a first region displayed a preview image and a second region displayed with an execution screen of the memo function are the same.

In other words, when the function associated with the captured image does not include information required for a visual output, the present disclosure can provide a camera preview image on a large output region. Through this, when the execution screens of the function associated with the captured image and the image capture function are provided at the same time, the present disclosure can provide each execution screen to a user in a suitable form in consideration of the user's needs.

Furthermore, when the image capture function and the function associated with the captured image are executed in a linked manner, the controller 180 can display the execution screen of the image capture function on the execution screen of the function associated with the captured image in an overlapping manner. For example, as illustrated in FIG. 6, the controller 180 can display the execution screen of the image capture function in one region of the execution screen of the function associated with the capture.

The execution screen of the image capture function displayed in an overlapping manner may be displayed in the form of a popup window. Furthermore, the controller 180 can change at least one of the display size and display location based on a touch applied to the execution screen of the image capture function displayed in an overlapping manner. For example, the controller 180 can change the display location to a location corresponding to the drag touch in response to a drag touch applied to the execution screen of the image capture function displayed in an overlapping manner.

Furthermore, the controller 180 can determine the display location of an execution screen of the image capture function based on a preset condition. The preset condition may be a condition associated with a region of interest on the execution screen of the function associated with the captured image. The region of interest may be a region in which information is displayed on the execution screen of the function associated with the captured image or a region in which a recent message is displayed on the execution screen of the function associated with the captured image.

For example, as illustrated in FIG. 6, when the execution screen of the function associated with the captured image is a message transmission function, the controller 180 can display an execution screen of the image capture function on a region excluding the region in which messages recently transmitted to and received from an external terminal are displayed. In other words, the present disclosure can determine a region displayed with a recent message as a region of interest required to be provided to a user, and provide it along with the execution screen of the image capture function.

Furthermore, when messages on the execution screen of a message transmission function are scrolled, the controller 180 can change the display format (for example, display size, display location, display shape, etc.) of the content of messages such that the content of messages on the execution screen of the message transmission function does not overlap with that of the execution screen of the image capture function.

More specifically, when the messages are scrolled, at least part of the messages may overlap with the execution screen of the image capture function. In this instance, the controller 180 can control the display unit 151 such that the overlapped at least part of the messages are displayed in a region that does not overlap with the execution screen of the image capture function. For example, the controller 180 can display the content of the message over several lines to display the content of the overlapped at least part of the messages in a region that does not overlap with the execution screen of the image capture function.

Furthermore, when messages on the execution screen of a message transmission function are scrolled, the controller 180 can move the execution screen of the image capture function such that the content of messages on the execution screen of the message transmission function does not overlap with the execution screen of the image capture function. For example, when messages on the execution screen of a message transmission function are scrolled, the controller 180 can move the execution screen of the image capture function to a region that does not overlap with the content of the messages in a region excluding the region of interest. Through this, even when the execution screens of the image capture function and the function associated with the captured image are provided at the same time, the present disclosure can provide all the execution screens, respectively, to the user in a suitable form.

In another example, as illustrated in FIG. 7, when the execution screen of a function associated with the captured image is a memo function, the controller 180 can display an execution screen of the image capture function on a region excluding the region displayed with memo information on the execution screen of the memo function.

Further, the controller 180 can change a state in which an execution screen of the image capture function and an execution screen of the function associated with the captured image are being displayed on different regions to a state in which the execution screen of the function associated with the captured image is displayed on the execution screen of the image capture function in an overlapping manner based on a user's request. Furthermore, the controller 180 can change a state in which an execution screen of the function associated with the captured image is displayed on an execution screen of the image capture function in an overlapping manner to a state in which the execution screen of the image capture function and the execution screen of the function associated with the captured image are being displayed on different regions based on a user's request.

For example, the controller 180 can display the image capture function on a first region such that the execution screen of the image capture function does not overlap with the execution screen of the function associated with the captured image and display the execution screen of the function associated with the captured image in a second region in response to a preset type of touch applied to the execution screen of the image capture function when the image capture function is displayed on the execution screen of the function associated with the captured image in an overlapping manner.

In the above, a method of executing an image capture function and a function associated with the captured image in a linked manner has been described. Through this, when the image capture function and the function associated with the captured image are executed in a linked manner, the present disclosure provides an execution screen of the image capture function in a suitable form according to the function associated with the captured image.

Figure 8A:
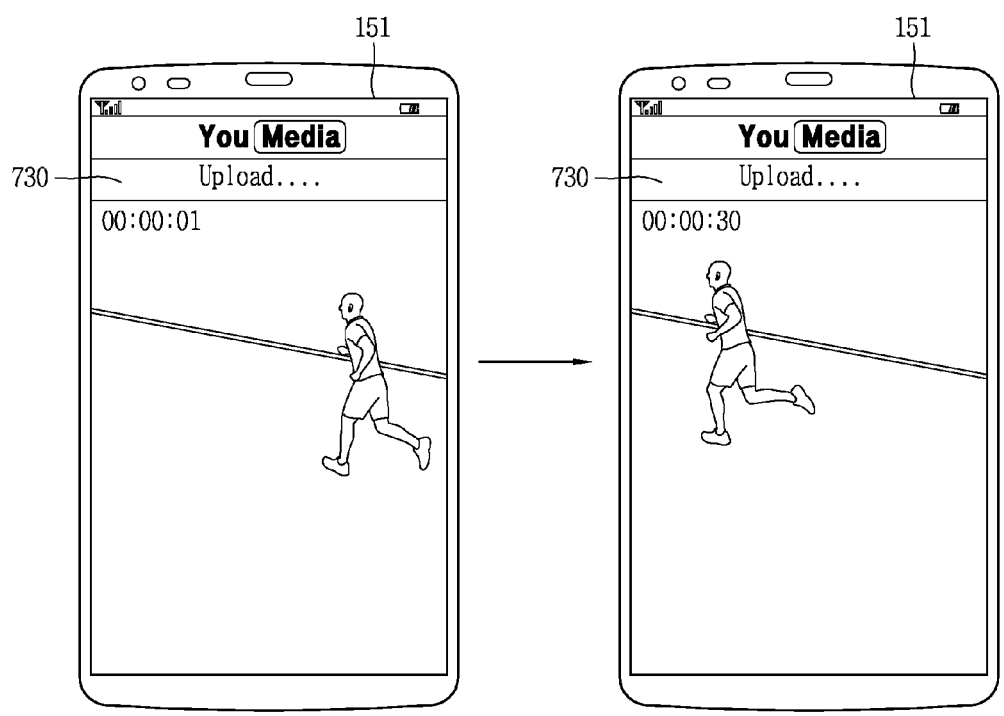
FIGS. 8A and 8B are conceptual views illustrating a method of providing an image capture function to have a different setting value based on a function associated with the captured image when the image capture function and the function associated with the captured image are executed in a linked manner.
Figure 8B:
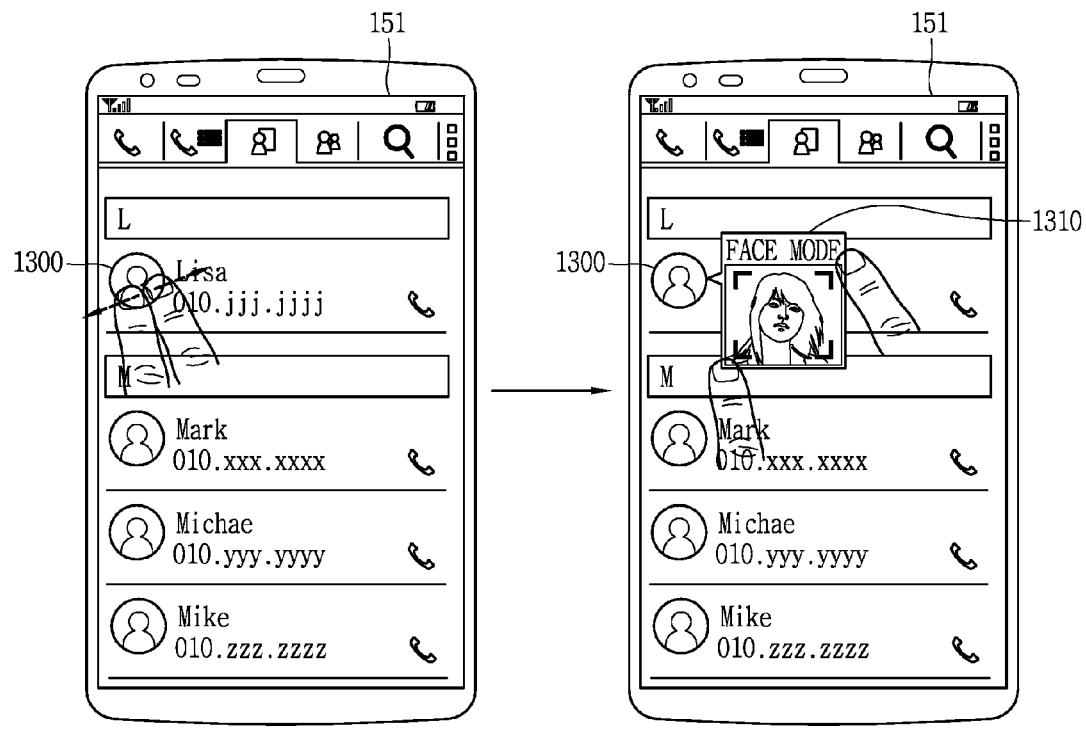

Hereinafter, a method of providing an image capture function to have a different setting value based on a function associated with the captured image when the image capture function and the function associated with the captured image are executed in a linked manner will be described. In particular, FIGS. 8A and 8B are conceptual views illustrating a method of providing an image capture function to have a different setting value based on a function associated with the captured image when the image capture function and the function associated with the captured image are executed in a linked manner.

When an image capture function and a function associated with the captured image are executed in a linked manner, the controller 180 of the mobile terminal according to an embodiment of the present disclosure can use an image captured through the image capture function as the input information of the function associated with the captured image.

In this instance, the controller 180 can configure the configuration status of the image capture function to have a preset setting value such that an image captured through the image capture function is immediately used for the input information of the function associated with the captured image. More specifically, the controller 180 can execute the image capture function to have a different setting value based on the type of a function associated with the captured image.

The setting value may include a setting value associated with activating at least one of the front camera and rear camera, a setting value associated with capturing a portrait, a setting value associated with capturing a landscape, a setting value associated with capturing a video, a setting value associated with capturing an image, a setting value associated with an image effect, and the like. For example, as illustrated in the first drawing of FIG. 8A, when a function of uploading a video to an external server and an image capture function are executed in a linked manner, the controller 180 can execute the image capture function to have a setting value capable of capturing a video.

Furthermore, as illustrated in the second drawing of FIG. 8A, when the function of uploading a video to an external server and the image capture function are executed in a linked manner, the controller 180 can upload a video captured through the image capture function to the external server in real time. In other words, the controller 180 can perform upload a video while at the same time capturing the video.

Moreover, the controller 180 can store the video in the memory unit 170 of the mobile terminal. At this time, the controller 180 can store link information indicating that the video is linked with a function of uploading the video to an external server and the video together in a linked manner. In another example, as illustrated in the first drawing of FIG. 8B, when a function of providing contact information and the image capture function are executed in a linked manner, the controller 180 can execute the image capture function such that the image capture function has a setting value associated with capturing a portrait. Here, the setting value associated with capturing a portrait may be a setting value at which the focus is placed on a facial image.

Here, the controller 180 can store an image captured through the image capture function as the contact information of a function of providing contact information. Moreover, the controller 180 can store link information indicating that the image captured through the image capture function is linked with the function of providing contact information and the captured image in a linked manner.

In the above, the present disclosure has described a method of providing an image capture function to have a preset setting value when the image capture function and a function associated with the captured image are executed in a linked manner. Through this, the present disclosure can provide an image capture function to be suitably used for the function associated with the captured image even without setting an additional setting value.

Hereinafter, a method of controlling an image capture function and a function associated with the captured image when the image capture function and the function associated with the captured image are executed in a linked manner will be described. FIGS. 9A, 9B, 9C, 9D, 10A and 10B are conceptual views illustrating a method of controlling an image capture function and a function associated with the captured image when the image capture function and the function associated with the captured image are executed in a linked manner.

When an image capture function and a function associated with the captured image are executed in a linked manner, the controller 180 of the mobile terminal according to an embodiment of the present disclosure can control each function in a linked manner or control each function in a separate manner. Controlling the each function in a separate manner or controlling the each function in a linked manner may be configured in advance according to the type of the function associated with the captured image.

First, when the each function is controlling in a linked manner, the controller 180 can control a function associated with the captured image in response to a touch to the execution screen of the image capture function when the execution screen of the image capture function and the execution screen of the function associated with the captured image are displayed on the display unit 151.

Figure 9A:
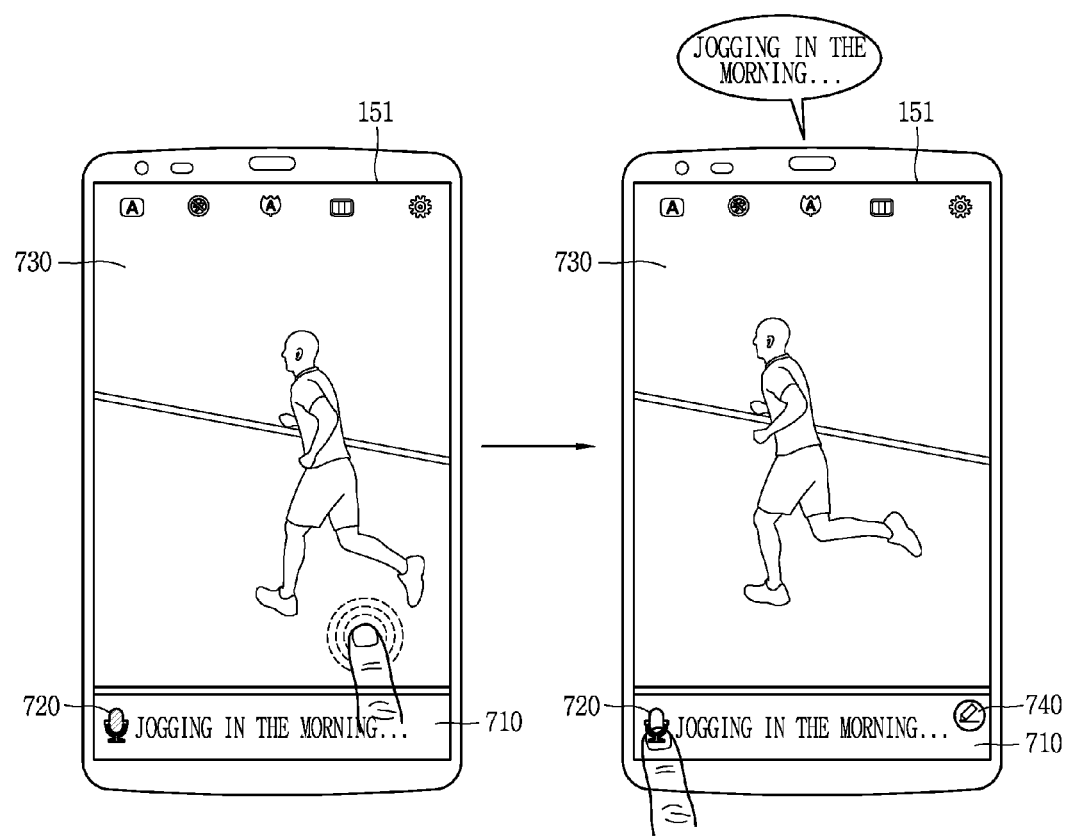
FIGS. 9A, 9B, 9C, 9D, 10A and 10B are conceptual views illustrating a method of controlling an image capture function and a function associated with the captured image when the image capture function and the function associated with the captured image are executed in a linked manner.
Figure 9B:
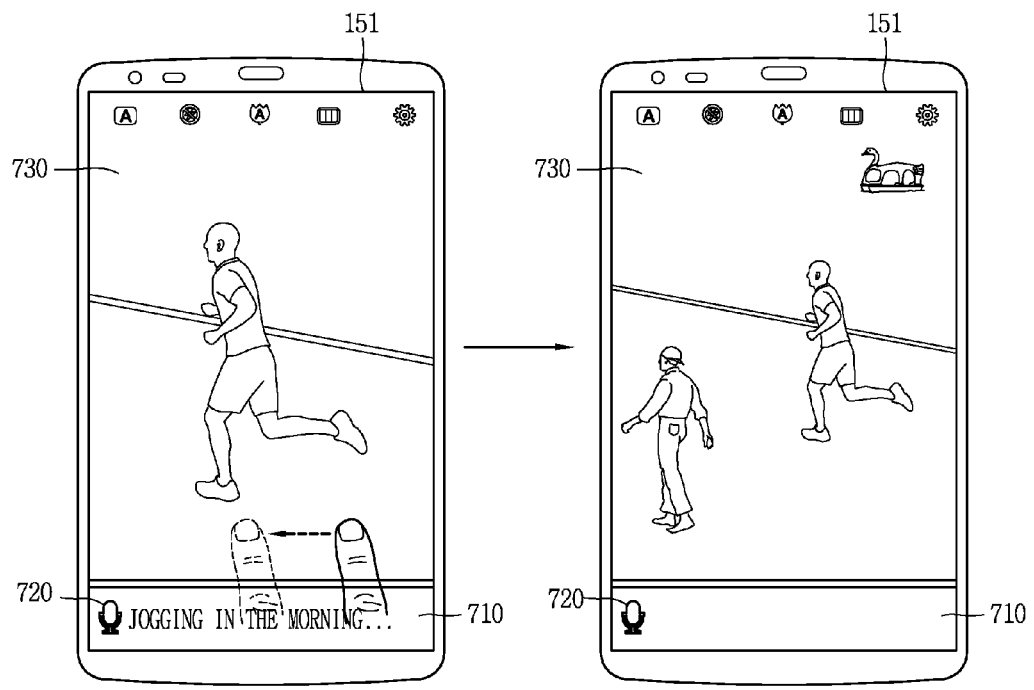
Figure 9C:
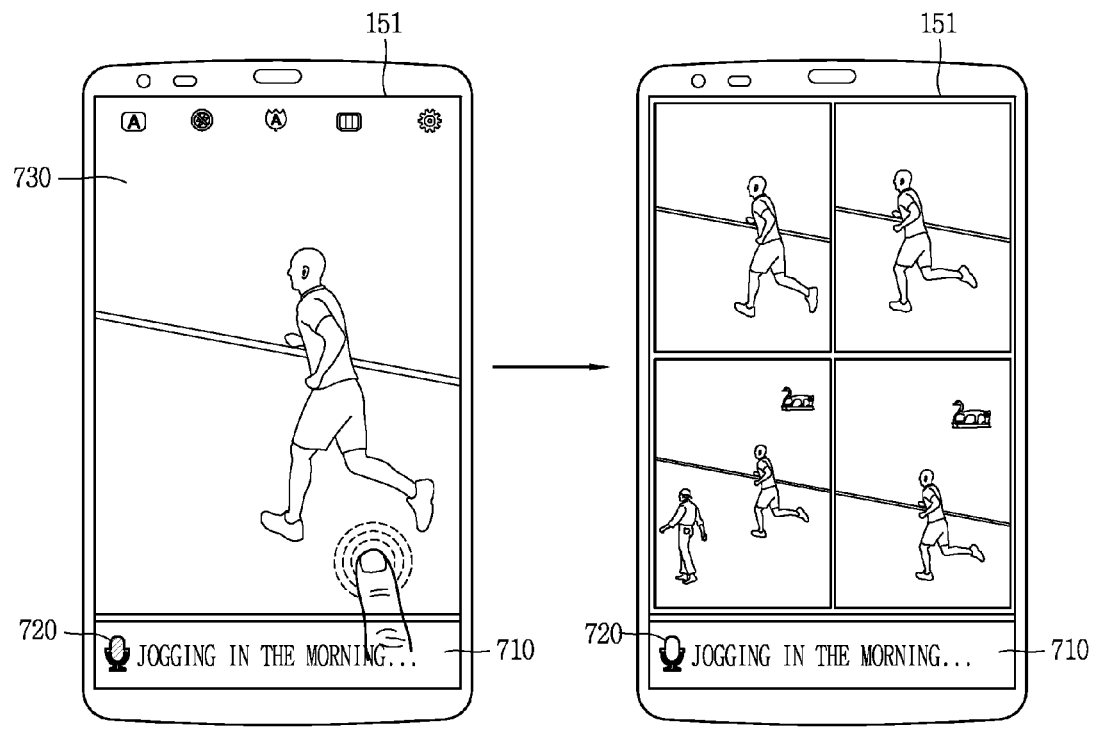

For example, as illustrated in the first drawing of FIG. 9A, when the image capture function and a voice recognition function are executed in a linked manner, the controller 180 can display an execution screen 730 of the image capture function and an execution screen 710 of the voice recognition function on the display unit 151. The execution screen 730 of the image capture function can be a preview image screen received through the camera unit 121. Furthermore, the execution screen 710 of the voice recognition function can include a graphic object 720 linked with the activation or deactivation of the voice recognition function and text information in which the recognized voice has been converted into a text.

Here, as illustrated in the first drawing of FIG. 9A, the controller 180 can activate the voice recognition function in response to a touch applied to the execution screen 730 of the image capture function. The activation of the voice recognition function can denote starting the recognition of voice received from the outside. Furthermore, the activation of the voice recognition function can be converting the input voice into a text. Further, the deactivation of the voice recognition function can denote ending the recognition of voice received from the outside.

In this instance, a visual appearance of the graphic object 720 linked with the activation or deactivation of the voice recognition function included in the execution screen 710 of the voice recognition function may be changed to indicate that the voice recognition function has been activated. When the voice recognition function is activated, the controller 180 can recognize voice received from the outside. Furthermore, the controller 180 can convert the recognized voice into a text. Moreover, the controller 180 can display the converted text on the execution screen 710 of the voice recognition function.

During the execution of the voice recognition function, the controller 180 can deactivate the voice recognition function in response to ending the sense of a touch on the execution screen 730 of the image capture function. At the same time, the controller 180 can capture an image received through the camera unit 121 at a time point at which the sense of a touch on the execution screen 730 of the image capture function is ended. Otherwise, the controller 180 can capture an image received through the camera unit 121 at a time point at which the sense of a touch on the execution screen 730 of the image capture function is started.

Here, the controller 180 can store the captured image and the recognized voice in a linked manner. More specifically, the controller 180 can store link information indicating that the captured image is linked with the recognized voice in a linked manner to output the recognized voice through the captured image. Furthermore, the controller 180 can store link information indicating that the recognized voice is linked with the captured image in a linked manner to access the captured image through the recognized voice.

As illustrated in the second drawing of FIG. 9A, subsequent to deactivating the voice recognition function, the captured image and text information in which the recognized voice has been converted into a text can be displayed on the display unit 151. Furthermore, a visual appearance of the graphic object 720 linked with the activation or deactivation of the voice recognition function can be changed to indicate that the voice recognition function is deactivated. Moreover, the execution screen of the voice recognition function may further include a graphic object 740 linked with a function of editing the recognized voice. The editing of the recognized voice can denote controlling a recording length of the recognized voice or changing an amplitude or vibration frequency thereof.

Here, the controller 180 can auditorily output the recognized voice in response to a touch applied to a graphic object 720 indicating the activation or deactivation of the voice recognition function in a state indicating that the graphic object 720 indicating the activation or deactivation of the voice recognition function has been deactivated.

Furthermore, the controller 180 can display a preview image received from the camera unit 121 again on the display unit 151 in response to a touch in a preset direction applied to the captured image. For example, as illustrated in the first and the second drawings of FIG. 9B, the controller 180 can display a preview image received from the camera unit 121 again on the display unit 151 in response to a drag input having a direction from the right to the left side with respect to a front surface of the display unit 151 to the captured image.

Furthermore, the controller 180 can capture an image with a preset number of times or preset period of time while a touch is sensed on the execution screen 730 of the image capture function. For example, the controller 180 can capture an image four times or every five seconds while a touch is sensed on the execution screen 730 of the image capture function.

In this instance, the controller 180 can store the recognized voice in linkage with the captured plurality of images while a touch is sensed on the execution screen 730 of the image capture function. For example, as illustrated in the first and the second drawings of FIG. 9C, the controller 180 can capture four images while a touch is sensed on the execution screen 730 of the image capture function. In addition, the controller 180 can store the four images in linkage with the recognized voice.

Further, when each function is controlled in a separate manner, the controller 180 can control the image capture function in response to a touch applied to the execution screen of the image capture function and execute a function associated with the captured image in response to a touch applied to the execution screen of the function associated with the captured image when the execution screen of the image capture function and the execution screen of the function associated with the captured image are displayed on the display unit 151.

Figure 9D:
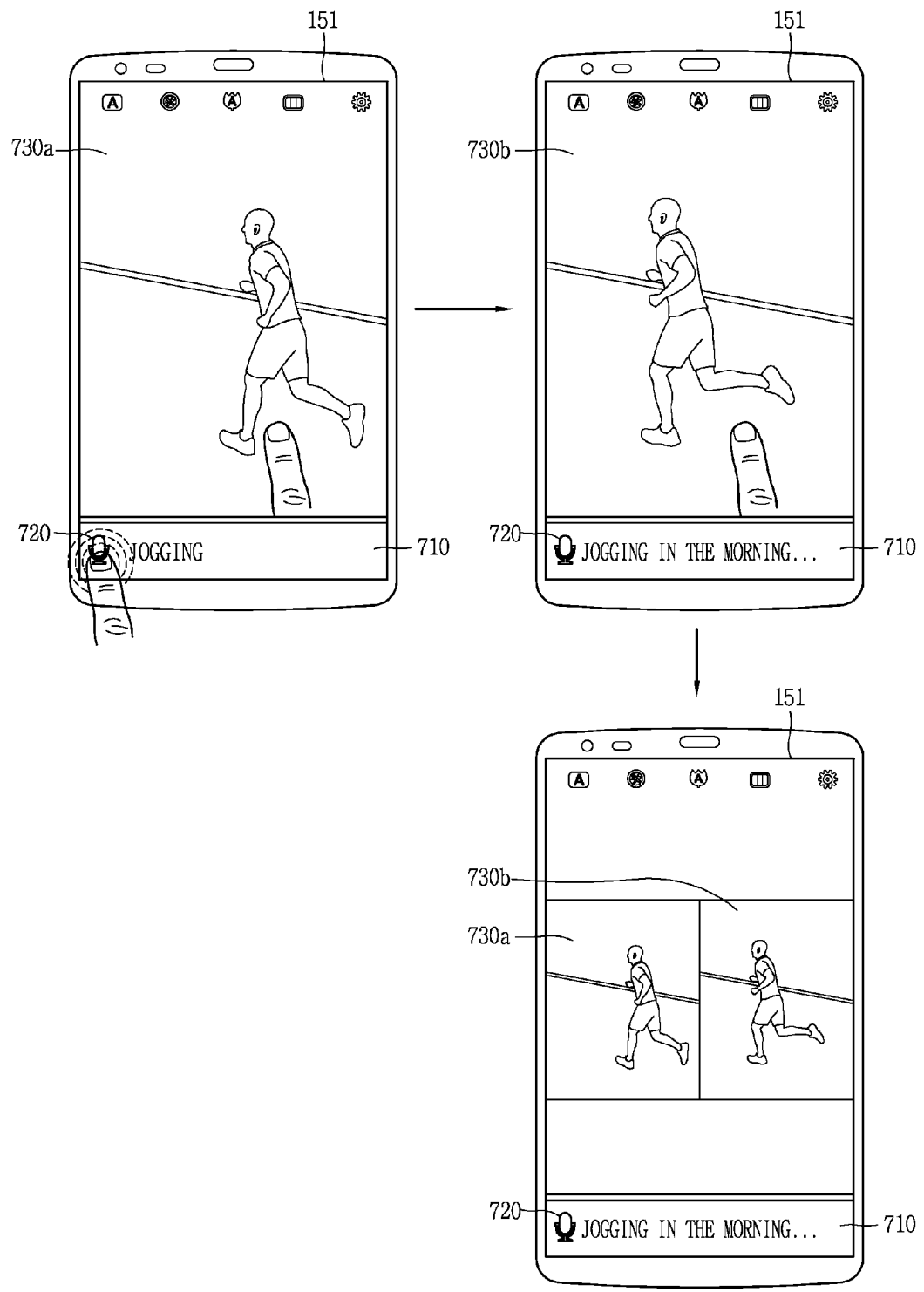

For example, as illustrated in the first drawing of FIG. 9D, when the image capture function and voice recognition function are executed in a linked manner, the controller 180 can capture an image in response to a touch applied to the execution screen of the image capture function and activate the voice recognition function in response to a touch applied to the graphic object 720 linked with the activation or deactivation of the voice recognition function. In other words, the controller 180 can control each function based on a control command applied to the execution screen of the each function.

Here, the controller 180 can capture a plurality of images in response to a plurality of touches applied to the execution screen of image capture function when the voice recognition function is activated. For example, as illustrated in the first drawing of FIG. 9D, the controller 180 can capture a first image 730a in response to a first touch when the voice recognition function is activated. Furthermore, as illustrated in the second drawing of FIG. 9D, the controller 180 can capture a second image 730b in response to a second touch when the voice recognition function is activated.

The controller 180 can link voice recognized through the voice recognition function with the first image 730a and second image 730b subsequent to deactivating the voice recognition function. Here, the controller 180 can deactivate the voice recognition function in response to a touch to the graphic object 720 linked with the activation or deactivation of the voice recognition function. For example, as illustrated in the third drawing of FIG. 9D, the controller 180 can link the recognized voice with the first image 730a and second image 730b.

When an image captured through the image capture function is processed in linkage with the function associated with the captured image, the controller 180 can display the other images that have not been processed in linkage with the function associated with the captured image in a visually distinguished manner. More specifically, when an image captured through the image capture function is processed in linkage with the function associated with the captured image, the controller 180 can display a graphic object indicating that the captured image has been processed in linkage with the function associated with the captured image in an overlapping manner to visually distinguish a thumbnail image of the captured image from the other images that have not been processed in linkage with the function associated with the captured image.

Figure 10A:
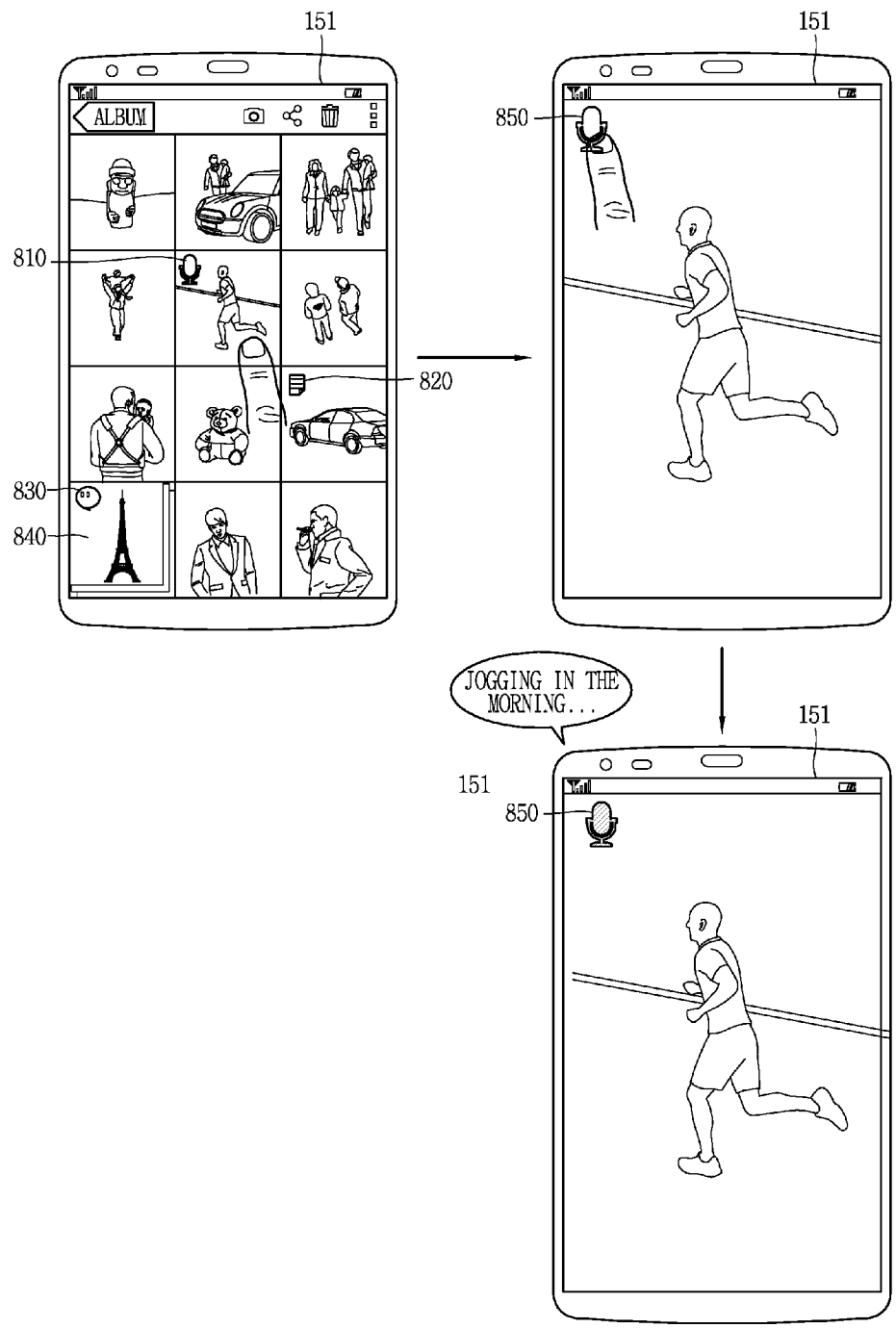

For example, as illustrated in the first drawing of FIG. 10A, a graphic object 810 indicating that it has been processed in linkage with a voice recognition function can be displayed in an overlapping manner on the thumbnail image of an image processed in linkage with the voice recognition function, and a graphic object 830 indicating that it has been processed in linkage with a message transmission function may be displayed in an overlapping manner on the thumbnail image of an image processed in linkage with the message transmission function, and a graphic object 820 indicating that it has been processed in linkage with a memo function may be displayed in an overlapping manner on the thumbnail image of an image processed in linkage with the memo function.

Here, as illustrated in the second drawing of FIG. 10A, the controller 180 can display an image processed in linkage with the voice recognition function along with a graphic object 850 indicating that there is a voice linked therewith on the display unit 151 in response to a touch applied to a thumbnail image of the image processed in linkage with the voice recognition function.

Here, as illustrated in the third drawing of FIG. 10A, the controller 180 can auditorily output the voice in response to a touch to the graphic object 850 indicating that there is a voice linked with the image processed in linkage with the voice recognition function. Furthermore, as illustrated in the first drawing of FIG. 10B, when a plurality of images are linked with one voice, the controller 180 can display a graphic object 810 indicating that the plurality of images have been processed in linkage with the voice recognition function on a thumbnail image for the plurality of images.

Here, the thumbnail image for the plurality of images may have an appearance visually distinguished from the thumbnail image for one image. For example, as illustrated in the first drawing of FIG. 10B, a thumbnail image 840 for the plurality of images may have a visual appearance with a shape overlapping with the plurality of images.

Figure 10B:
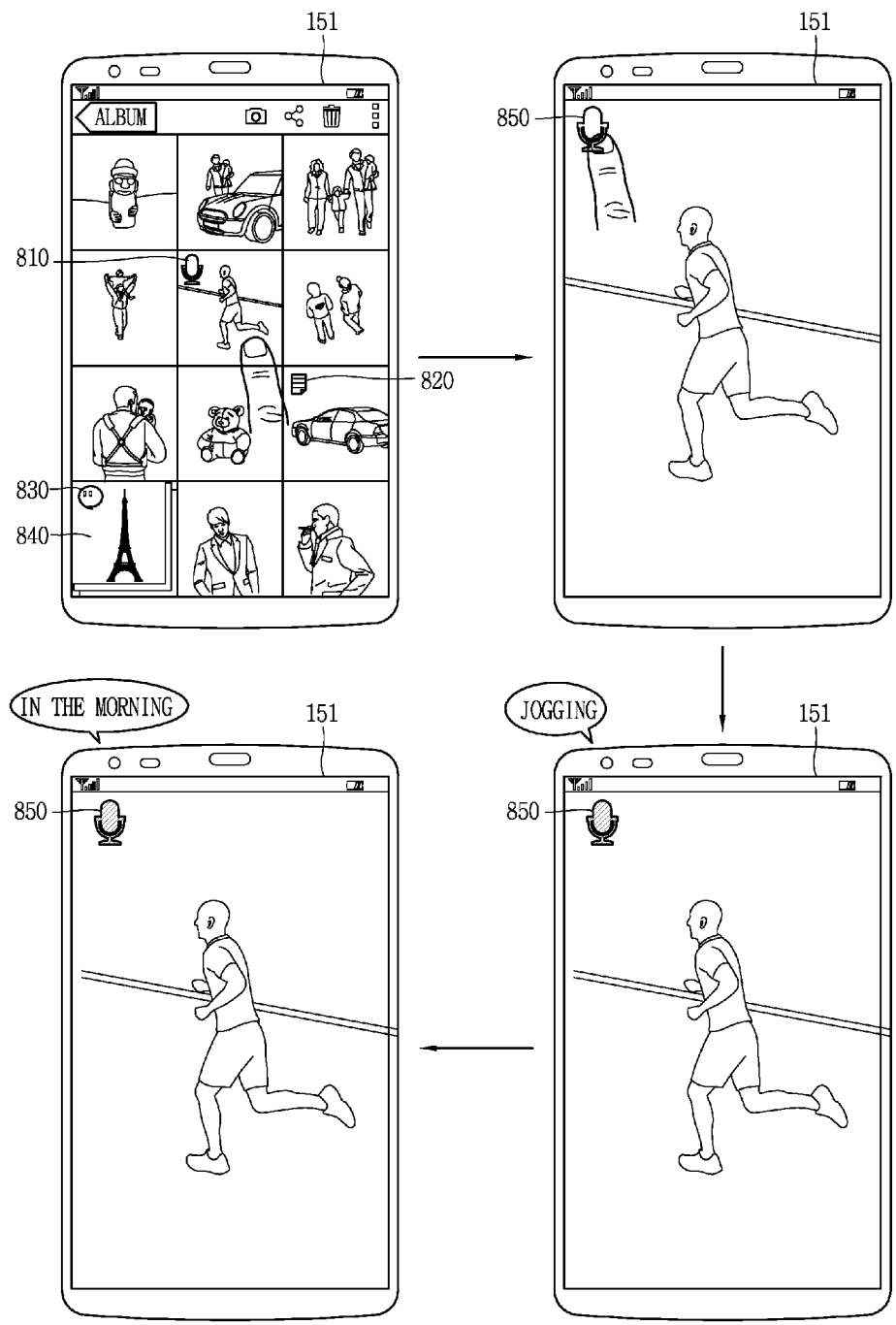

As illustrated in the second drawing of FIG. 10B, the controller 180 can display any one of the plurality of images along with a graphic object 850 indicating that there is a voice linked therewith on the display unit 151 in response to a touch to the thumbnail image for the plurality of images. Here, the controller 180 can display the plurality of images in a slide show form while at the same time outputting the voice in an auditory manner in response to a touch to the graphic object 850 indicating that there is a voice linked therewith. More specifically, as illustrated in the third and the fourth drawing of FIG. 10B, the controller 180 can display the plurality of images in a sequential or random manner on the display unit 151 while at the same time outputting the voice. Here, the controller 180 can provide the plurality of images in a random manner, in a capturing time sequence of the plurality of images or in a sequence set by the user.

In the above, a method of controlling an image capture function and a function associated with the captured image when the image capture function and the function associated with the captured image are executed in a linked manner has been described.

Hereinafter, a method of storing an image captured through an image capture function in a preset folder linked with the image capture function will be described. In particular, FIG. 11 is a conceptual view illustrating a method of linking an image captured through the image capture function between the image capture function and a preset folder, FIGS. 12A, 12B and 12C are conceptual view illustrating a method of executing a function of storing an image captured through the capture function in a preset folder linked with the image capture function, and FIGS. 13A, 13B, 13C, 13D and 13E are conceptual views illustrating a method of storing an image captured through the image capture function in a preset folder linked with the image capture function.

The controller 180 of the mobile terminal according to an embodiment of the present disclosure can generate at least one or more folders, and store the captured image in any one of the at least one or more folders. The at least one or more folders may be generated by a user or generated when shipped out of the factory or generated based on an application installed in the mobile terminal. For example, the controller 180 can generate a food folder for storing food images, a hobby folder for storing hobby related images, a France folder for storing images captured in France, and the like. In another example, when an image is captured through the camera unit 121 in a specific application, the controller 180 can generate an application folder associated with the specific application, and store the captured image in the application folder.

At least one image may be stored in the at least one folder, respectively. Here, at least one image stored in the at least one folder, respectively, may be an image captured through the camera unit 121, an image downloaded from an external server or an image received from an external terminal. The controller 180 can process the one or more folders in linkage with the image capture function to store the captured image in one or more folders among the at least one folder. When the one or more folders are linked with the carrier indication field, the controller 180 can store an image captured through the image capture function in the one or more folders.

For example, when the image capture function is executed in linkage with a specific folder among the at least one folder, the controller 180 can store an image captured through the image capture function in the specific folder. When a preset type of touch is applied to a thumbnail image of the folder or a graphic object indicating a function of linking the folder with the image capture function is selected, the controller 180 can process the folder in linkage with the image capture function.

Figure 11A:
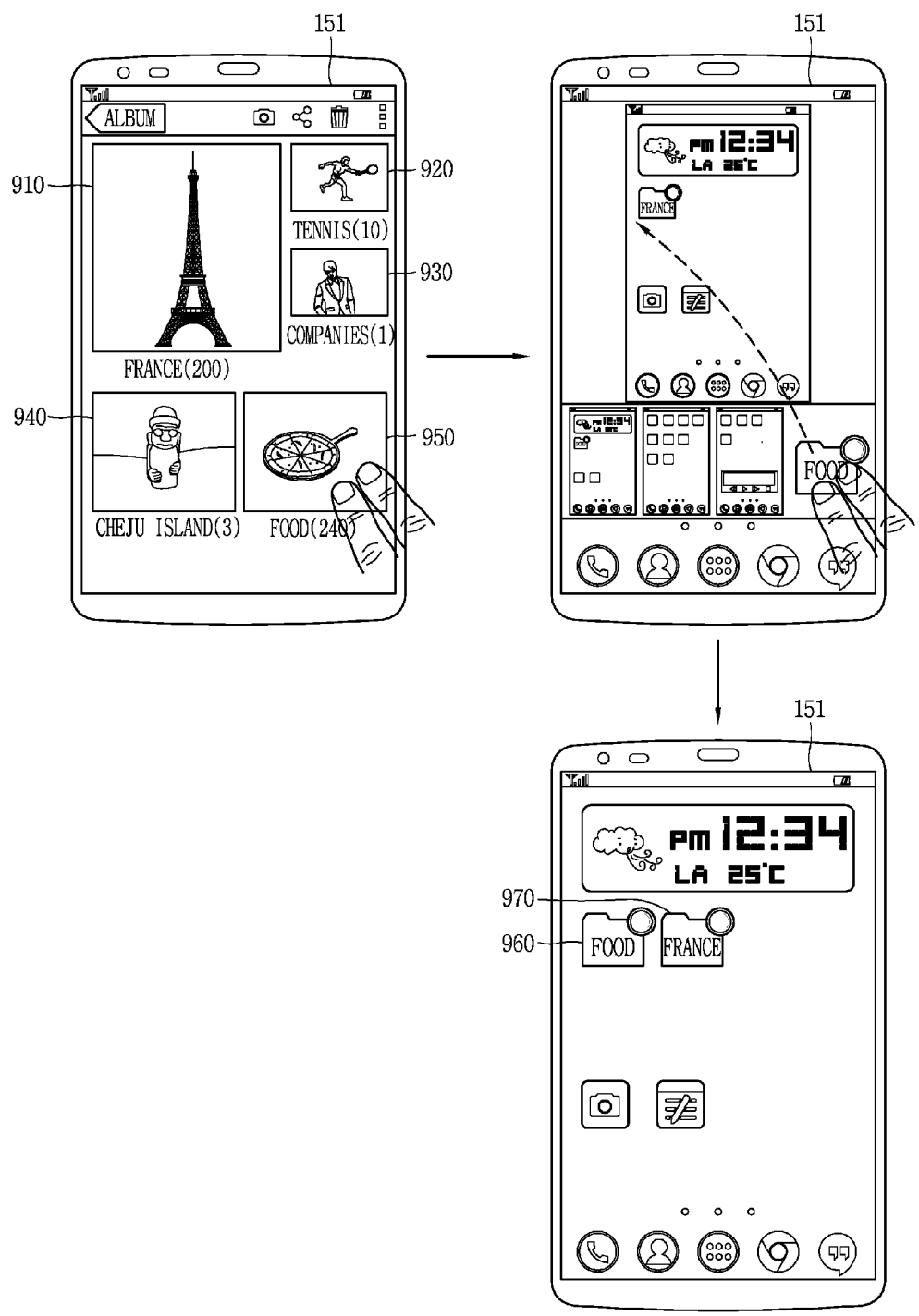
Figure 12A:
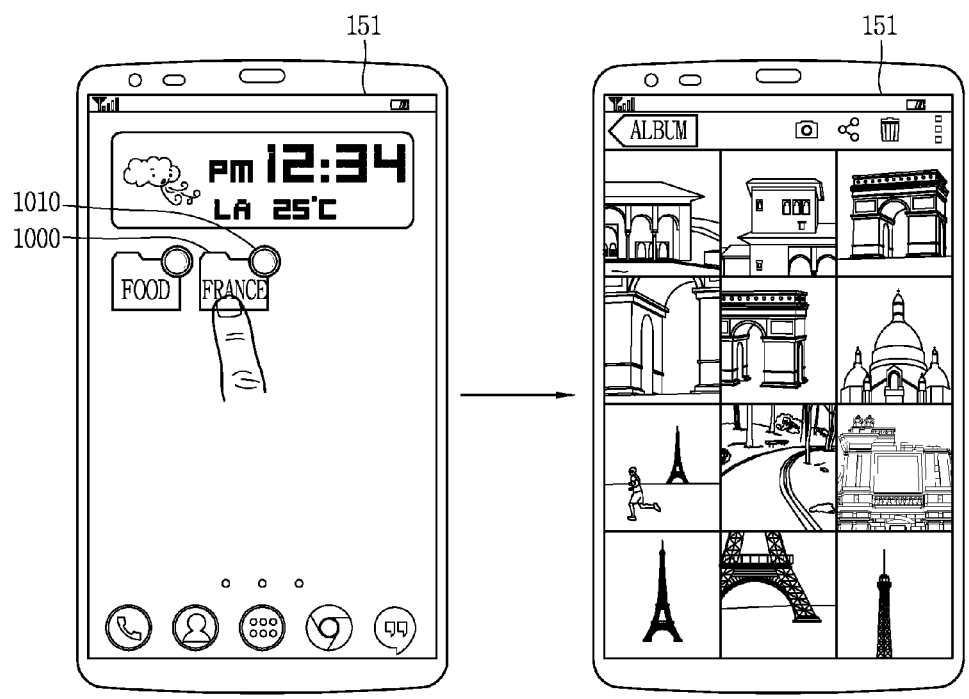
FIGS. 12A, 12B and 12C are conceptual view illustrating a method of executing a function of storing an image captured through the capture function in a preset folder linked with the image capture function.
Figure 12B:
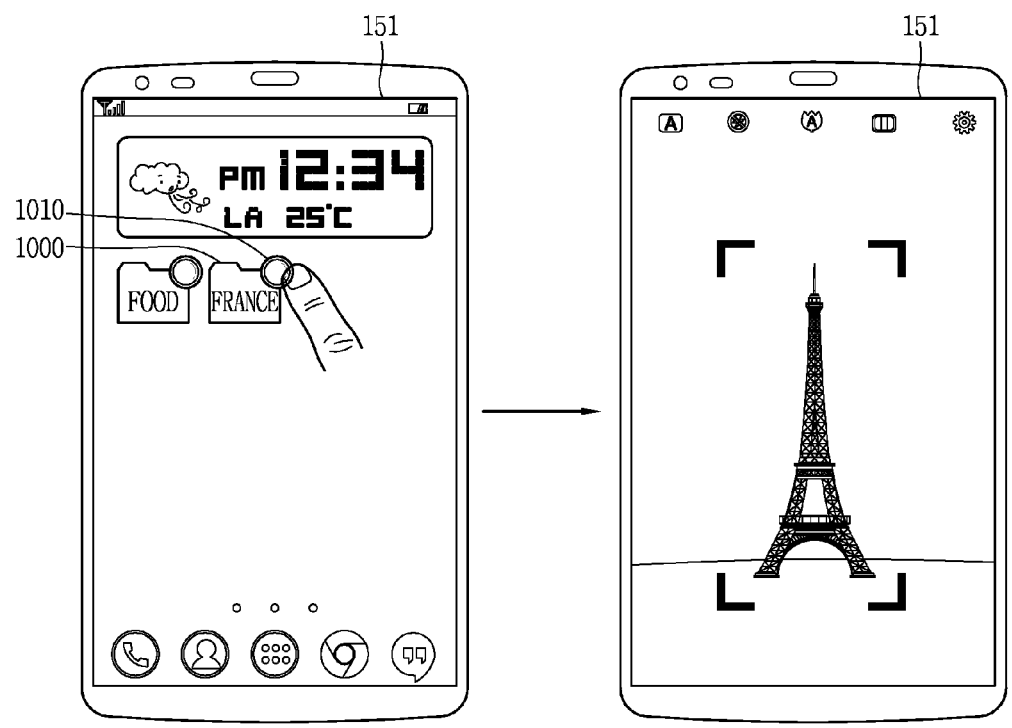
Figure 12C:
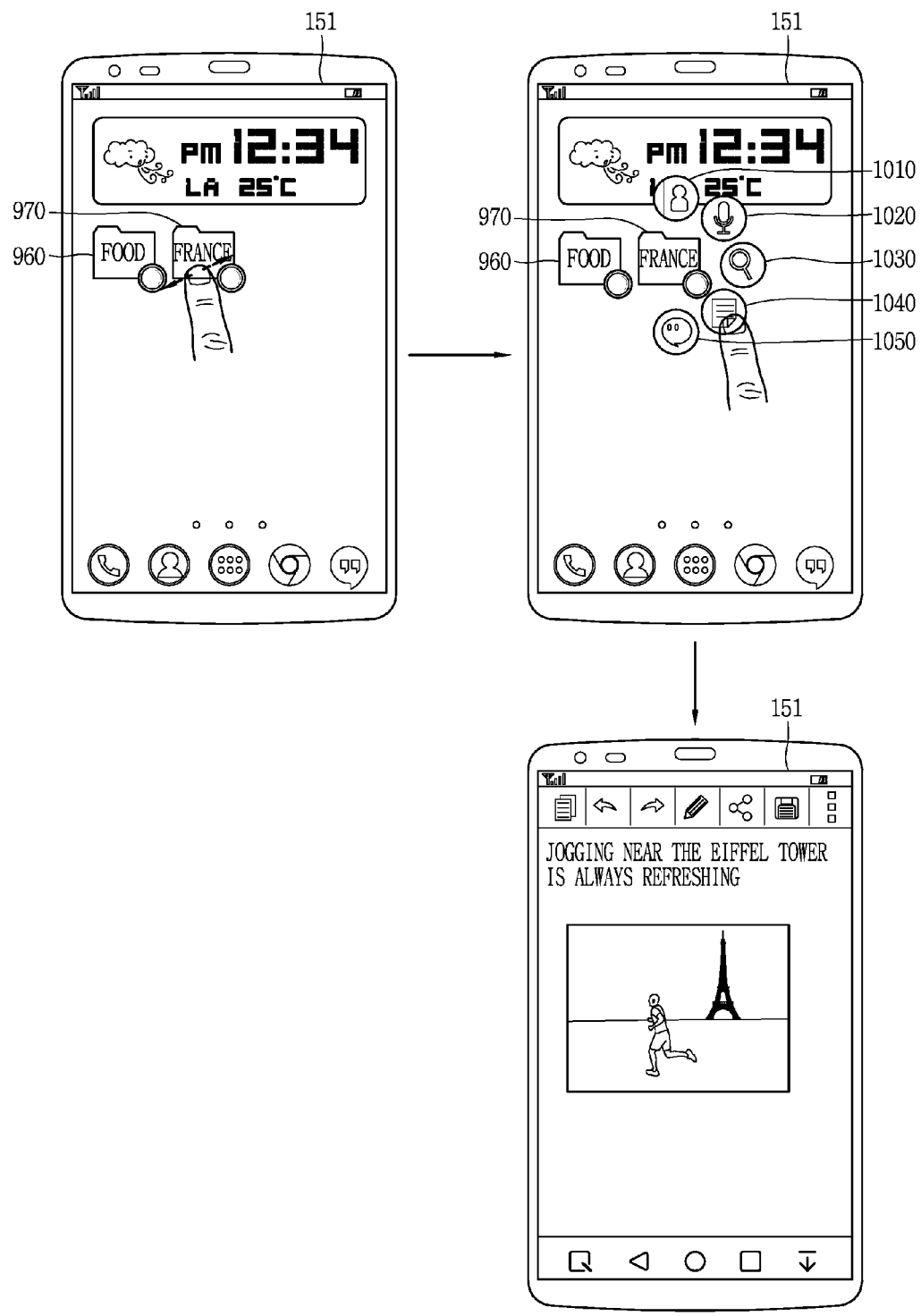

First, as illustrated in the first drawing of FIG. 11A, the controller 180 can link any one folder with an image capture function in response to a preset touch applied to a thumbnail image 950 of the any one folder among the thumbnail images 910, 920, 930, 940, 950 corresponding to the at least one folder when the thumbnail images 910, 920, 930, 940, 950 corresponding to the at least one folder are displayed on the display unit 151. The preset touch may be a multi-touch, a multi-touch sensed for a preset period of time or a holding and drag touch.

When the any one folder is linked with the image capture function, the controller 180 can display the any one folder and a folder image 960 linked with the image capture function on a home screen page. Thus, as illustrated in the second drawing of FIG. 11A, the controller 180 can display a home screen page on the display unit 151 as gradually reducing the thumbnail images 910, 920, 930, 940, 950 corresponding to the at least one folder while a preset touch is applied to the thumbnail image 950 of the any one folder among the thumbnail images 910, 920, 930, 940, 950 corresponding to the at least one folder when the thumbnail images 910, 920, 930, 940, 950 corresponding to the at least one folder are displayed on the display unit 151. At the same time, the controller 180 can display any one folder and a folder image linked with the image capture function on a region to which the preset type of touch is applied. In other words, the controller 180 can switch the thumbnail images 910, 920, 930, 940, 950 corresponding to the at least one folder to a home screen page to arrange them on the home screen page, thereby arranging a folder image linked with the any one folder and the image capture function on the home screen page.

The controller 180 can move a folder image linked with the any one folder and the image capture function on a region to be arranged on the home screen page based on a drag touch consecutive to the preset type of touch when the home screen page is displayed. When the movement is ended, the controller 180 can arrange a folder image linked with the any one folder and the image capture function on a region in which the sense of a drag touch consecutive to the preset type of touch is ended on the home screen page.

For example, as illustrated in the third drawing of FIG. 11A, when the any one folder is a food folder, the controller 180 can display the food folder and a folder image 960 linked with the image capture function on the home screen page, and the any one folder is a France folder, the controller 180 can display the France folder and a folder image 970 linked with the image capture function on the home screen page.

Furthermore, the controller 180 can display a function list including at least one function associated with the any one folder in response to a preset type of touch applied to a thumbnail image of the any one folder. The function list may include a folder delete function, a folder name change function, a folder share function and a function for linking a folder with an image capture function. Here, the user may select the function for linking a folder with an image capture function, thereby linking the any one folder to the image capture function, and displaying a folder image linked with the any one folder and the image capture function on a home screen page.

Further, the controller 180 can link a folder with an image capture function based on selecting a graphic object indicating the function for linking a folder with an image capture function. For example, as illustrated in the first drawing of FIG. 11B, a graphic object 980 indicating a function for linking a folder with an image capture function is displayed on a screen on which thumbnail images 910, 920, 930, 940, 950 corresponding to at least one folder are displayed.

Here, as illustrated in the second drawing of FIG. 11B, when the graphic object 980 is selected, the controller 180 can display a check box on thumbnail images corresponding to the any one folder, respectively, to select the thumbnail image 950 of the any one folder among the thumbnail images 910, 920, 930, 940, 950 corresponding to the at least one folder.

When the thumbnail image 950 is selected, the controller 180 can link the corresponding folder with the image capture function, and display a folder image linked with the corresponding folder and the image capture function on a home screen page. For example, as illustrated in the third drawing of FIG. 11B, when the food folder is selected, the controller 180 can display the folders linked with the image capture function on a home screen page such as a food folder 960 and a France folder 970 linked with the capture function.

The controller 180 can execute a function of displaying at least one image stored in the any one folder on the display unit 151 or execute a function of automatically storing an image captured through the image capture function in the any one folder based on a different touch to a folder image linked with the any one folder and the image capture function. Here, the different touch may be a touch applied to a different region on the display region of the folder image. In other words, as illustrated in the first drawing of FIG. 12A, the display region of the folder image may include a first region 1000 linked with a function of displaying at least one image stored in the any one folder on the display unit 151 and a second region 1010 linked with a function of automatically storing an image captured through the image capture function in the any one folder.

Here, as illustrated in FIG. 12A, the controller 180 can execute a function of displaying at least one image stored in the any one folder on the display unit 151 in response to a touch to the first region 1000 on the display region of the folder image. Furthermore, as illustrated in FIG. 12B, the controller 180 can execute a function of automatically storing an image captured through the image capture function in the any one folder in response to a touch to the second region 1010 on the display region of the folder image.

Furthermore, the controller 180 can display a graphic object indicating at least one function to be executed in linkage with the any one folder and image capture function based on a preset type of touch applied to a folder image linked with the any one folder and the image capture function. The preset type of touch may be a holding and drag input. More specifically, the preset type of touch may be a drag input for applying a touch to a folder image linked with the any one folder and the image capture function for more than a preset period of time and then moving in horizontal and vertical directions consecutive to the touch.

At least one function to be executed in linkage with the any one folder and image capture function may be a function capable of using an image captured through the camera unit 121. For example, the at least one function to be executed in linkage with the any one folder and image capture function may be a function capable of using the captured image through the camera unit 121, such as a function of linking the captured image with text or voice information, a function of generating, editing and storing memo information along with the captured image, a function of transmitting the captured image to an external device, a function of uploading the captured image to an SNS server, a function storing the captured image in linkage with the identification information of an external terminal, a function of storing the captured image in a preset folder, a function of searching a webpage using the analysis information of the captured image, and the like. In addition to the foregoing examples, the present disclosure is applicable to various functions capable of using the captured image through the camera unit 121.

For example, as illustrated in the first drawing of FIG. 12C, the controller 180 can sense a holding and drag touch applied to a folder image linked with the any one folder and the image capture function. Here, as illustrated in the second drawing of FIG. 12C, the controller 180 can display graphic objects 1010, 1020, 1030, 1040, 1050 indicating the at least one function.

Furthermore, as illustrated in the third drawing of FIG. 12C, the controller 180 can execute the image capture function, the any one folder, and a function indicated by the image capture function and the any one graphic object in a linked manner in response to a touch applied to any one graphic object 1040 among the at least one graphic object 1010, 1020, 1030, 1040, 1050. More specifically, when the image capture function, the any one folder, and a function indicated by the image capture function and the any one graphic object are executed in a linked manner, the controller 180 can store an image captured through the image capture function in the any one folder, and use the image captured through the image capture function as the input information of a function indicated by the any one graphic object 1040.

Further, the controller 180 can display a folder widget linked with the any one folder and the image capture function instead of a folder image 960 linked with the any one folder and the image capture function. For example, as illustrated in the first drawing of FIG. 13A, the controller 180 can display a France folder widget 1110 linked with the France folder and image capture function, a hobby folder widget 1120 linked with the hobby folder and image capture function, and a food folder widget 1130 linked with the food folder and image capture function on the home screen page. Here, the folder widget may be an application program in which the image capture function is provided on the widget.

The folder widget may be displayed on a home screen page or widget list page. Furthermore, the folder widget may include at least one image, representative image or folder name included in a folder linked with the folder widget. The controller 180 can execute the image capture function on a widget linked with the any one folder and the image capture function instead of the folder image 960 linked with the image capture function. More specifically, as illustrated in the second drawing of FIG. 13A, the controller 180 can display a preview image of the image capture function on a widget linked with the any one folder and the image capture function based on a user's request. The user's request may be an input in which a plurality of touches are applied to the widget within a preset period of time. In other words, the user may use the image capture function on the home screen page through the folder widget.

When an image is captured on a folder widget linked with the any one folder and the image capture function when a preview image is displayed on the folder widget linked with the any one folder and the image capture function, the controller 180 can store the captured image in the any one folder. For example, as illustrated in the second drawing of FIG. 13A, when an image is captured on a folder widget linked with the food folder and image capture function, the captured image may be stored in the food folder.

Furthermore, the controller 180 can control at least two or more folders and an image capture function to store the captured image in the at least two or more folders. For example, as illustrated in the first drawing of FIG. 13B, an image capture function may be executed in response to a touch applied to at least two widgets 1120, 1130 linked with the at least two or more folders and image capture function at the same time. In this instance, when an image is captured through the image capture function, the controller 180 can store the captured image in the at least two or more folders. In other words, the present disclosure can provide a method of storing one image in at least two or more folders at a time.

Furthermore, the controller 180 can display at least one photo stored in the any one folder on the widget based on a drag input to a folder widget linked with the any one folder and the image capture function. For example, as illustrated in the first drawing of FIG. 13C, the controller 180 can display a second image contained in the food folder on the widget based on a drag input in a direction from the right to the left side based on a front surface of the display unit 151 to the folder widget 1130 linked with the food folder and image capture function when a first image contained in the food folder is displayed on the widget.

Furthermore, the controller 180 can change the size of at least one folder widget when the at least one folder widget is displayed on the home screen page. Here, the size of the at least one folder widget may be configured by a user or determined by the use status information of the folder widget.

When configured by the user, the controller 180 can change the size of the at least one folder widget based on a drag touch applied to an edge region of the at least one folder widget. For example, as illustrated in the first drawing of FIG. 13D, the controller 180 can change the size of the folder widget 1130 linked with the food folder and image capture function based on a drag touch applied to an edge region of the folder widget 1130 linked with the food folder and image capture function when three folder widgets are displayed on the home screen page. Here, as illustrated in the second drawing of FIG. 13D, the controller 180 can change the size of the folder widget 1130 linked with the food folder and image capture function as much as the size corresponding to a region from which the sense of the drag input is started to a region at which the sense of the drag input is ended.

Figure 13A:
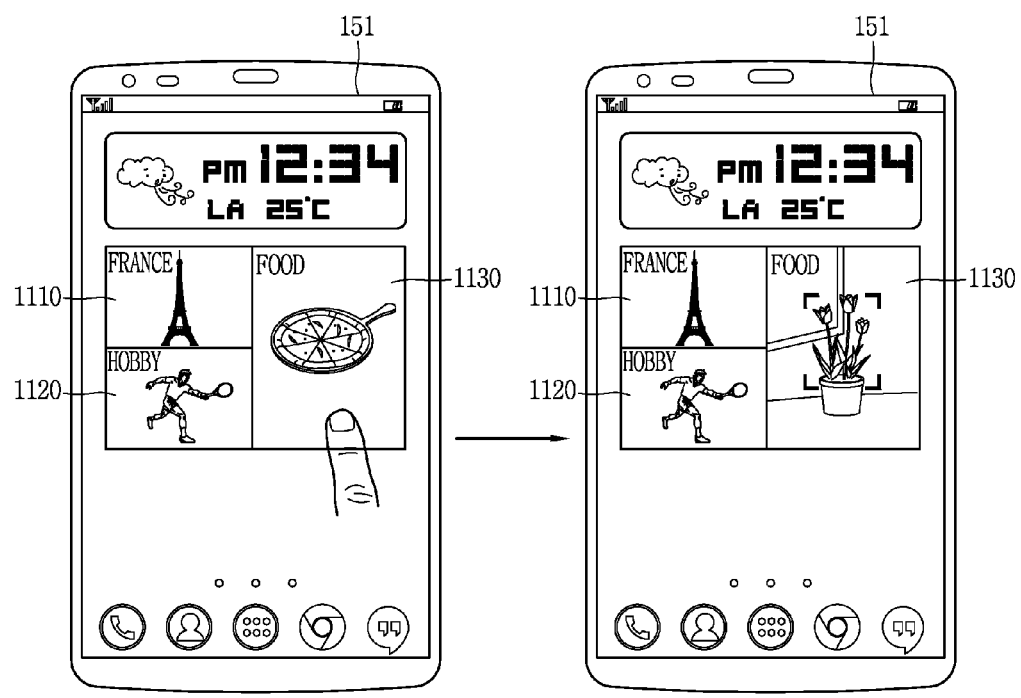
FIGS. 13A, 13B, 13C, 13D and 13E are conceptual views illustrating a method of storing an image captured through the image capture function in a preset folder linked with the image capture function.
Figure 13B:
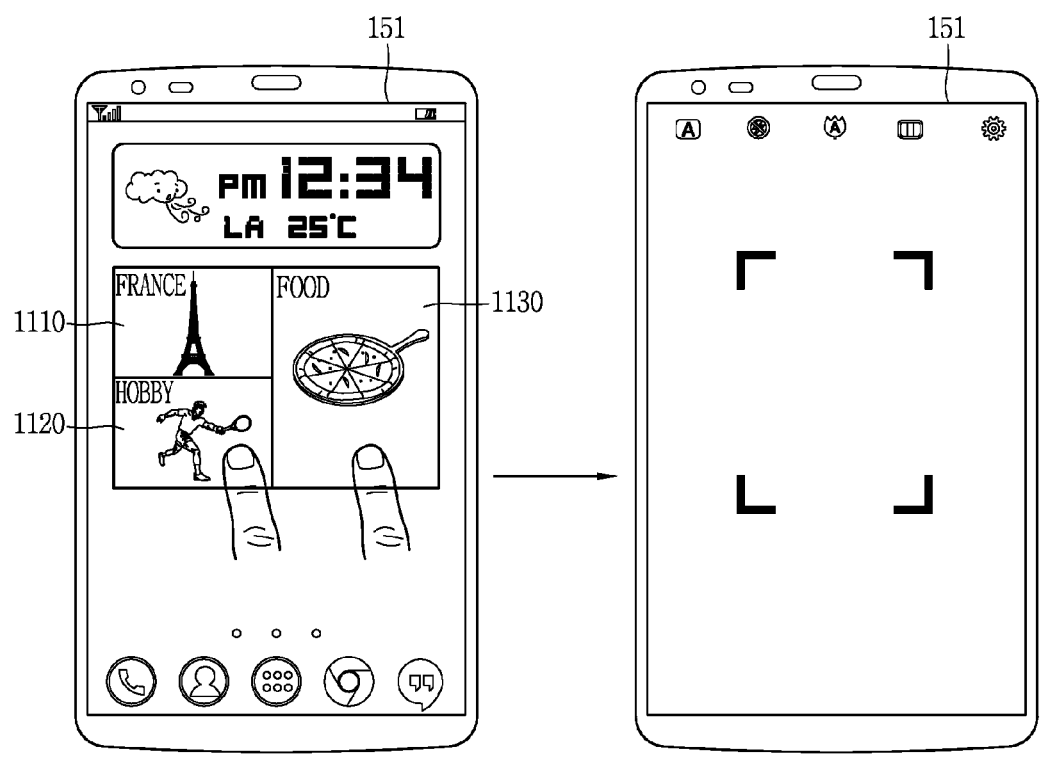
Figure 13C:
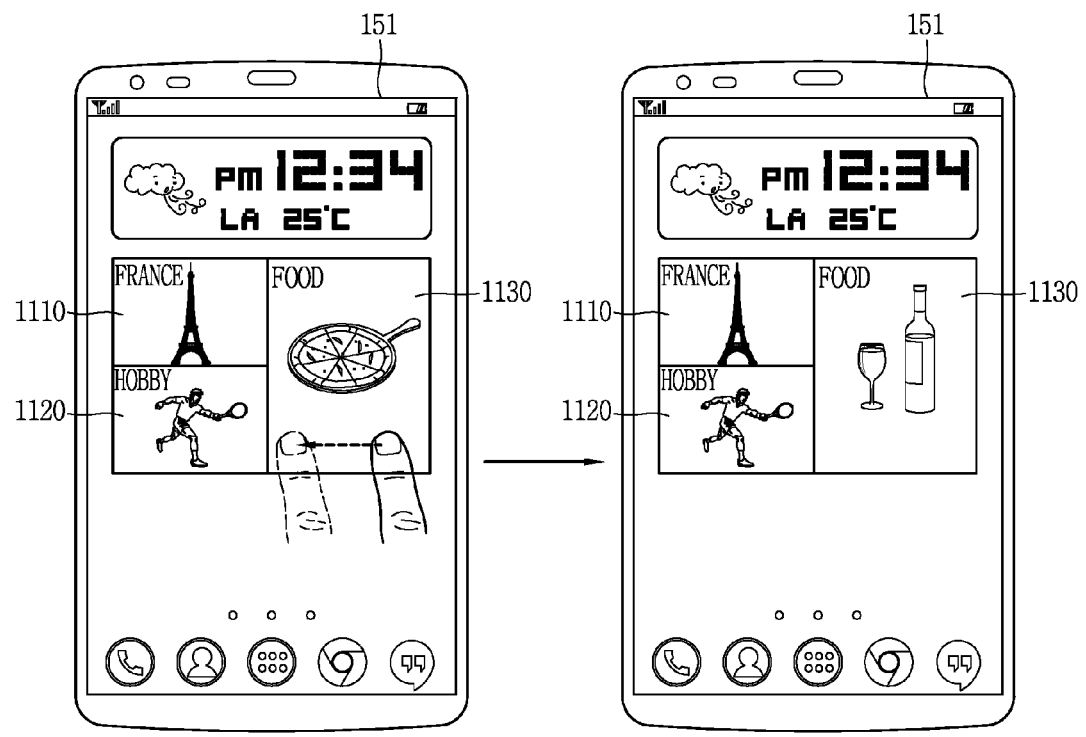
Figure 13D:
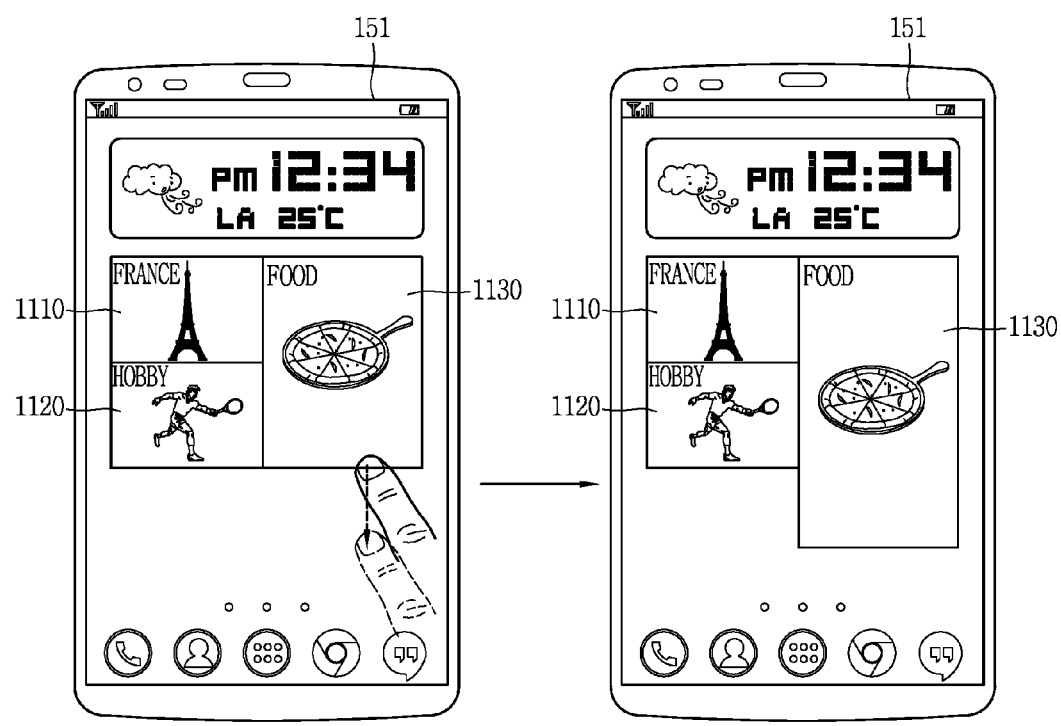
Figure 13E:
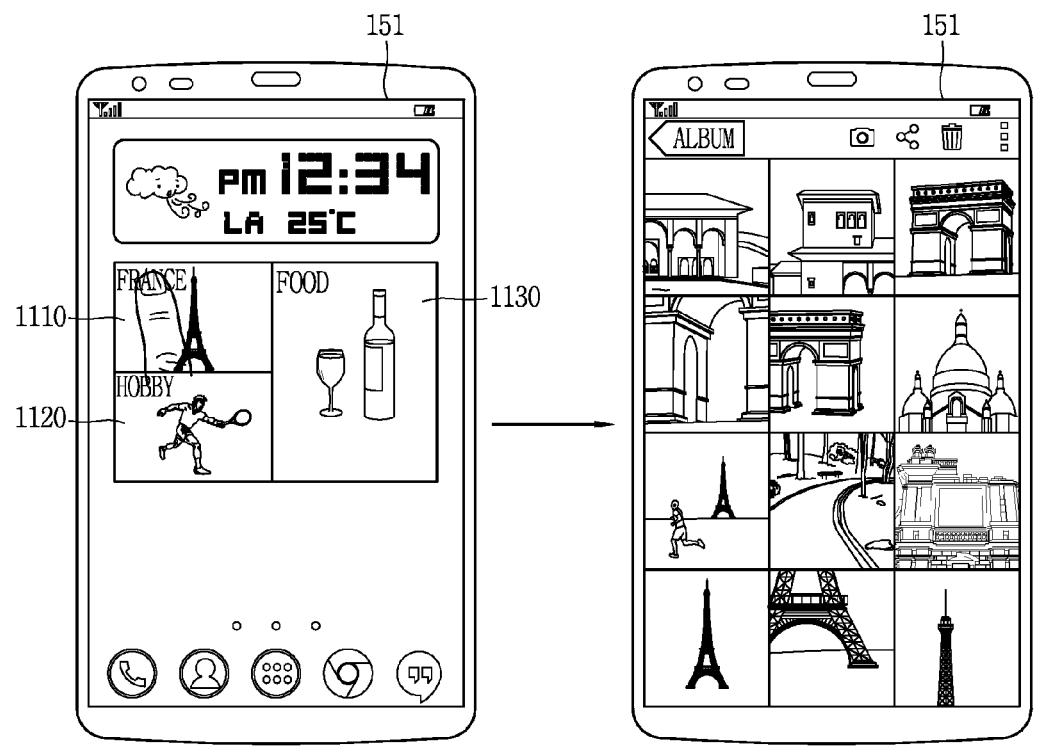

Furthermore, when a folder name contained in the at least one folder widget is touched, the controller 180 can display at least one image stored in a folder corresponding to the folder name on the display unit 151. In other words, when the folder name is touched, the controller 180 can enter a folder corresponding to the folder name and display at least one image stored in the folder corresponding to the folder name. For example, as illustrated in FIG. 13E, when a folder name on a folder widget linked with the France folder and image capture function is touched, the controller 180 can display at least one image stored in the France folder on the display unit 151.

In the above, a method of storing an image captured through an image capture function in a preset folder linked with the image capture function has been described. Through this, the present disclosure can capture an image that can be conveniently stored in a specific folder on a widget. Furthermore, the present disclosure can store an image in a folder selected on its own, thereby searching a desired image in an easy and fast manner without additionally organizing or processing the captured image afterwards.

Figure 14A:
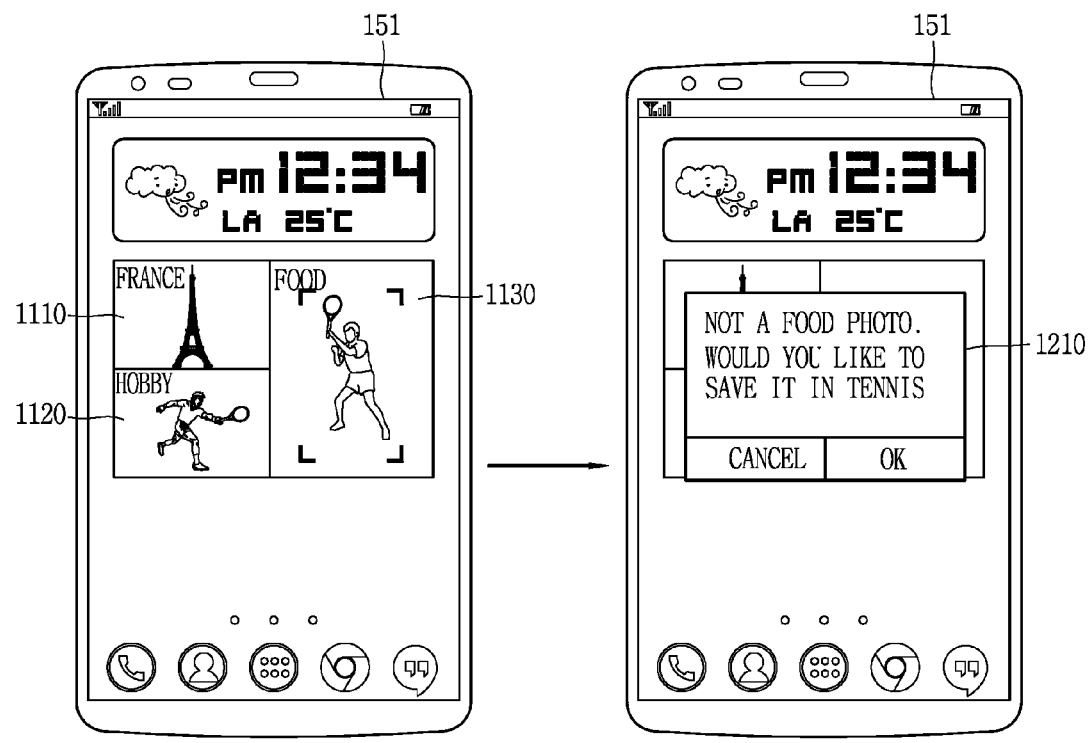
FIGS. 14A and 14B are conceptual views illustrating a method of processing an image based on the attribute information of the image captured using a folder widget.
Figure 14B:
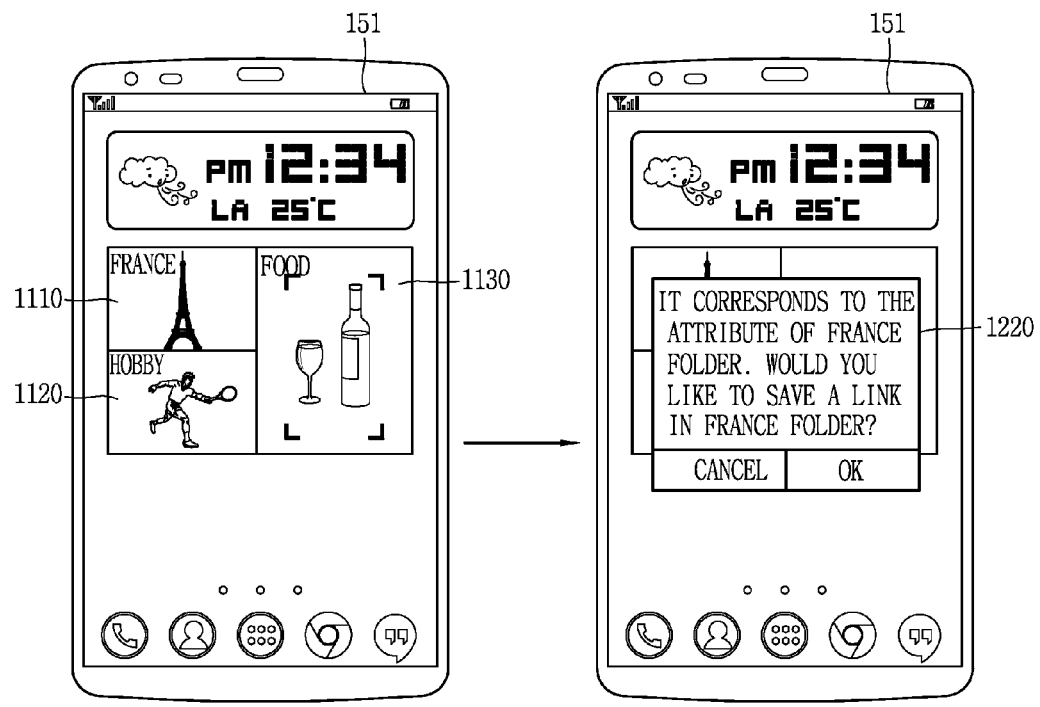

Hereinafter, a method of processing an image based on the attribute information of the image captured using a folder widget will be described. In particular, FIGS. 14A and 14B are conceptual views illustrating a method of processing an image based on the attribute information of the image captured using a folder widget. The controller 180 of the mobile terminal according to an embodiment of the present disclosure can capture an image through a folder widget linked with any one folder and an image capture function, and store the captured image in the any one folder.

Here, the any one folder may be configured to store only an image corresponding to preset attribute information. The attribute information may be at least one of capture time point information, capture location information and image analysis information of an image. For example, the food folder may be configured to store only food images. In another example, the France folder may be configured to store only images in which the capture location is France.

When an image is capture through a folder widget linked with the any one folder and image capture function, the controller 180 can detect the attribute information of the captured image. Here, the controller 180 can detect the attribute information of the captured image using a preset image analysis algorithm. Here, when preset attribute information of the any one folder corresponds to the attribute information of the captured image, the controller 180 can store the captured image in the any one folder. On the contrary, when preset attribute information of the any one folder does not correspond to the attribute information of the captured image, the controller 180 can not store the captured image in the any one folder. Here, the controller 180 can search at least one folder having attribute information corresponding to the attribute information of the captured image.

When at least one folder having attribute information corresponding to the attribute information of the captured image is searched, the controller 180 can display notification information for notifying at least one folder corresponding to the attribute information of the captured image to the user. For example, as illustrated in FIG. 14B, the controller 180 can display notification information 1210 for notifying at least one folder having attribute information corresponding to the attribute information of the captured image on the display unit 151.

The notification information may include graphic objects linked with functions "Cancel" and "OK" to allow the user to select whether or not to store the captured image in at least one folder having attribute information corresponding to the attribute information of the captured image. Here, the controller 180 can store the captured image in at least one folder having attribute information corresponding to the attribute information of the captured image when a graphic object linked with a function "OK" is selected, and may not store the captured image in at least one folder having attribute information corresponding to the attribute information of the captured image and the any one folder when a graphic object linked with a function "Cancel" is selected.

Further, as a result of detecting the attribute information of the captured image, even when preset attribute information of the any one folder corresponds to the attribute information of the captured image, the controller 180 can further additionally search at least one folder corresponding to the attribute information of the captured image.

In this instance, the controller 180 can display notification information to allow the user to select whether or not to store the link information of the captured image in the additionally searched at least one folder. For example, as illustrated in the first drawing of FIG. 14B, when an image corresponding to wine is captured through a folder widget linked with the food folder and image capture function, the controller 180 can determine that the wine corresponds to the attribute information of the food folder. Moreover, the controller 180 can search that an image corresponding to the wine corresponds to the attribute information of the France folder.

In this instance, as illustrated in the second drawing of FIG. 14B, the controller 180 can display notification information 1220 for selecting whether or not to store the link information of an image corresponding to the wine in the France folder on the display unit 151. The link information may be information for linking the captured image with the France folder. When the link information is stored, the controller 180 can access an image corresponding to the wine from both the France folder and food folder through the link information of the image corresponding to the wine. When the link information is not stored, the controller 180 can access an image corresponding to the wine from the food folder but not able to access it from the France folder.

In the above, a method of storing an image captured through an image capture function in a preset folder has been described. Through this, the user can automatically arrange the captured image for each folder without additional control.

Figure 15A:
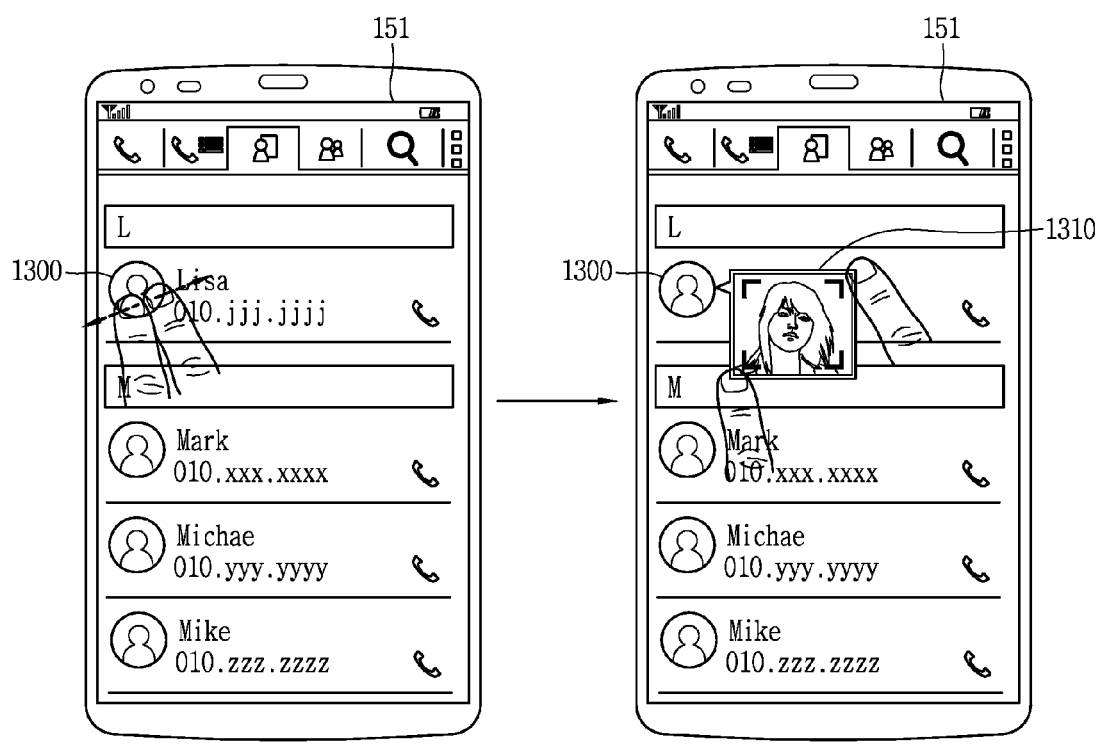
FIGS. 15A, 15B and 15C are conceptual views illustrating a method of easily executing various applications and an image capture function in a linked manner when the various applications are executed.
Figure 15B:
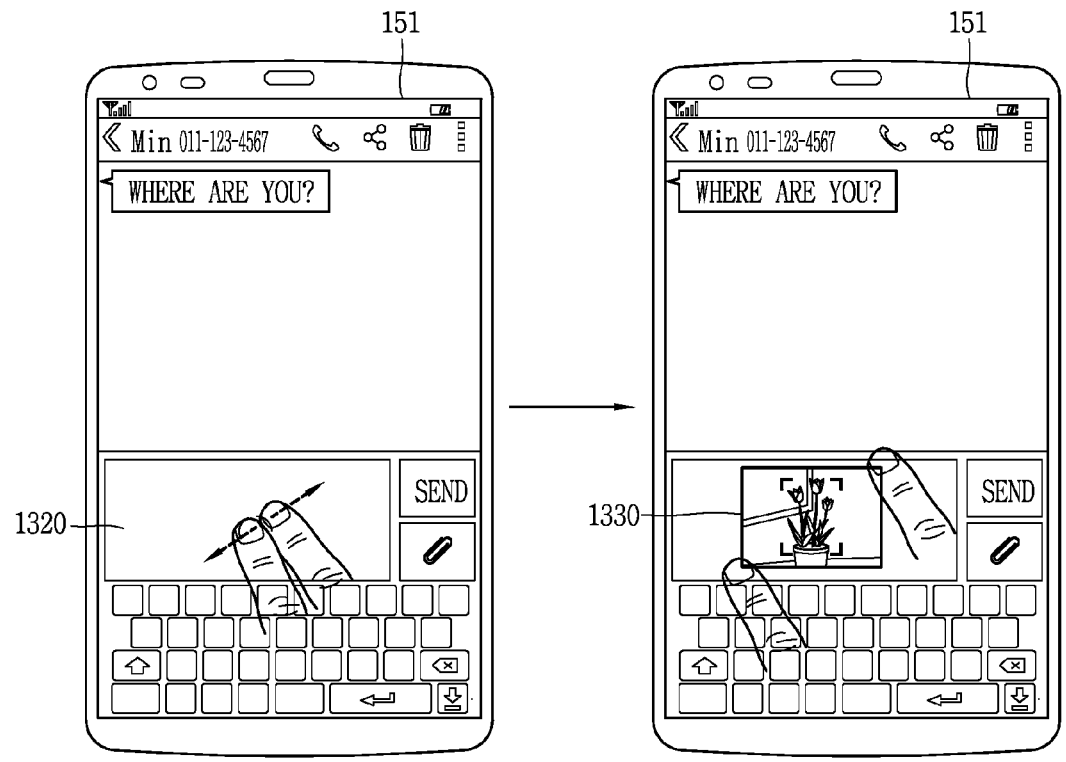
Figure 15C:
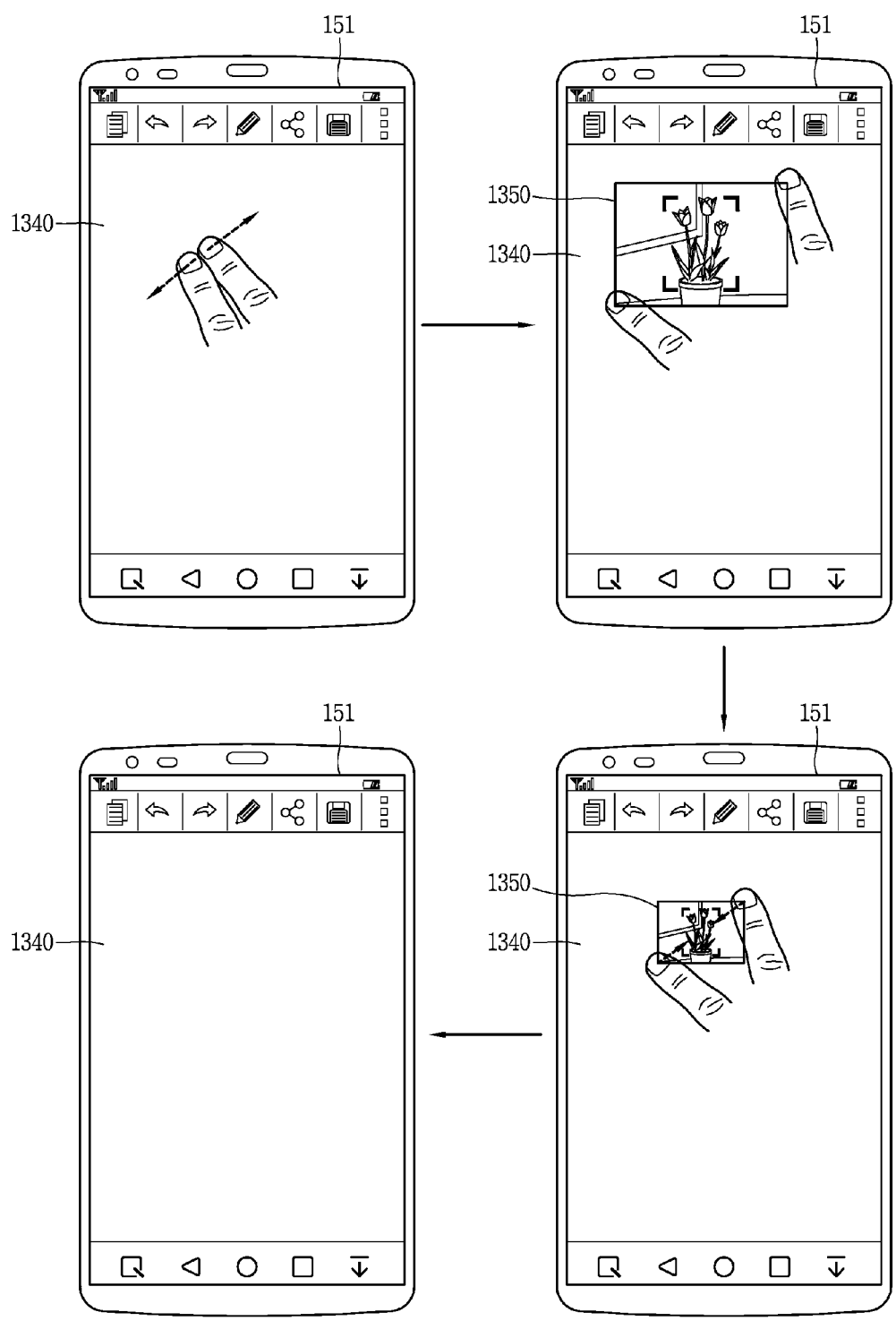

Hereinafter, a method of easily executing various applications and an image capture function in a linked manner when the various applications are executed will be described. FIGS. 15A, 15B and 15C are conceptual views illustrating a method of easily executing various applications and an image capture function in a linked manner when the various applications are executed.

The controller 180 of the mobile terminal according to an embodiment of the present disclosure can execute various applications with an image capture function in a linked manner during the execution of the various applications installed in the mobile terminal. In this instance, the controller 180 can immediately use an image captured through the image capture function as the input information of the application being executed.

Various applications installed in the mobile terminal may be an application having a function of using an image captured through the camera unit 121 as input information, an application having a function of transmitting an image captured through the camera unit 121 to an external terminal, and the like. For example, various applications installed in the mobile terminal include an application having a function of generating and storing contact information, an application having a message transmission function, an application having a memo function, and the like.

The controller 180 can execute the image capture function in linkage with an application being executed in response to a preset type of touch applied to a region in which an image captured through the image capture function is to be received on an execution screen of the application being executed. For example, as illustrated in the first drawing of FIG. 15A, the region in which the captured image is to be received as input information can be a region 1300 in which an image is to be received as contact information.

Here, when at least one of a first touch and a second touch is applied to the region in which the captured image is to be received as input information, and then a pinch-in touch for lengthening a relative distance between the first touch and the second touch is applied, the controller 180 can execute the executed application and the image capture function in a linked manner.

More specifically, when a first touch constituting the pinch-in touch is sensed in a region in which the captured image is to be received as input information on an execution screen of the application being executed, and a second touch constituting the pinch-in touch applied to the remaining region excluding the region in which an image captured through the image capture function is to be received as input information is sensed or both the first and the second touch constituting the pinch-in touch are applied to the region in which the captured image is to be received as input information, the controller 180 can execute the image capture function in linkage with the application being executed.

For example, as illustrated in the first drawing of FIG. 15A, when both the first and the second touch constituting the pinch-in touch are applied to the region 1300 in which an image is to be received as contact information, the controller 180 can execute the image capture function in linkage with the contact function. In another example, when a first touch constituting the pinch-in touch is applied to the region 1300 in which an image is to be received as contact information, and a second touch constituting the pinch-in touch is applied to a region excluding the region 1300 in which an image is to be received as contact information on an execution screen of the contact function, the controller 180 can execute the image capture function in linkage with the contact function. In other words, the present disclosure can provide a method of executing an image capture function even when it is difficult to sense both the first and the second touch constituting a pinch-in touch on a region in which the captured image is to be received as input information due to a narrow region in which the captured image is to be received as input information.

Here, the size of the execution screen 1310 of the image capture function can be determined as a size corresponding to a relative distance between the first and the second touch constituting the pinch-in touch. For example, as illustrated in the second drawing of FIG. 15A, the size of the execution screen 1310 of the image capture function can be determined as a size corresponding to a relative distance of the pinch-in touch.

Furthermore, the location of the execution screen 1310 of the image capture function can be configured with a region corresponding to a region from which the sense of the first and the second touch constituting the pinch-in touch is started. For example, as illustrated in the second drawing of FIG. 15A, the location of the execution screen 1310 of the image capture function can be a region corresponding to a region in which the pinch-in touch is initially sensed.

Here, the controller 180 can execute the image capture function in response to a pinch-in touch applied to a region capable of receiving an image on an execution screen of the application being executed. For example, as illustrated in the first drawing of FIG. 15A, the controller 180 can execute the image capture function based on a pinch-in touch applied to a region 1300 in which an image is to be received on the execution screen of an application having a function of generating and storing contact information. In this instance, as illustrated in the second drawing of FIG. 15A, the controller 180 can display the execution screen 1310 of the image capture function on one region of the execution screen of the application having a function of generating and storing contact information in an overlapping manner.

In another example, as illustrated in FIG. 15B, the controller 180 can display an execution screen 1330 of the image capture function on the display unit 151 based on a pinch-in touch applied to an input region 1320 of a message to be transmitted on the execution screen of an application having a message transmission function. In still another example, as illustrated in FIG. 15C, the controller 180 can display an execution screen 1350 of the image capture function on the display unit 151 based on a pinch-in touch applied to an input region 1340 of memo information on the execution screen of an application having a memo function.

Further, the controller 180 can end the execution of the image capture function based on a pinch-in touch applied to the execution screen of the image capture function when the image capture function is being executed in a linked manner.

The pinch-in touch may denote a touch for applying a first and a second touch to the region 1300 in which the image is to be received and then shortening a relative distance between the first and the second touch. For example, as illustrated in the third drawing of FIG. 15C, the controller 180 can sense a pinch-in touch applied to the execution screen 1350 of the image capture function. In this instance, the controller 180 can control the size of the execution screen 1350 of the image capture function to be reduced based on a relative distance of the pinch-in touch.

When a relative distance of the pinch-in touch is reduced below a preset distance, as illustrated in the fourth drawing of FIG. 15C, the controller 180 can end the execution of the image capture function, and control the display unit 151 to allow the execution screen 1350 of the image capture function to disappear on the display unit 151.

Moreover, when a drag input moving in a horizontal direction is applied on the execution screen of the image capture function when the image capture function is executed in linkage with any one function, the controller 180 can display the execution screen of the image capture function instead of the execution screen of the any one function in the whole display region of the display unit 151. In this instance, when performing capture through the image capture function and then executing any one function again, the controller 180 can display an image captured through the image capture function in a linked manner on one region of the execution screen of the any one function.

Through this, the present disclosure can immediately provide image information as an input without executing an additional image capture function with respect to various input regions for receiving an image as information.

Figure 16A:
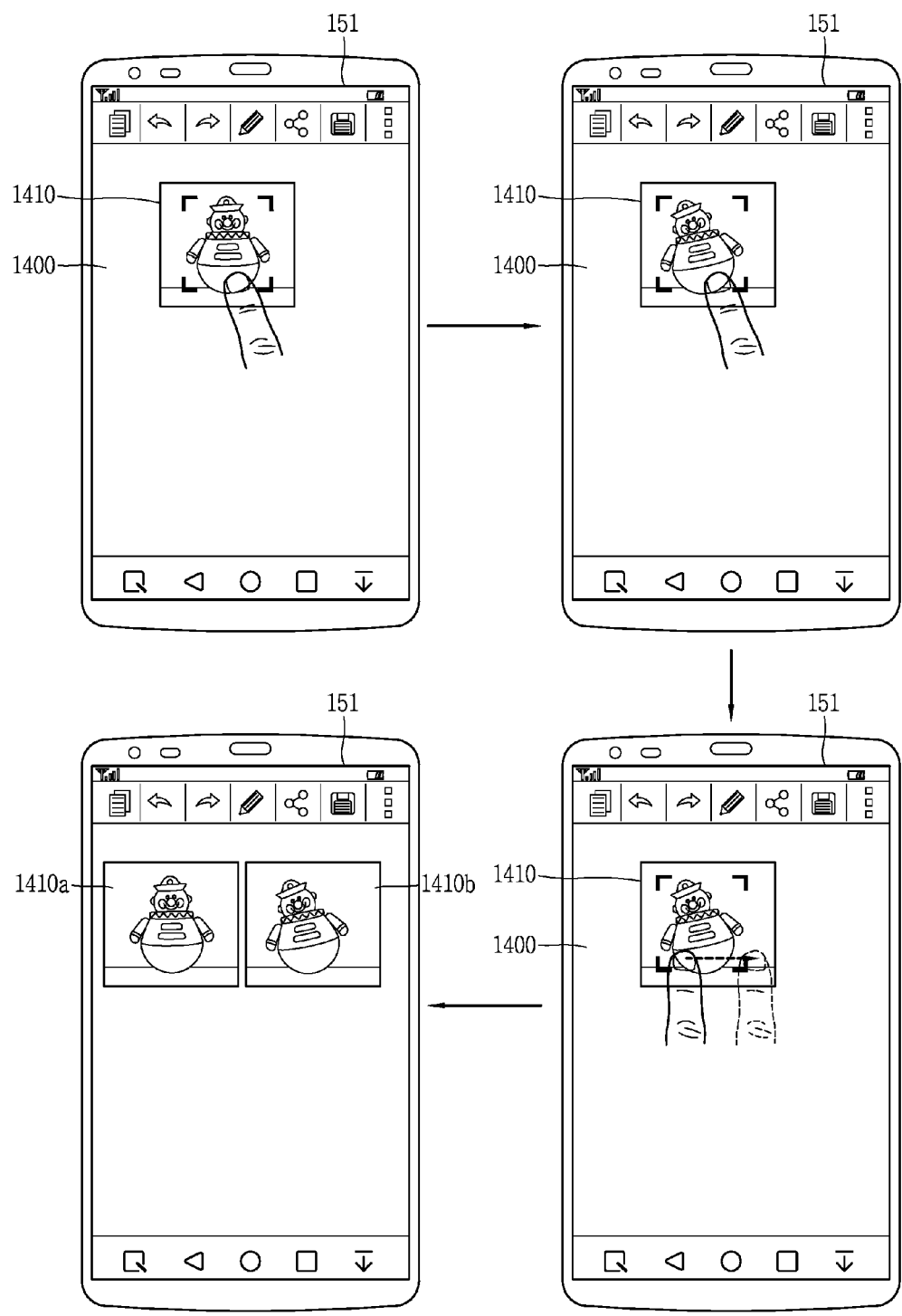
FIGS. 16A, 16B and 16C are conceptual views illustrating a method of capturing an image when a memo function and an image capture function are executed in a linked manner.
Figure 16B:
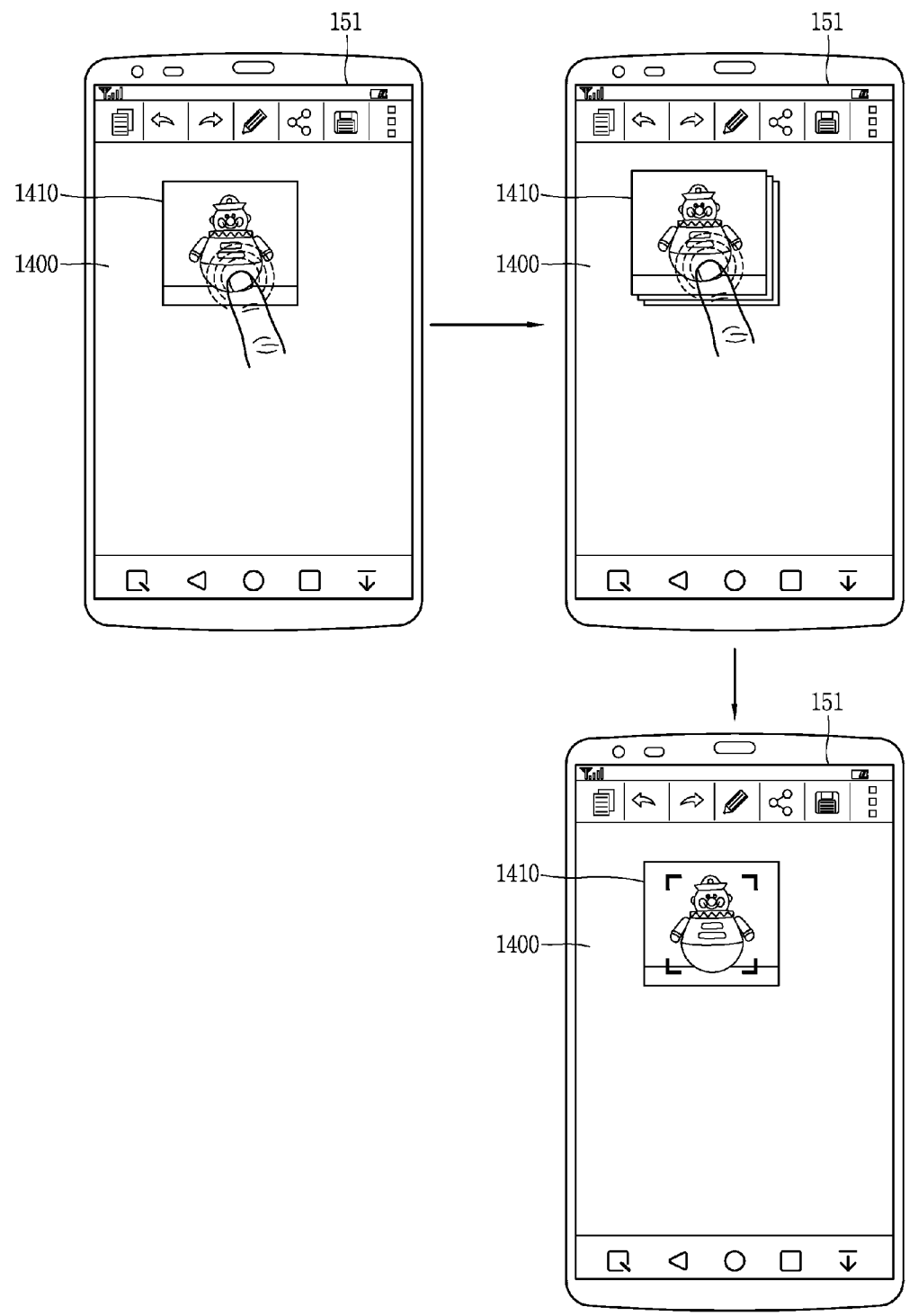
Figure 16C:
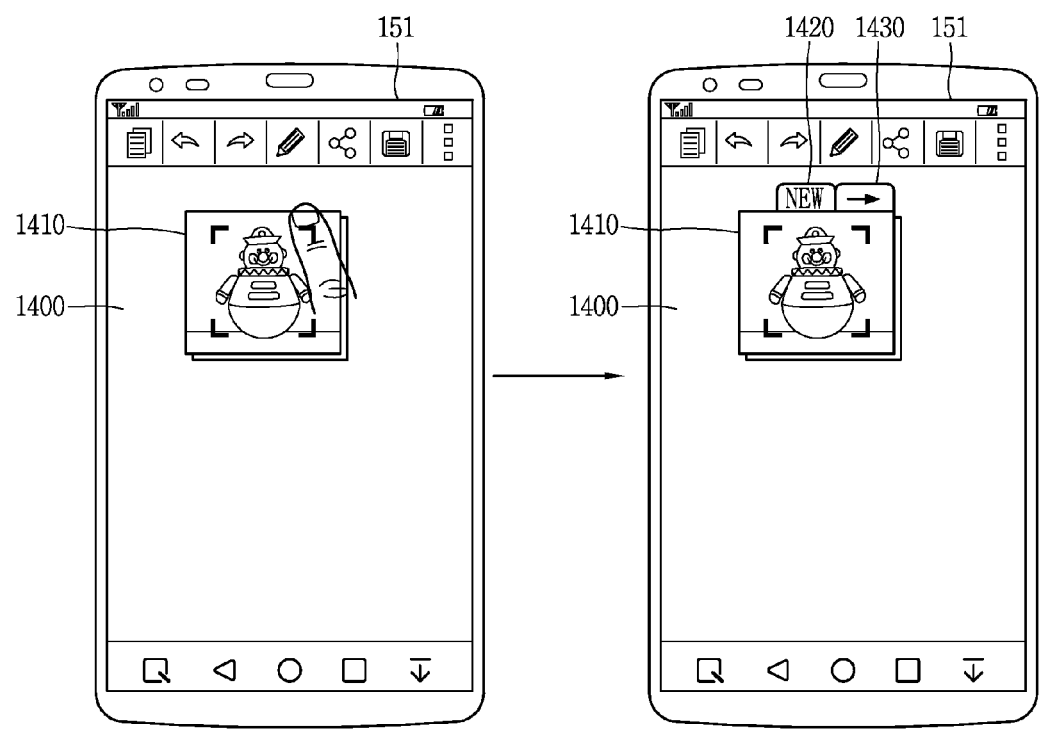

Hereinafter, a method of controlling the captured image when a memo function and an image capture function are executed in a linked manner will be described. FIGS. 16A, 16B and 16C are conceptual views illustrating a method of capturing an image when a memo function and an image capture function are executed in a linked manner. In addition, FIGS. 17A to 17G are conceptual views illustrating a method of editing the captured image when a memo function and an image capture function are executed in a linked manner.

The controller 180 of the mobile terminal according to an embodiment of the present disclosure can display an execution screen 1410 indicating an image capture function on one region of the execution screen 1400 of a memo function when the memo function and the image capture function are executed in a linked manner. Here, the controller 180 can execute a different function in response to a different touch applied to the execution screen 1410 indicating an image capture function.

A function executed in response to a different touch on an execution screen indicating the image capture function may be pre-configured when shipped out of the factory or configured by a user. For example, as illustrated in the first drawing of FIG. 16A, the controller 180 can capture an image based on a first touch applied thereto when a preview image is displayed on the execution screen 1410 indicating the image capture function. The first touch may be various touch modes. For example, the first touch may be a short touch.

Furthermore, as illustrated in the second drawing of FIG. 16A, subsequent to capturing the image, the controller 180 can capture an image based on the first touch applied again on the execution screen 1410 indicating the image capture function. In other words, the present disclosure can consecutively capture a plurality of images in response to a first touch on the execution screen 1410 indicating the image capture function. For example, the controller 180 can capture two images in response to a first touch being applied twice on the execution screen 1410 indicating the image capture function. In this instance, the controller 180 can link between the captured plurality of images, and store link information in which the plurality of images are linked with each other along with the plurality of images.

Further, the controller 180 can perform a different function according to whether or not there is any previously captured image or the number of previously captured images when a preview image is displayed on the execution screen 1410 of the image capture function. For example, when a second touch is applied when a preview image is displayed on the execution screen 1410 of the image capture function while there is no previously captured image. The controller 180 can display a preview image received from a different camera. For example, a preview image received from a front camera and a preview image received from a rear camera may be displayed on the display unit 151.

In another example, when a second touch is applied when a preview image is displayed on the execution screen 1410 of the image capture function while there is one previously captured image, the controller 180 can display the preview image and the captured image together on the display unit 151. For still another example, as illustrated in the third and the fourth drawing of FIG. 16A, when a second touch is applied when a preview image is displayed on the execution screen 1410 of the image capture function while there is two or more previously captured images, the controller 180 can display a plurality of images 1410a, 1410b linked with each other on the display unit 151. The second touch may be various touch modes. For example, the second touch may be a drag touch.

Furthermore, the controller 180 can perform a different function according to screen information displayed on the execution screen indicating the image capture function. More specifically, the controller 180 can perform a different function according to whether a preview image or previously captured image is displayed on the execution screen indicating the image capture function.

For example, as illustrated in the first and the second drawing of FIG. 16B, the controller 180 can execute a function of editing the linked plurality of images based on a third touch being applied when a preview image is displayed on the execution screen 1410 indicating the image capture function. Here, at least one of the linked plurality of images may be displayed on the execution screen 1410 indicating the image capture function.

Furthermore, as illustrated in the second and the third drawing of FIG. 16B, the controller 180 can display a preview image for capturing an image again in response to a third touch being applied when a function of editing the linked plurality of images is executed and at least one of the linked plurality of images is displayed on the execution screen 1410 indicating the image capture function. In this instance, the controller 180 can end a function of editing the linked plurality of images and execute a function of capturing an image again.

Furthermore, the controller 180 can generate new link information to store an image as the new link information based on a touch applied to an edge region of the execution screen 1410 indicating the image capture function. The link information may be information in which a plurality of images are linked with each other as described above.

Here, for the link information, when the maximum number of images that can be linked with each other is limited or a preset condition is satisfied, a new link may be generated. For example, when ten images can be linked with one link information, the controller 180 can store images excessively captured more than 10 images using new link information. The preset condition may be at least one of a change condition of capture location information, a change condition of an application executed in linkage with an image capture function, an on/off condition of power of the mobile terminal, and a change condition of capture time information.

For example, when determined that the capture location information of the captured image has been changed, the controller 180 can store an image captured with new link information. Here, the controller 180 can store an image captured prior to changing the capture location information in linkage with link information prior to the generation of new link information.

Furthermore, the controller 180 can display a graphic object 1420 indicating a function of generating new link information to store an image with new link information and a graphic object 1430 indicating a function of displaying an image captured with previous link information based on a touch applied to an edge region of the execution screen 1410 indicating the image capture function.

In this instance, the controller 180 can generate new link information in response to a touch to the graphic object 1420 indicating a function of generating new link information, and store an image captured afterwards in linkage with new link information. Through this, the present disclosure can link information in association with each other on each link information.

Figure 17A:
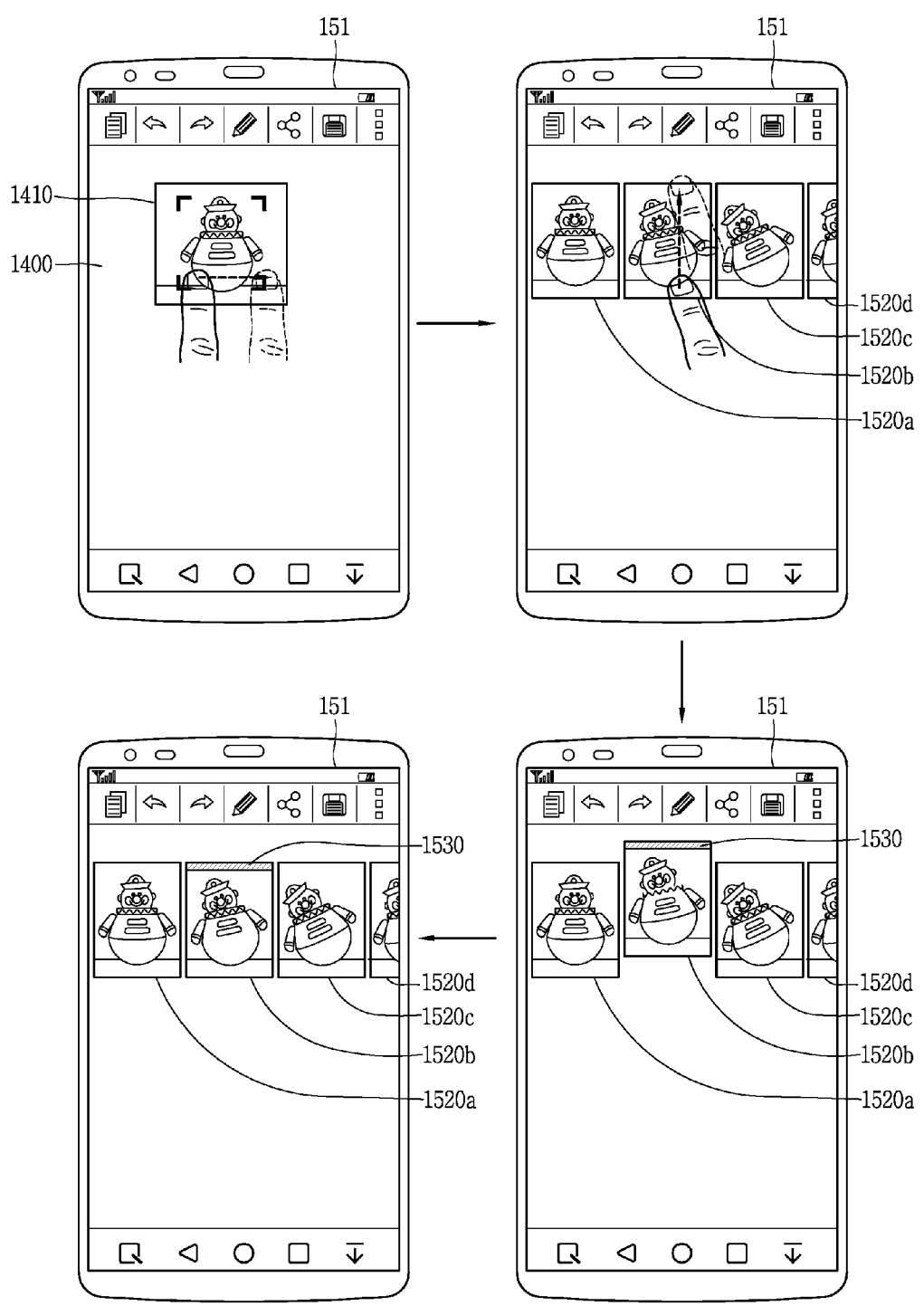
FIGS. 17A, 17B, 17C, 17D, 17E, 17F and 17G are conceptual views illustrating a method of editing the captured image when a memo function and an image capture function are executed in a linked manner.

Further, as illustrated in the first and the second drawing of FIG. 17A, the controller 180 can display a plurality of linked images 1520*a*, 1520*b*, 1520*c*, 1520*d* on the display unit 151 based on a second touch applied to the execution screen 1410 indicating the image capture function. Here, the controller 180 can edit the linked plurality of images 1520*a*, 1520*b*, 1520*c*, 1520*d* based on a preset type of touch. The preset type of touch may be a flicking touch having a preset direction, a pinch-out touch, a drag touch, and the like.

The edit of the image may be an operation of configuring a display on the linked plurality of images, an operation of inserting an additional image to the linked plurality of images, an operation of deleting any one of the linked plurality of images from link information, an operation of changing a representative image on the linked plurality of images, an operation of transmitting any one of the linked plurality of images to an external terminal, an operation of transmitting any one of the linked plurality of images to an external server, and the like. The operation of configuring a display on the linked plurality of images may denote an operation of displaying a user's symbol for the linked plurality of images or containing an additional graphic object in the linked plurality of images to use an image configured with the display for memory use afterwards.

For example, as illustrated in the second drawing of FIG. 17A, the controller 180 can configured a display indicating "Like" on an image of the any one image 1520*b* based on a flicking touch having a direction in an upward direction from the bottom based on a front surface of the display unit 151 to any one image 1520*b* among the linked plurality of images 1520*a*, 1520*b*, 1520*c*, 1520*d*.

Here, as illustrated in the third and the fourth drawing of FIG. 17A, the controller 180 can provide an animation effect of moving the any one image 1520*b* up and down based on a current display region in response to a flicking touch applied to the any one image 1520*b*. Furthermore, the controller 180 can display a graphic object 1530 indicating that the display "Like" is set to overlap with the any one image. Through this, the present disclosure can notify the user that a display indicating additional information has been set to the linked plurality of images, respectively. Moreover, the present disclosure can configure the display indicating additional information to visually provide additional information to the user.

Further, the controller 180 can delete the any one image from the linked plurality of images based on a flicking touch having a direction in an downward direction from the top based on a front surface of the display unit 151 to another image among the linked plurality of images 1520*a*, 1520*b*, 1520*c*, 1520*d*. In this instance, the controller 180 can delete the deleted another image on link information linked with the linked plurality of images.

Furthermore, the controller 180 can add a new image between a first image 1520*b* and a second image 1520*c* in response to a pinch-out touch applied to a region between the first image 1520*b* and second image 1520*c* when at least part of the linked plurality of images 1520*a*, 1520*b*, 1520*c*, 1520*d* are displayed. For example, as illustrated in the first and the second drawing of FIG. 17B, the controller 180 can display a preview image in a region between the first image 1520*b* and the second image 1520*c* in response to a pinch-out touch applied between the first image 1520*b* and second image 1520*c*.

Figure 17B:
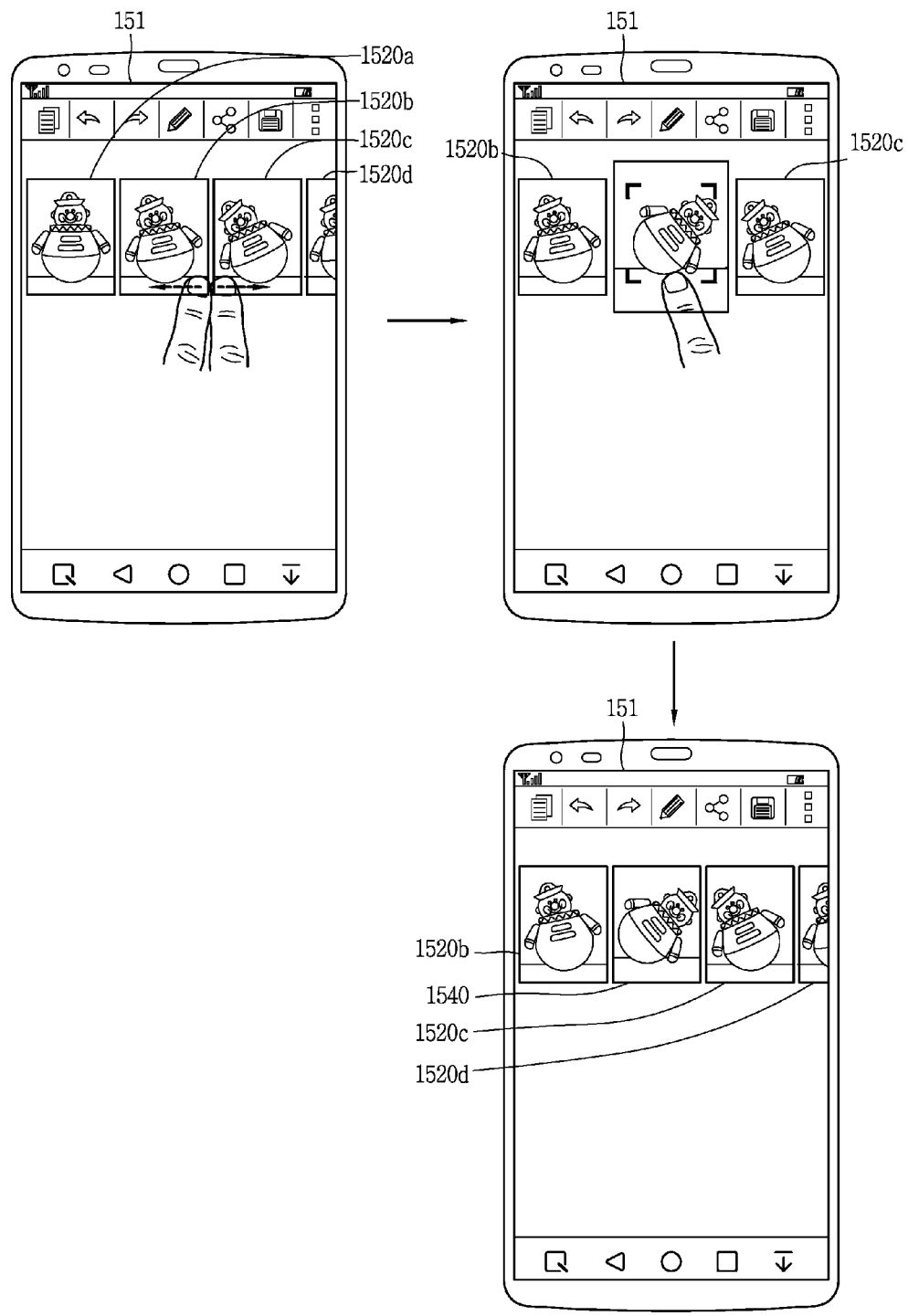

Here, as illustrated in the third drawing of FIG. 17B, the controller 180 can add a new image 1540 between the first image 1520*b* and second image 1520*c* based on a touch applied to the preview image. When the new image 1540 is added, the controller 180 can add and store the new image 1540 on the link information of the first image 1520*b* and second image 1520*c*.

Furthermore, the controller 180 can capture a plurality of images through an image capture function executed in linkage with a memo function, and then link the plurality of images therewith, and store the linked link information along with the plurality of images.

Figure 17C:
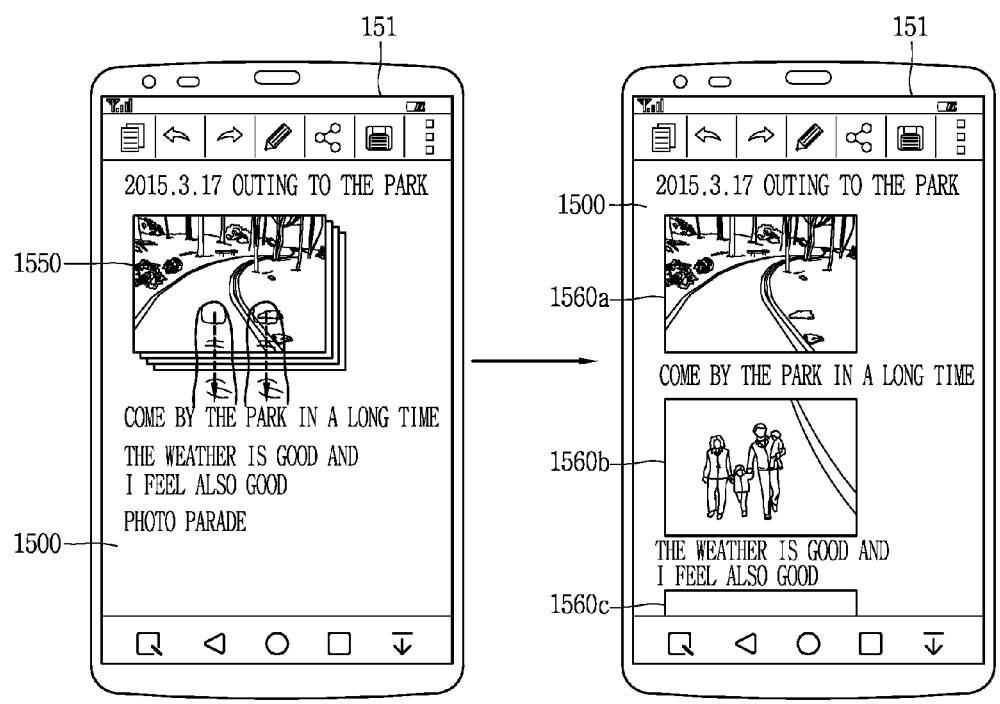
Figure 17D:
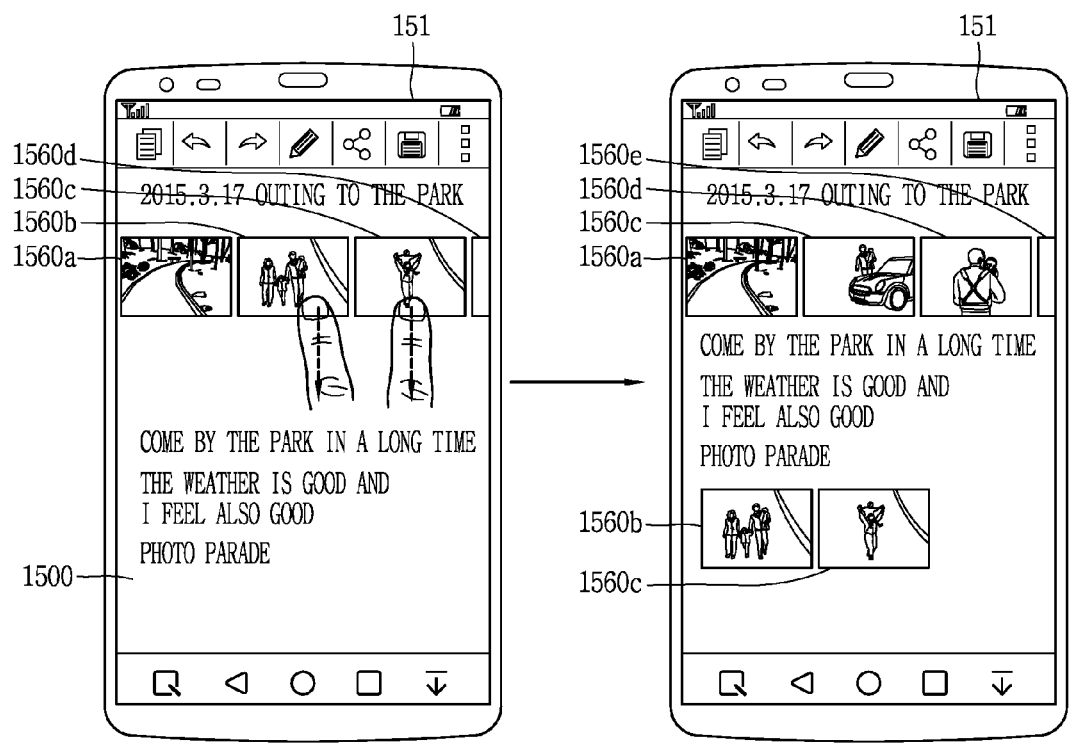
Figure 17E:
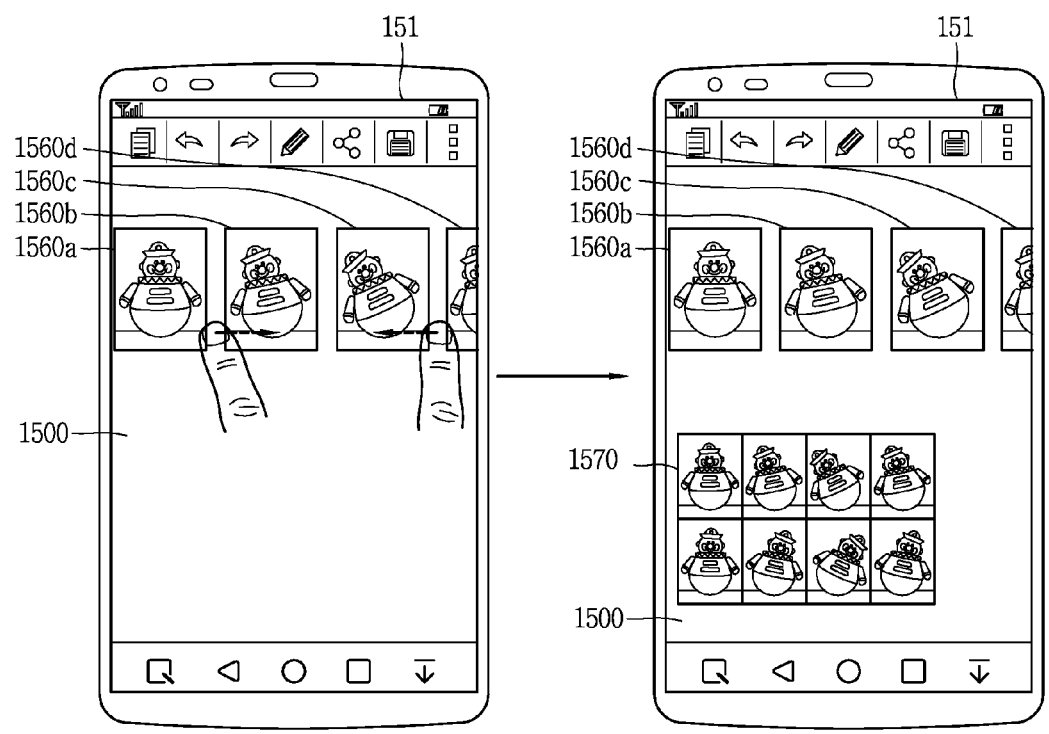

Here, as illustrated in the first drawing of FIG. 17C, the controller 180 can display the linked plurality of images 1550 on the execution screen of the memo function in an overlapping form. More specifically, the controller 180 can display the linked plurality of images 1550 in such a form that any one of the linked plurality of images 1550 overlaps with another image thereof.

Here, as illustrated in the second drawing of FIG. 17C, the controller 180 can change the display location of the linked plurality of images to sequentially display the linked plurality of images between sentences contained in the text information based on at least two drag touches applied to different regions with respect to the at least one image 1550.

More specifically, the controller 180 can detect a sentence contained in the text information based on two drag touches applied to different regions with respect to the at least one image 1550. Furthermore, the controller 180 can change the display location of the linked plurality of images to insert one of the linked plurality of images between the detected each sentence. Through this, the controller 180 can edit the linked plurality of images and text information in an easy and fast manner.

Furthermore, the controller 180 can change the display location of the at least one image based on a drag input applied to at least one image when at least part 1520*a*, 1520*b*, 1520*c*, 1520*d* of the linked plurality of images are displayed. For example, as illustrated in the first drawing of FIG. 17D, the controller 180 can sense drag inputs being applied to the first image 1520*b* and second image 1520*c*, respectively at the same time, among the at least part 1520*a*, 1520*b*, 1520*c*, 1520*d* of the linked plurality of images. In this instance, as illustrated in the second drawing of FIG. 17D, the controller 180 can move the first image 1520*b* and second image 1520*c* at the same time based on the drag inputs from the first region to display them on the second region.

Furthermore, the controller 180 can merge the linked plurality of images into one image based on the link information of the linked plurality of images based on a pinch-in touch applied to at least three images when the at least part 1520*a*, 1520*b*, 1520*c*, 1520*d* of the linked plurality of images are displayed. For example, as illustrated in FIG.

17E, the controller 180 can generate one image 1570 into which eight linked images are merged based on a pinch-in touch applied to the at least part 1520a, 1520b, 1520c, 1520d of the linked plurality of images. Here, the merged one image 1570 may be generated using a thumbnail image of the eight images.

Furthermore, when only a representative image 1590a is displayed in a form that text information overlaps with the linked plurality of images on an execution screen of the memo function, the controller 180 can set the representative image 1590a based on a drag input. For example, as illustrated in the first drawing of FIG. 17F, when a drag input is applied to the representative image 1590a when only a representative image 1590a is displayed in a form that text information overlaps with the linked plurality of images on an execution screen of the memo function, the controller 180 can execute a function of setting the representative image. For example, as illustrated in the second drawing of FIG. 17F, the controller 180 can display the at least part 1590a, 1590b, 1590c of the linked plurality of images and graphic objects 1580a, 1580b, 1580c associated with the representative image setting of each image at the same time.

Figure 17F:
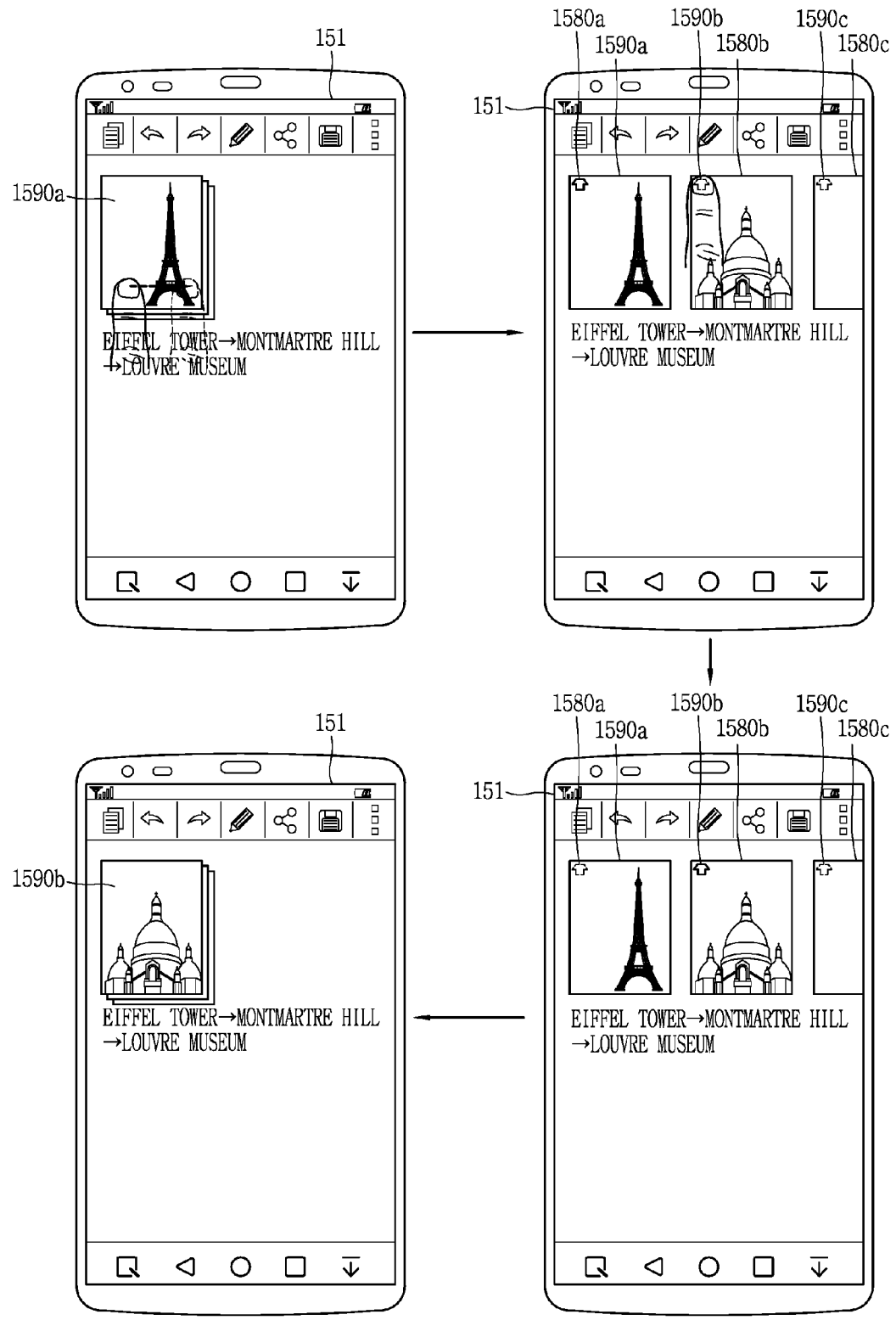

In this instance, as illustrated in the third drawing of FIG. 17F, the controller 180 can set the representative image using the graphic objects 1580a, 1580b, 1580c associated with the representative image setting of each image. For example, as illustrated in the fourth drawing of FIG. 17F, the controller 180 can change the representative image to an image 1590b linked with the any one graphic object in response to a touch applied to any one graphic object 1580b among the graphic objects 1580a, 1580b, 1580c associated with the representative image setting of each image.

The controller 180 can control the display unit 151 to display a first region in which the at least part 1520a, 1520b, 1520c, 1520c of the linked plurality of images are displayed and a second region in which text information and the at least part 1520a, 1520b, 1520c, 1520c of the linked plurality of images are displayed at the same time. For example, as illustrated in the first drawing of FIG. 17G, the display unit 151 may include a first region in which the at least part 1520a, 1520b, 1520c, 1520c of the linked plurality of images are displayed and a second region in which text information and the at least part 1520a, 1520b, 1520c, 1520c of the linked plurality of images are displayed at the same time.

The controller 180 can scroll the first and the second region based on a touch to the display unit 151 when a first region in which the at least part 1520a, 1520b, 1520c, 1520c of the linked plurality of images are displayed and a second region in which text information and the at least part 1520a, 1520b, 1520c, 1520c of the linked plurality of images are displayed at the same time are displayed thereon. Here, as illustrated in FIG. 17G, the controller 180 can display an indicator 2000 indicating a scroll level at the same time.

Figure 17G:
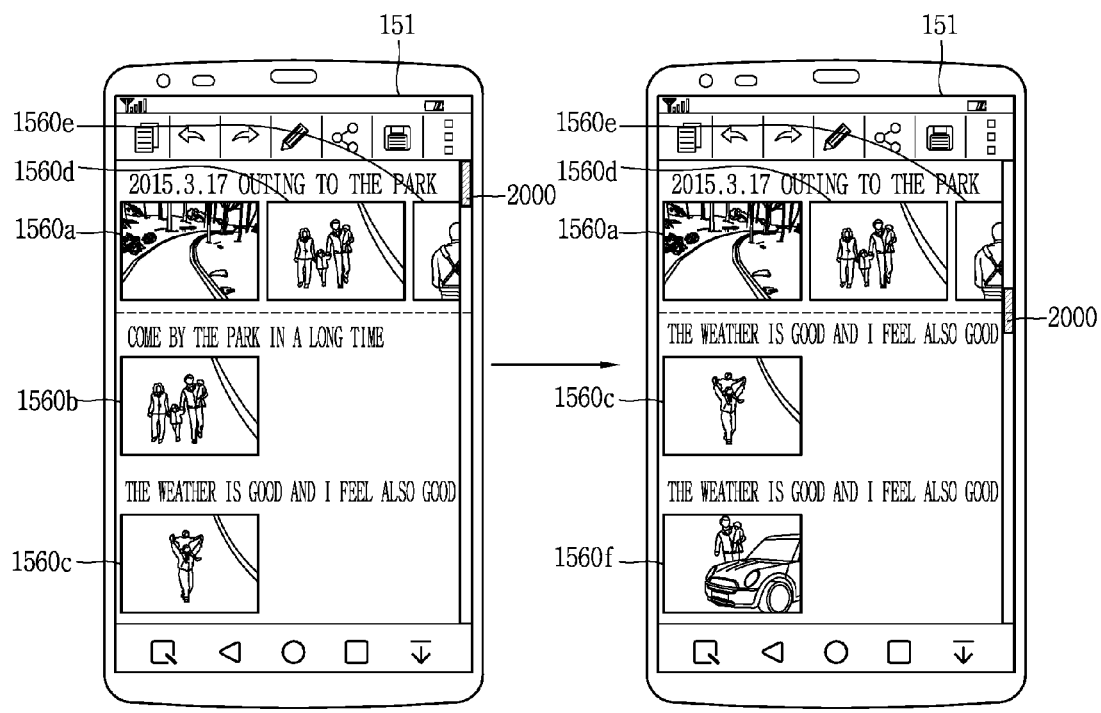

Further, as illustrated in the second drawing of FIG. 17G, when the touch is applied, the controller 180 can scroll only the second region without scrolling the first region. In other words, the controller 180 can not scroll the first region even when a control command for applying scroll to the entire display unit 151. In this instance, the controller 180 can provide information displayed in the first region to a user regardless of the scroll. Through this, the present disclosure can edit the linked plurality of images.

Hereinafter, a method of linking text information with image information will be described. FIGS. 18A, 18B, 18C and 18D are conceptual views illustrating a method of linking text information with image information. The controller 180 of the mobile terminal 100 according to an embodiment of the present disclosure can store and generate link information in which text or voice information is linked with an image captured through the image capture function.

Here, the controller 180 can link one image with one text or voice information to generate link information. For example, as illustrated in the first drawing of FIG. 18A, the controller 180 can generate link information in which voice information "Paris Louvre Museum" is linked with a first image 1600.

Figure 18A:
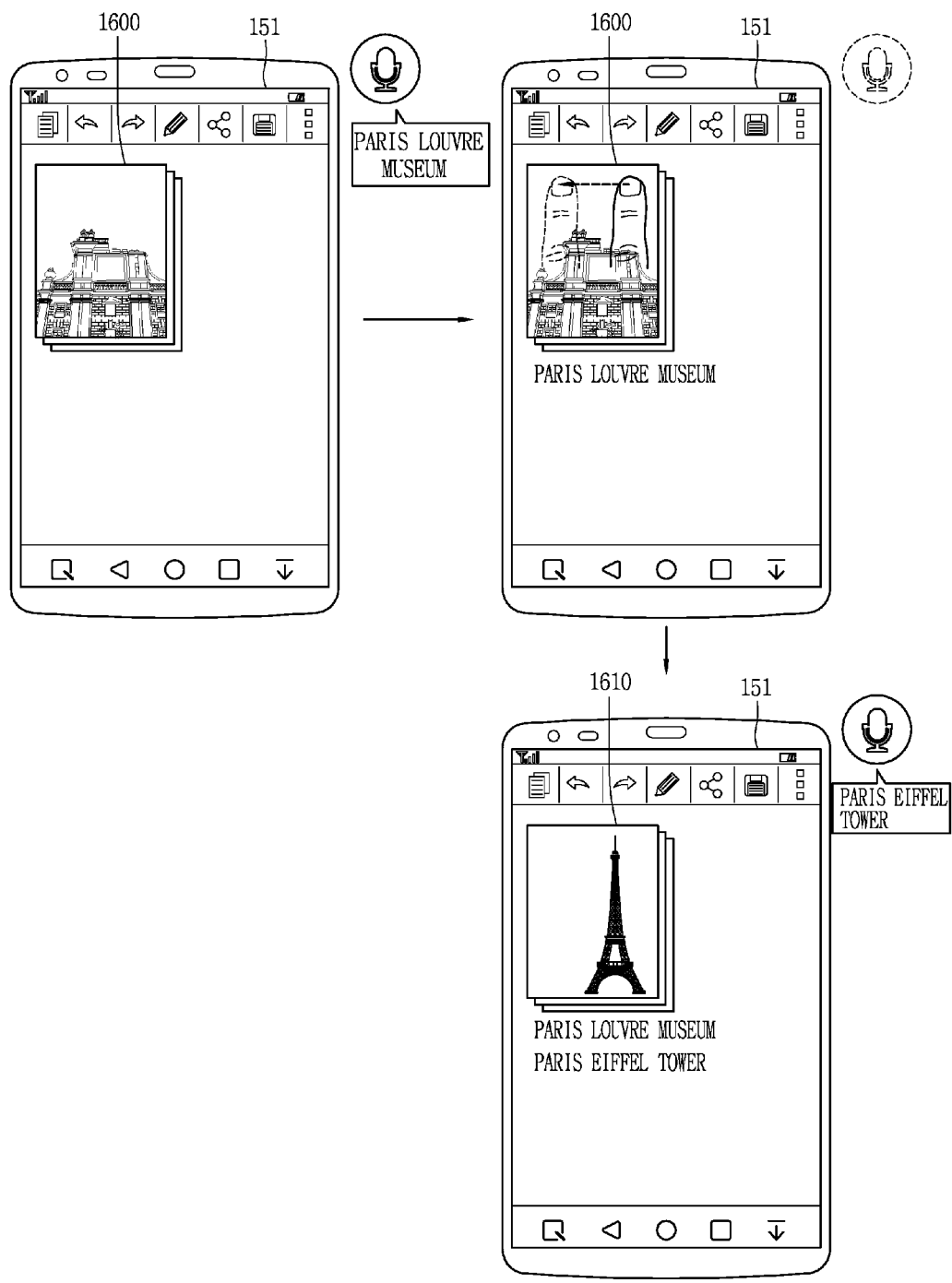
FIGS. 18A, 18B, 18C and 18D are conceptual views illustrating a method of linking text information with image information.

Here, as illustrated in the second and the third drawing of FIG. 18A, the controller 180 can execute a function of linking text or voice information with a second image 1610 different from the first image 1600 in response to a drag input to the first image 1600. For example, the controller 180 can generate link information in which voice information "Paris Eiffel Tower" is linked with the second image.

When the image is displayed on the display unit 151, the controller 180 can provide the image and text or voice information linked with the image at the same time based on link information linked with the image. Here, when there is link information in which the image is linked with text information, the controller 180 can provide only an image linked with specific text information using a tag image indicating the link information. The tag image may be an image indicating a function capable of accessing information connected to a tag image in an easy and fast manner.

Figure 18B:
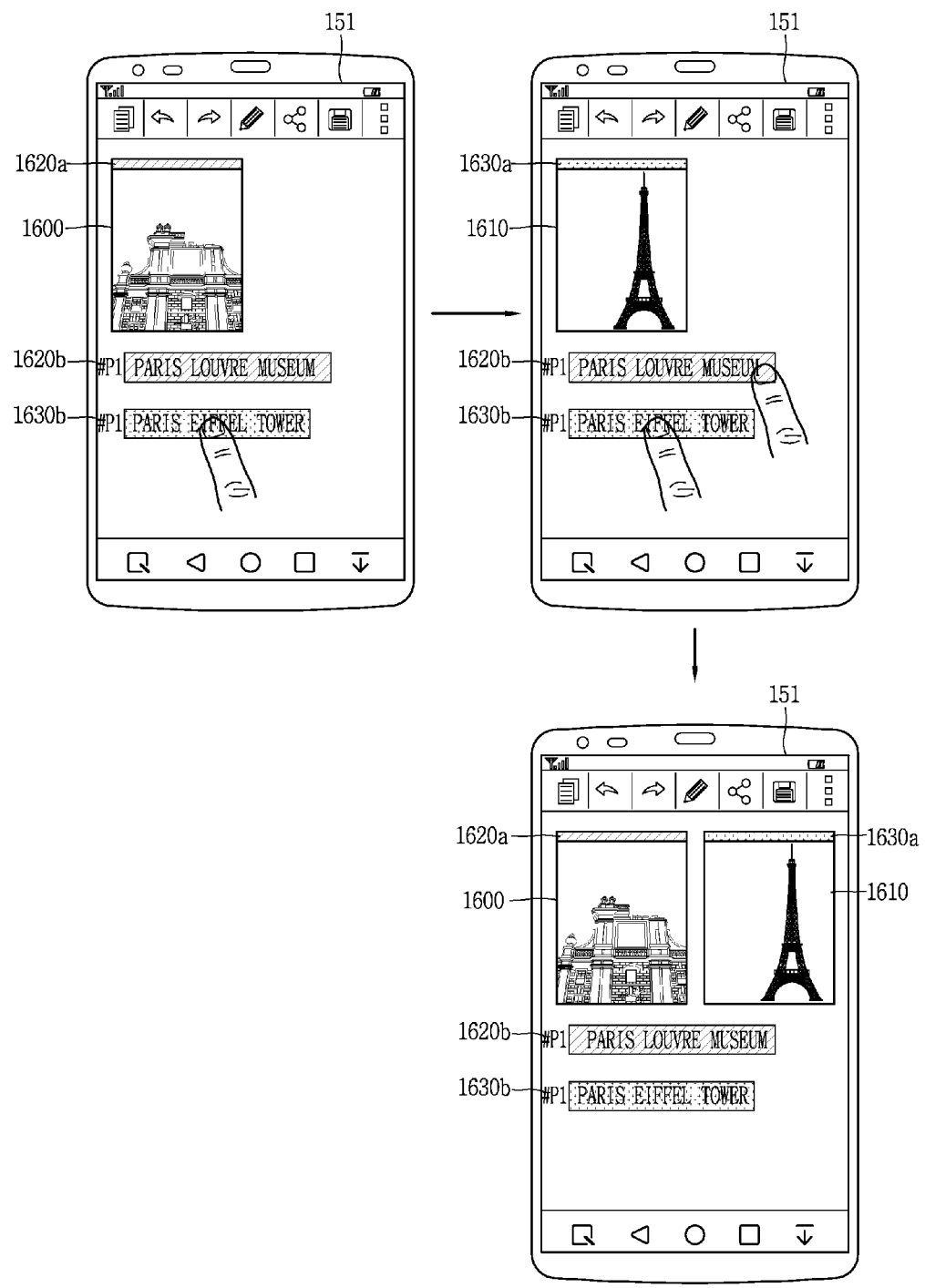

For example, the tag image may be a hash tag form (#+text), text information itself, or color indicator. The color indicator may be a graphic object having a different color. As illustrated in FIG. 18B, the tag image may be a hash tag form 1620b, 1630b, text information itself, or color indicator 1620a, 1630a.

Here, the controller 180 can display an image connected to any one of a plurality of tag images on the display unit 151 based on the any one tag image being selected. For example, as illustrated in the second drawing of FIG. 18B, the controller 180 can display an image 1610 connected to "Paris Eiffel Tower" on the display unit 151 based on a tag image for "Paris Eiffel Tower" selected when an image 1600 connected to a tag image indicating "Paris Louvre Museum" is displayed. In this instance, the controller 180 can allow the image 1600 connected to the tag image "Paris Louvre Museum" to disappear on the display unit 151.

In other words, when there are a large number of images, the present disclosure can quickly access a specific image using a tag image, thereby accessing a required image in an easy and fast manner. Furthermore, the controller 180 can provide images connected to at least two or more tag images based on at least two or more tag images selected at the same time. For example, as illustrated in the second and the third drawing of FIG. 18B, the controller 180 can display the image 1600 connected to the tag image indicating "Paris Louvre Museum" and the image 1610 connected to the tag image indicating "Paris Eiffel Tower" at the same time on the display unit 151 based on the tag image indicating "Paris Louvre Museum" and the tag image indicating "Paris Eiffel Tower" selected at the same time.

Furthermore, the controller 180 can link a plurality of images with one sentence. For example, as illustrated in the first drawing of FIG. 18C, the controller 180 can execute a memo function and an image capture function in a linked manner, and then display an execution screen 1640a of the image capture function on one region of an execution screen of the memo function. Here, the controller 180 can execute a voice recognition function based on a long touch applied to the execution screen 1640a of the image capture function.

When the long touch is continuously sensed, the controller 180 can perform the capture of an image based on a short touch applied to the execution screen 1640a of the image capture function.

Figure 18C:
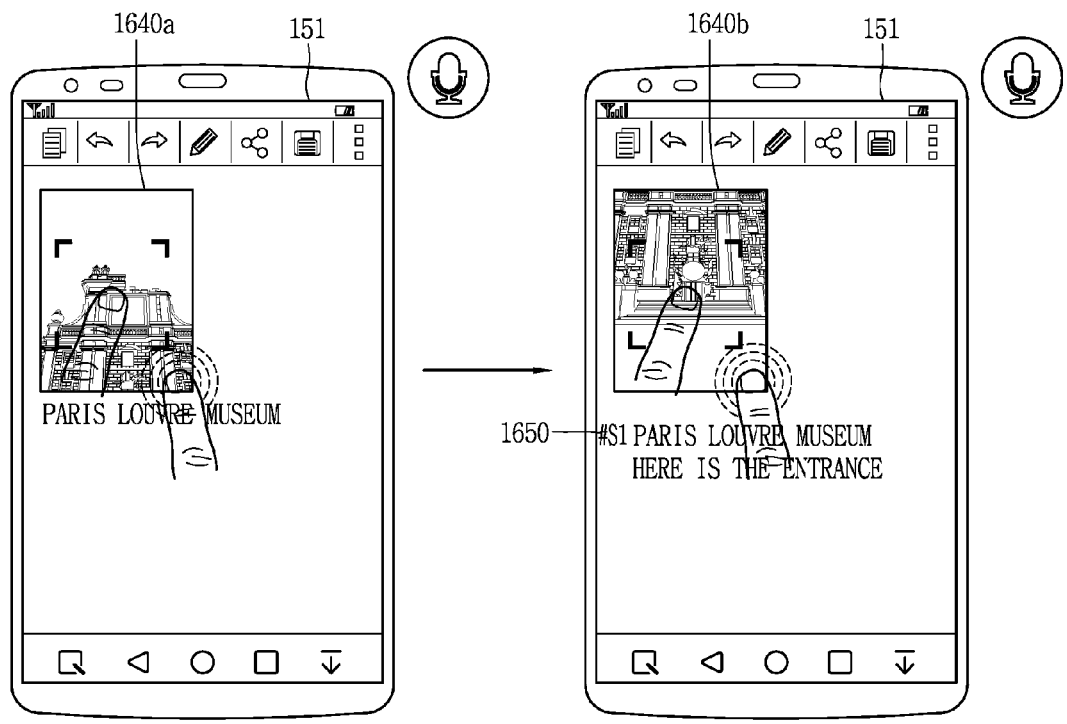

Here, the controller 180 can generate link information in which a voice recognized according to the voice recognition function is linked with the captured image. Here, the captured image may be a plural number. In other words, link information linked with the plurality of images may be stored in the recognized voice. For example, as illustrated in FIG. 18C, the controller 180 can link the first image 1640a and the second image 1640b with a voice "Here is the entrance of the Paris Louvre Museum". The link information may further include the voice recording time point and the capture time point information of the image.

When a plurality of images are linked with the one voice, the controller 180 can provide the plurality of images linked with the one voice in a slide form while outputting the one voice. The slide form may denote a form in which the plurality of images are provided by automatically switching any one image to another image among a plurality of images on the display unit without any user's additional control command.

Furthermore, when the one voice is linked with a plurality of images, the controller 180 can display a tag image in a different format from when one image is linked with the one voice. For example, as illustrated in the first drawing of FIG. 18D, the tag image may be displayed with #S1.

Figure 18D:
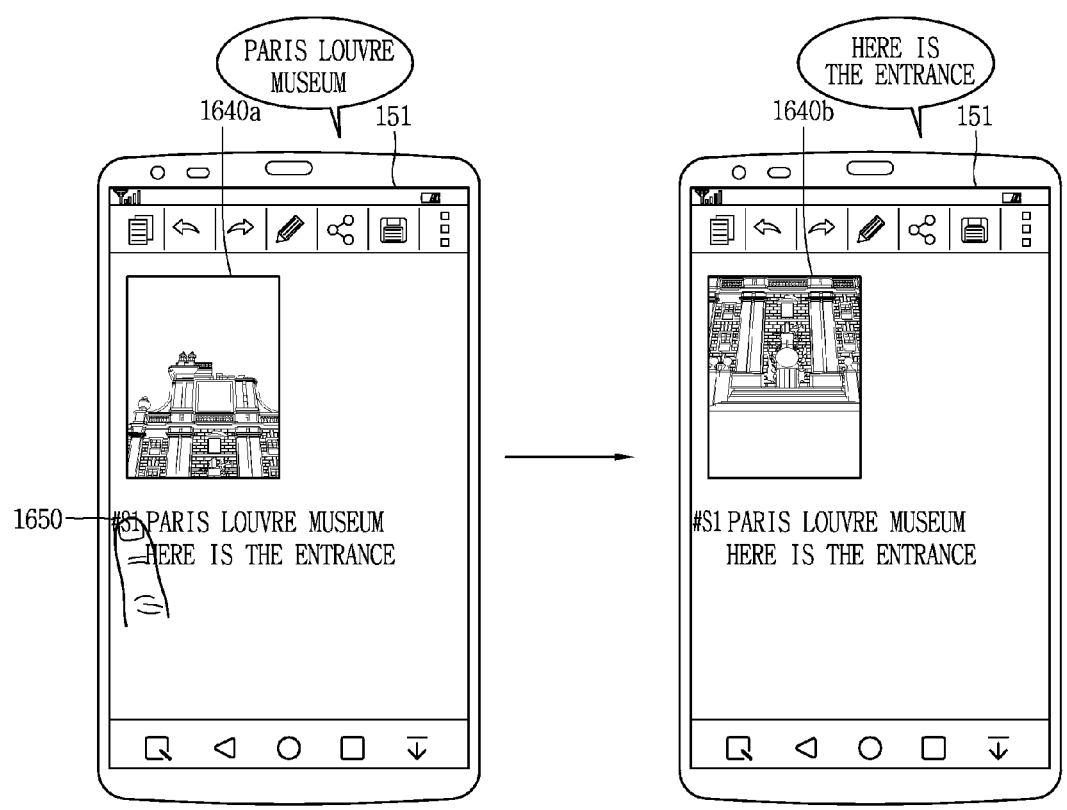

When the tag image is selected, as illustrated in FIG. 18D, the controller 180 can display the first image 1640a and the second image 1640b in a slide form when the one voice is output. Here, the controller 180 can determine the output time point of the voice with the first image 1640a and the second image 1640b based on the voice recording time point information and the capture time point information of the image contained in the link information.

More specifically, the controller 180 can map a recording time point of the voice to a capture time point of the first image 1640a and the second image 1640b to determine the output time point of the voice with the first image 1640a and the second image 1640b. For example, as illustrated in FIG. 18D, a voice "Paris Louvre Museum" may be output along with the first image 1640a, and a voice "Here is the entrance" may be output along with the second image 1640b.

Furthermore, the controller 180 can determine the output time point of the voice based on a user's control command. For example, the controller 180 can display "Here is the entrance of the Paris Louvre Museum" on the display unit 151 as information converted from voice to text.

Here, the user may apply a touch to a region in which "entrance" is displayed on a region in which the "Here is the entrance of the Paris Louvre Museum" is displayed. In this instance, the controller 180 can output voice from a voice corresponding to "entrance". At the same time, the controller 180 can display the second image 1640b mapped to the "entrance".

Figure 19:
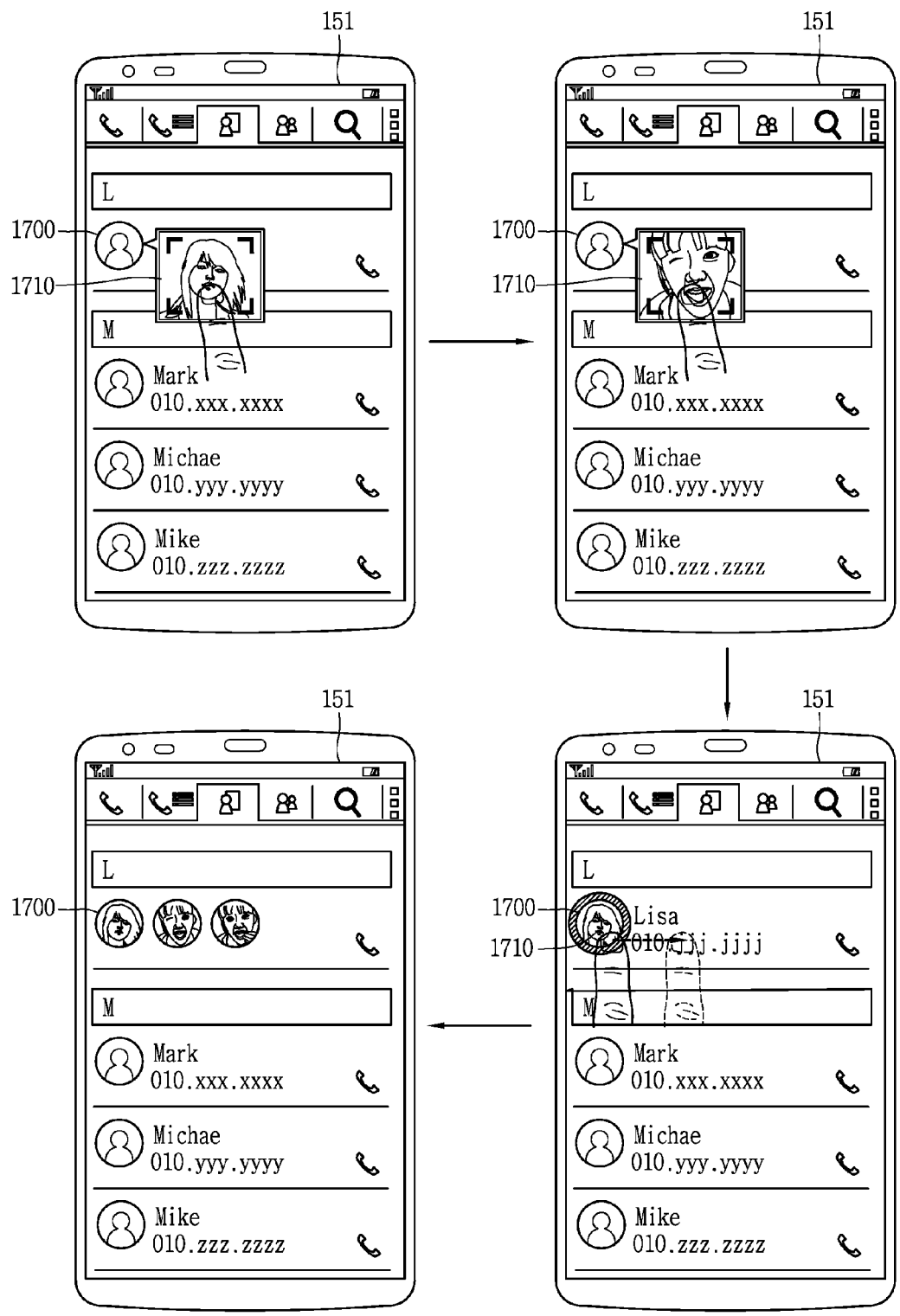
FIG. 19 is a conceptual view illustrating a method of inserting a linked image into contact information.

In other words, when the time point of the voice output is changed by a user's control command, the controller 180 can change an image displayed in the slide form along with the voice output. In the above, a method of linking image information with a memo function has been described. Hereinafter, a method of inserting a linked image into contact information will be described. FIG. 19 is a conceptual view illustrating a method of inserting a linked image into contact information.

The controller 180 of the mobile terminal 100 according to an embodiment of the present disclosure can execute a function of providing contact information and an image capture function in a linked manner. The contact information may be the identification information of an external terminal, such as phone number information, email information, a user name, a user image, and the like.

The execution of the function of providing contact information and the image capture function in a linked manner may denote using an image captured through the image capture function as input information on the function of providing contact information. The controller 180 can execute an image capture function based on a preset type of touch applied to a specific region on an execution screen of the function of providing contact information. For example, as illustrated in the first drawing of FIG. 19, the controller 180 can display the execution screen 1710 of the image capture function in a region adjacent to the region 1700 in which a user image is received in response to a pinch-out touch applied to the region 1700 in which a user image is received on the execution screen of the function of providing contact information.

The controller 180 can capture at least one or more images based on a touch applied to the execution screen 1710 of the image capture function. For example, referring to the first and the second drawing of FIG. 19, the controller 180 can capture two images in response to two touches to the execution screen 1710 of the image capture function. Here, link information linked with the two images may be stored along with the two images.

Here, the controller 180 can the captured at least one image as a user image. When stored as the user image, the controller 180 can display notification information 1720 indicating that the captured at least one image has been stored in the region 1700 in which a user image is received. In other words, the present disclosure can display the notification information 1720, thereby displaying when at least one image linked with link information is stored as a user image to be visually distinguished from when one image is merely stored as a user image.

Moreover, the controller 180 can set any one of the at least one image stored as a user image to a representative image. The representative image may be an image that is representatively displayed among the at least one image. Here, as illustrated in the third and the fourth drawing of FIG. 19, the controller 180 can display at least one image stored as a user image on the display unit 151 based on a drag touch applied to the representative image.

Furthermore, the controller 180 can set another image of the at least one image to a representative image based on a user request when the at least one image is displayed on the display unit 151. Furthermore, subsequent to storing a plurality of images linked with each other as a user image, the controller 180 can sequentially display the plurality of images on the region 1700 in which a user image is received based on a touch having a preset pattern (for example, a touch forming a circle) applied to the region 1700 in which a user image is received. In other words, the present disclosure can store a plurality of images as a user image, thereby providing the user image as a dynamic image not as a static image.

Furthermore, subsequent to storing the at least one image as a user image, the controller 180 can add or delete a new image to or from the at least one image. In this instance, the new image may be included in the link information of the at least one image. The addition and deletion of the new image may be performed in the same manner as the foregoing description.

Figure 20A:
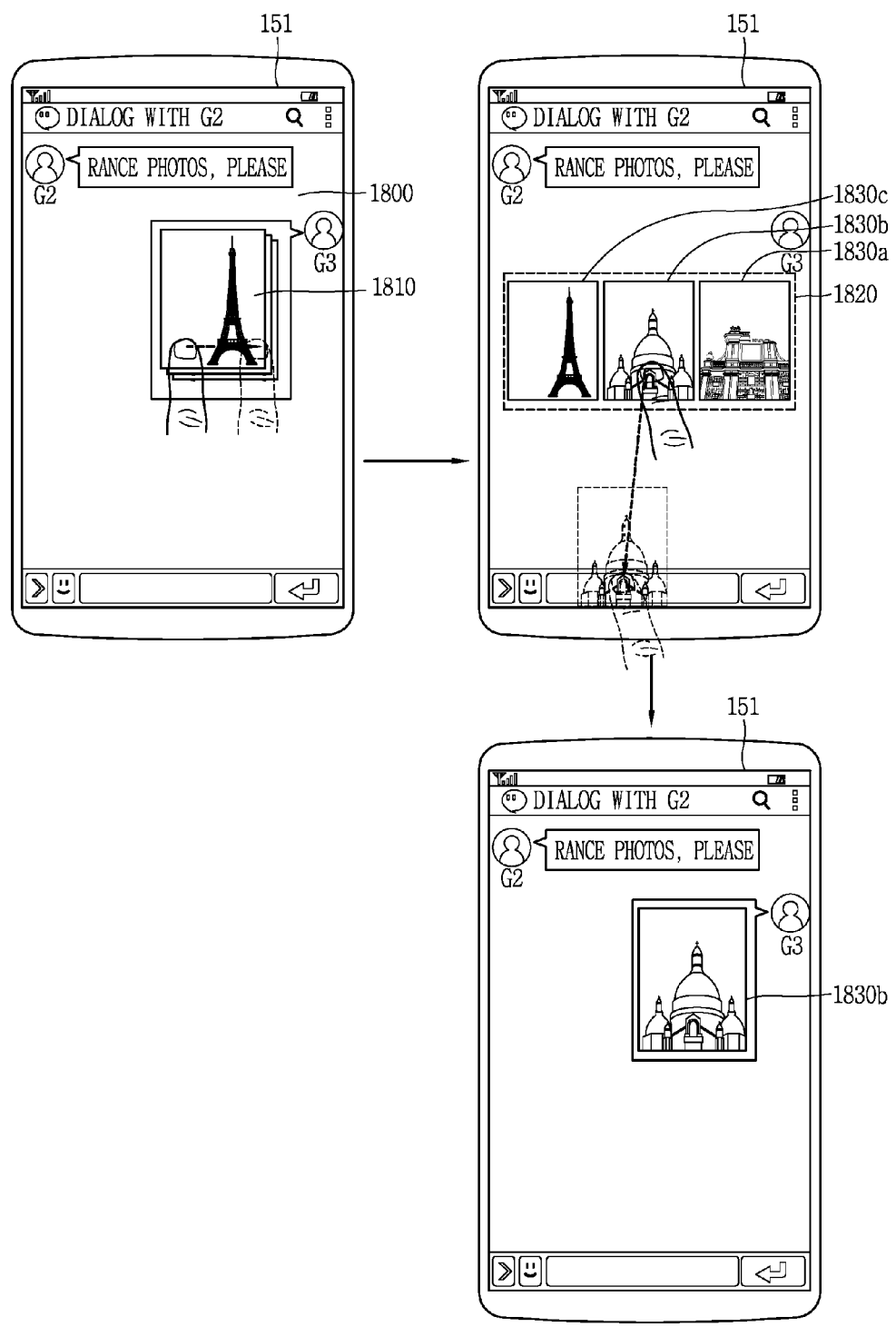
FIGS. 20A and 20B are conceptual views illustrating a method of linking a message transmission function with an image capture function.
Figure 20B:
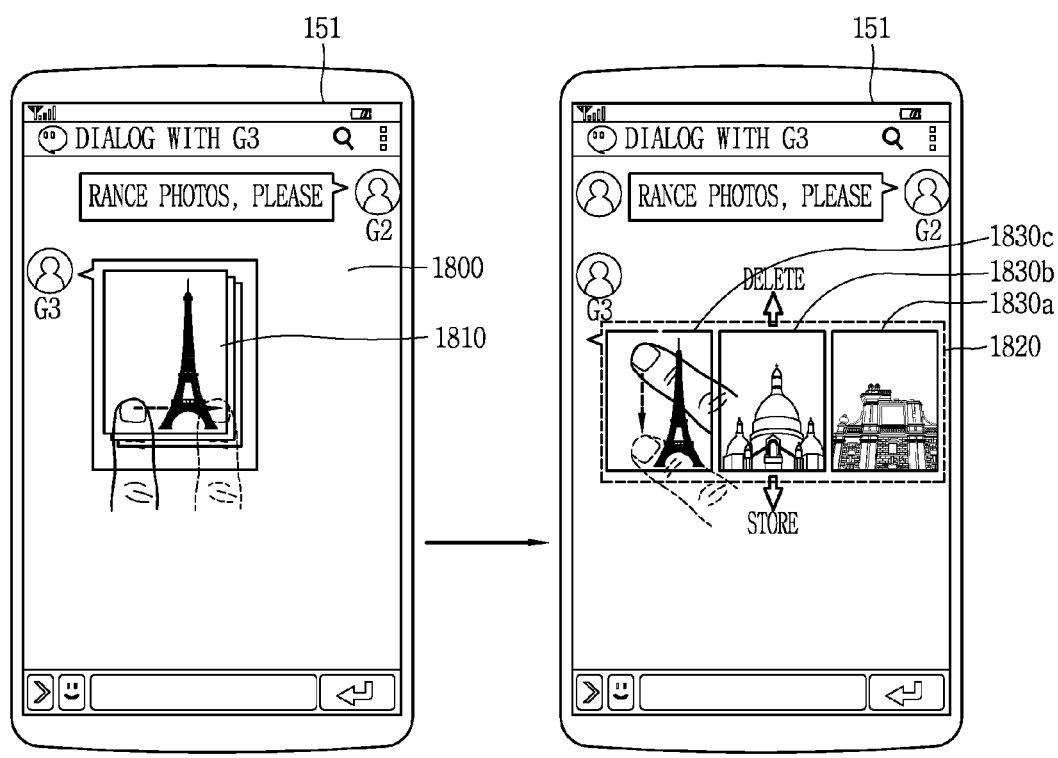

In the above, a method of linking a function of providing contact information with an image capture function has been described. Hereinafter, a method of linking a message transmission function with an image capture function will be described. FIGS. 20A and 20B are conceptual views illustrating a method of linking a message transmission function with an image capture function.

The controller 180 of the mobile terminal 100 according to an embodiment of the present disclosure can transmit a plurality of images linked with each other to an external terminal through a message transmission function. The plurality of images linked with each other may denote a plurality of images contained in one link information.

The controller 180 can selectively transmit only at least part of the plurality of images, transmit all the plurality of images or transmit the plurality of images as a dynamic image. First, as illustrated in the first drawing of FIG. 20A, when a plurality of images linked with each other are transmitted through a message transmission function, the controller 180 can display a thumbnail image 1810 of the plurality of images linked with each other on one region of the execution screen 1800 of the message transmission function.

Then, as illustrated in the second drawing of FIG. 20A, the controller 180 can display thumbnail images 1830a, 1830b, 1830c of at least part of the plurality of images in one region 1820 on the display unit 151 in response to a drag touch to the thumbnail image 1810 of the plurality of images linked with each other. Here, the controller 180 can transmit one or more images of the plurality of images to an external terminal. For example, as illustrated in the third drawing of FIG. 20A, the controller 180 can transmit any one image 1830b to the external terminal through a drag touch to the any one image 1830b of the at least part of thumbnail images 1830a, 1830b, 1830c. In other words, the present disclosure can selectively transmit the linked plurality of images without transmitting all the linked plurality of images.

Here, the any one image may be immediately transmitted to an external terminal or transmitted to an external terminal via an external server associated with a message function. The external terminal may immediately receive the any one image or receive only a thumbnail image of the any one image through the external server and select whether or not to receive the any one image based on a user's request. Furthermore, the controller 180 can transmit all the plurality of images to an external terminal. In this instance, the controller 180 can transmit all the plurality of images to an external server associated with a message transmission function. Furthermore, as illustrated in FIG. 20B, the external terminal may receive a thumbnail image 1810 of the plurality of images.

Then, the controller of the external terminal may receive one or more images among the plurality of images using the thumbnail image 1810. In other words, the external terminal may receive only a thumbnail image and selectively receive an image using the thumbnail image without receiving all the plurality of images.

Here, the controller of the external terminal may receive the one or more images based on a preset type of touch applied to the thumbnail image. For example, as illustrated in the second drawing of FIG. 20B, the controller 180 can receive an image corresponding to the thumbnail image from an external server associated with the message transmission or reject the reception based on a flicking touch having a preset direction with respect to the thumbnail images 1830a, 1830b, 1830c for at least part of the plurality of images. For example, the controller 180 can reject the reception of the any one image based on a flicking touch in an upward direction from the bottom with respect to the thumbnail image 1830b for any one image among the thumbnail images 1830a, 1830b, 1830c for the at least part of the images, and receive the any one image based on a flicking touch in a downward direction from the top.

Furthermore, the controller 180 can transmit the linked plurality of images to an external terminal as a dynamic image. The dynamic image may be one image in which the plurality of images are sequentially displayed according to the passage of time. In other words, when the linked plurality of images are transmitted to an external terminal, the controller 180 can generate one dynamic image using the plurality of images, and transmit the dynamic image.

For example, the controller 180 can generate the linked plurality of images as one dynamic image to transmit the generated dynamic image based on a touch drawing a circle applied to the thumbnail image 1810 of the plurality of images linked with each other.

Figure 21:
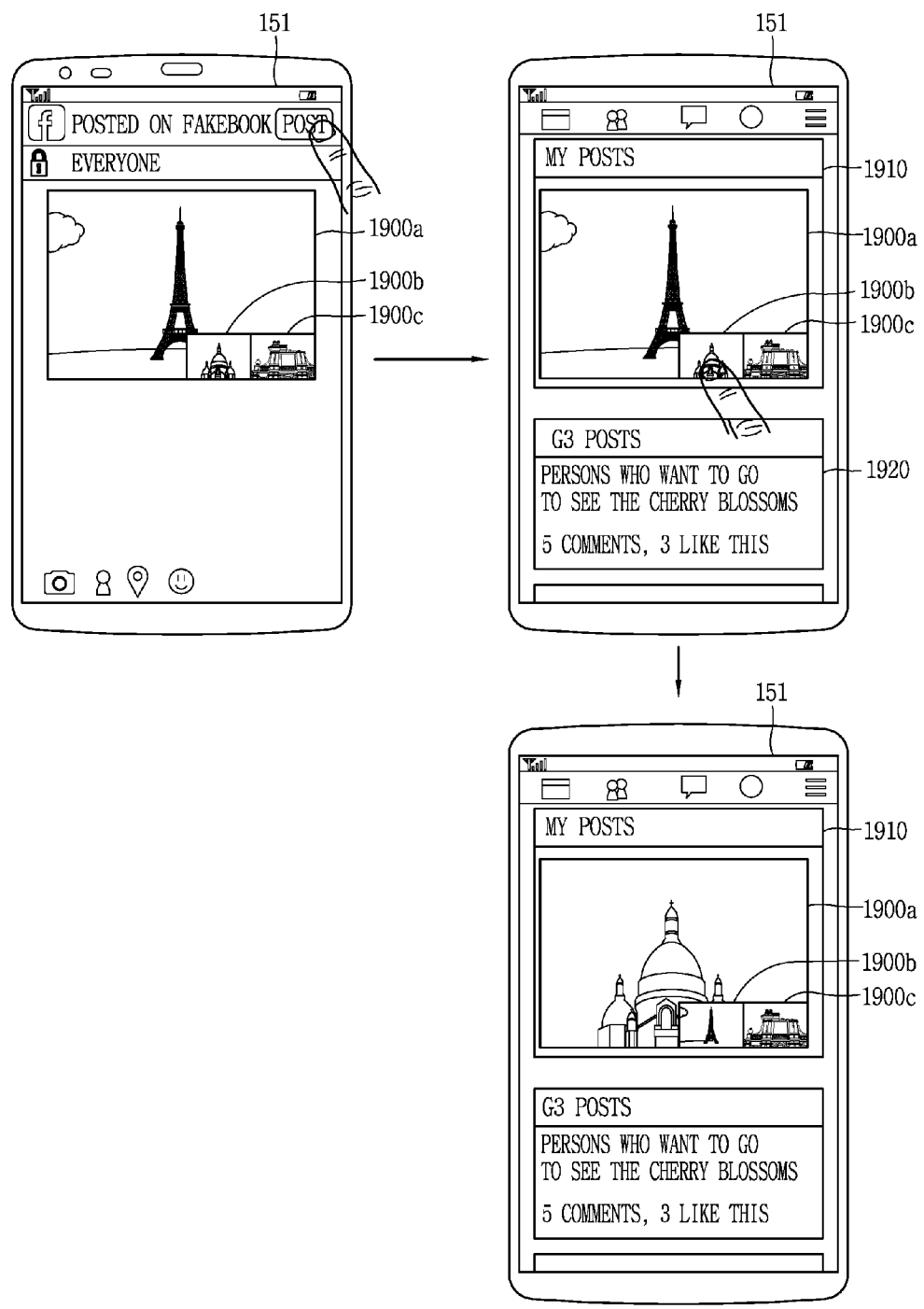
FIG. 21 is a conceptual view illustrating a method of controlling a plurality of images linked with each other through a social network service (SNS) function.

In the above, a method of controlling a plurality of images linked with each other through a message transmission function has been described. Hereinafter, a method of controlling a plurality of images linked with each other through a social network service (SNS) function. FIG. 21 is a conceptual view illustrating a method of controlling a plurality of images linked with each other through a social network service (SNS) function.

The controller 180 of the mobile terminal 100 according to an embodiment of the present disclosure can transmit a plurality of images linked with each other to an external server associated with an SNS through an SNS function. As a social network service, the SNS may denote a service for sharing information between service subscribers.

When a plurality of images linked with each other are transmitted to an external service associated with an SNS, the controller 180 can display the thumbnail images of the remaining images along with any one image of the plurality of images linked with each other on the display unit 151 to indicate that the plurality of images linked with each other are images linked with each other.

More specifically, when a plurality of images linked with each other are transmitted to an external server associated with an SNS, the controller 180 can display any one image of the plurality of images linked with each other on the display unit 151. Furthermore, the controller 180 can display the thumbnail images of the remaining images to overlap with the any one image. For example, as illustrated in the first drawing of FIG. 21, the controller 180 can transmit the thumbnail images 1900b, 1900c of the remaining images to the external server associated with an SNS to overlap with any one image 1900a. When transmitted to the external server associated with an SNS, SNS service subscribers may view the any one image 1900a and the thumbnail images 1900b, 1900c of the remaining images.

As illustrated in the second drawing of FIG. 21, when a touch is applied to another thumbnail image 1900b of the thumbnail images 1900b, 1900c of the remaining images subsequent to transmitting them to the external server associated with an SNS, the controller 180 can transmit an image corresponding to the another one thumbnail image 1900b on the display unit 151. In this instance, as illustrated in the third drawing of FIG. 21, the controller 180 can display the thumbnail images of the remaining images 1900a, 1900c to overlap with the another image.

Figure 22:
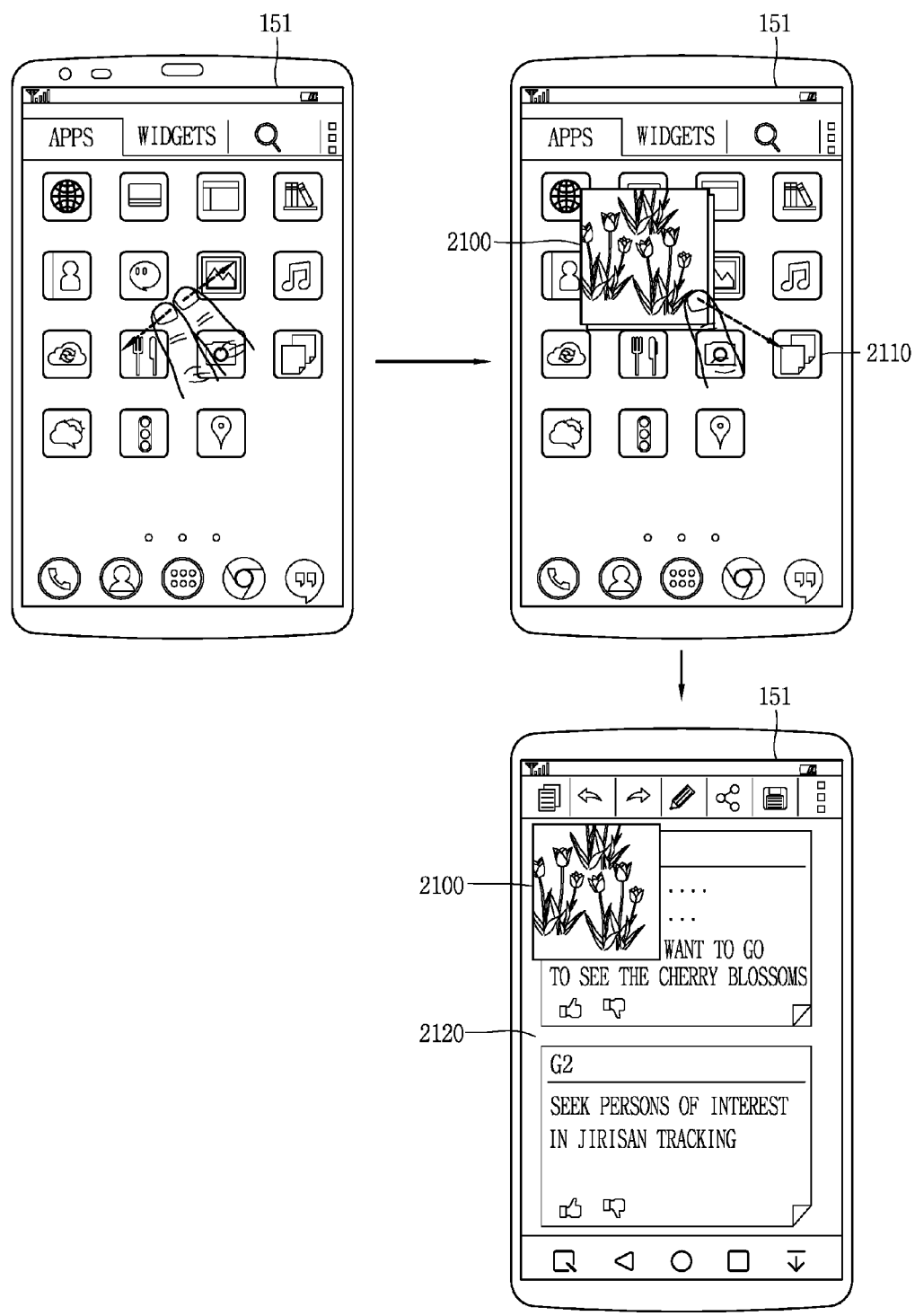
FIG. 22 is a conceptual view illustrating a method of capturing an image through an image capture function and then linking the captured image with different functions.

In the above, a method of using a plurality of images linked with each other through an SNS function has been described. Hereinafter, a method of capturing an image through an image capture function and then linking the captured image with different functions will be described. FIG. 22 is a conceptual view illustrating a method of capturing an image through an image capture function and then linking the captured image with different functions.

The controller 180 of the mobile terminal 100 according to an embodiment of the present disclosure can capture an image through an image capture function and then generate link information in which the captured image is linked with different functions. In other words, the present disclosure can link a function associated with an image to be captured in advance prior to capturing the image through an image capture function but also select a function to be linked with the captured image subsequent to capturing the image through an image capture function.

More specifically, the controller 180 can execute an image capture function based on a preset type of touch applied to an icon list page. For example, as illustrated in the first drawing of FIG. 22, the controller 180 can display an execution screen 2100 of the image capture function on the display unit 151 based on a pinch-out touch applied to the icon list page.

The controller 180 can capture at least one image through the image capture function. Subsequent to capturing the at least one image, the controller 180 can process the at least one image in linkage with any one function to use the at least one image on the any one function.

Here, in order to process the at least one image in linkage with the any one function, the controller 180 can use an execution screen 2100 of the image capture function and an icon linked with the any one function. For example, as illustrated in the second drawing of FIG. 22, the controller 180 can move at least one image displayed on the execution screen 2100 of the image capture function to a region displayed with an icon 2110 linked with an SNS function based on a drag touch to use any one image displayed on the execution screen 2100 of the image capture function as the input information of the SNS function.

When the any one image is moved to a region displayed with the icon 2110 linked with an SNS function, the controller 180 can generate and store link information in which the at least one image is linked with the SNS function to use the at least one image as the input information of the SNS function.

As illustrated in the third drawing of FIG. 22, when the SNS function is executed subsequent to the generation of the link information, the controller 180 can display the at least one image on an execution screen 2120 of the SNS function. Through this, the present disclosure can capture an image and then link the captured image in advance with functions that are to use the captured image afterwards, thereby conveniently using the captured image through different functions.

The present disclosure can provide a method of executing an image capture function and a function associated with the captured image in a linked manner. Through this, the present disclosure can execute a function associated with the captured image as well as an image capture function together to provide a method of capturing an image while at the same time using the captured image. When an image capture function and a function associated with the captured image are executed in a linked manner, the present disclosure can provide an execution screen of the image capture function in a suitable form according to the function associated with the captured image.

The foregoing present invention may be implemented as codes readable by a computer on a medium written by the program. The computer-readable media may include all kinds of recording devices in which data readable by a computer system is stored. Examples of the computer-readable media may include hard disk drive (HDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Further, the components in FIG. 1A have sufficient structure to perform the described functions. For example the controller 180 corresponds to a hardware-embedded processor configured to execute the described algorithms for performing the described functions. Similar comments apply to the other components shown in FIG. 1A.

Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
a touchscreen;
a camera; and
a controller configured to:
display, on the touchscreen, a first graphic object that is linked with an image capture function for capturing an image through the camera,
execute the image capture function in response to a first touch input applied to the graphic object, and
execute both the image capture function and a linked function corresponding to the image capture function in response to a second touch input applied to the graphic object,
wherein the controller is further configured to:
display at least one gallery folder on the touchscreen,
link the image capture function to the at least one gallery folder in response to a third touch input on the at least one gallery folder,
display, on the touchscreen, a second graphic object representing that the at least one gallery folder is linked to the image capture function, and
execute the image camera function in response to a fourth touch input to the displayed second graphic object.

2. The mobile terminal of claim 1, wherein the image capture function is embedded within the linked function.

3. The mobile terminal of claim 2, wherein the controller is further configured to: display an execution screen of the linked function on the touchscreen, and
display an execution screen of the image capture function within the execution screen of the linked function.

4. The mobile terminal of claim 3, wherein the execution screen of the image capture function is a preview image obtained by the camera.

5. The mobile terminal of claim 4, wherein the controller is further configured to: change a size of the preview image based on a relative distance between first and second positions of touch inputs on the preview image.

6. The mobile terminal of claim 4, wherein the controller is further configured to: sequentially capture a plurality of images in response to a sequential touch input on the preview image.

7. The mobile terminal of claim 1, wherein the linked function corresponding to the image capture function is any one of a contact function to insert the captured image into a contact list, a message transmission function for transmitting a message including the captured image, and a social network service (SNS) function for uploading the captured image to a corresponding SNS server.

8. The mobile terminal of claim 1, wherein the controller is further configured to: display link graphic objects on the touchscreen corresponding to linked functions linked to the captured image function in response to the second touch input.

9. The mobile terminal of claim 8, wherein the controller is further configured to: stop displaying the link graphic objects after a predetermined time period.

10. The mobile terminal of claim 1, wherein the linked function corresponding to the image capture function stores the captured image in the at least one gallery folder.

11. A method of controlling a mobile terminal, the method comprising:
displaying, on a touchscreen, a first graphic object that is linked with an image capture function for capturing an image through a camera;
executing, via a controller, the image capture function in response to a first touch input applied to the graphic object; and
executing, via the controller, both the image capture function and a linked function corresponding to the image capture function in response to a second touch input applied to the graphic object,
wherein the method further comprises:
displaying at least one gallery folder on the touchscreen;
linking the image capture function to the at least one gallery folder in response to a third touch input on the at least one gallery folder,
displaying, on the touchscreen, a second graphic object representing that the at least one gallery folder is linked to the image capture function,
and executing, via the controller, the image camera function in response to a fourth touch input to the displayed second graphic object.

12. The method of claim 11, wherein the image capture function is embedded within the linked function.

13. The method of claim 12, further comprising:
displaying an execution screen of the linked function on the touchscreen; and
displaying an execution screen of the image capture function within the execution screen of the linked function.

14. The method of claim 13, wherein the execution screen of the image capture function is a preview image obtained by the camera.

15. The method of claim 14, further comprising:
changing a size of the preview image based on a relative distance between first and second positions of touch inputs on the preview image.

16. The method of claim 14, further comprising:
sequentially capturing a plurality of images in response to a sequential touch input on the preview image.

17. The method of claim 11, wherein the linked function corresponding to the image capture function is any one of a contact function to insert the captured image into a contact list, a message transmission function for transmitting a message including the captured image, and a social network service (SNS) function for uploading the captured image to a corresponding SNS server.

18. The method of claim 11, wherein the linked function corresponding to the image capture function stores the captured image in the at least one gallery folder.

19. A mobile terminal, comprising:
a touchscreen;
a camera; and
a controller configured to:
display, on the touchscreen, a first graphic object that is linked with an image capture function for capturing an image through the camera,
execute the image capture function in response to a first touch input applied to the graphic object, and
execute both the image capture function and a linked function corresponding to the image capture function in response to a second touch input applied to the graphic object,
wherein the controller is further configured to:
display a preview image obtained by the camera on the touchscreen,
activate the voice recognition function in response to an additional touch input applied to the preview image,
receive input voice through the voice recognition function while the additional touch input is sensed,
capture an image corresponding to the preview image in response to the additional touch input ending, and
link the received input voice with the captured image.

* * * * *